United States Patent
Flückiger-Mangual et al.

(10) Patent No.: US 12,472,179 B2
(45) Date of Patent: Nov. 18, 2025

(54) COMBINATION OF A CBP/p300 BROMODOMAIN INHIBITOR AND A KRAS INHIBITOR FOR THE TREATMENT OF CANCER

(71) Applicant: TOLREMO THERAPEUTICS AG, Muttenz (CH)

(72) Inventors: Stefanie Flückiger-Mangual, Muttenz (CH); Dorothea Gruber, Muttenz (CH); Thomas Bohnacker, Muttenz (CH); Martin Schwill, Muttenz (CH); Debora Schmitz-Rohmer, Muttenz (CH); Charles-Henry Fabritius, Muttenz (PL); Sara Laudato, Muttenz (CH)

(73) Assignee: Tolremo Therapeutics AG, Muttenz (CH)

( * ) Notice: Subject to any disclaimer, the term of this patent is extended or adjusted under 35 U.S.C. 154(b) by 513 days.

(21) Appl. No.: 18/012,287

(22) PCT Filed: Jun. 24, 2021

(86) PCT No.: PCT/EP2021/067349
§ 371 (c)(1),
(2) Date: Dec. 22, 2022

(87) PCT Pub. No.: WO2021/260111
PCT Pub. Date: Dec. 30, 2021

(65) Prior Publication Data
US 2023/0233558 A1    Jul. 27, 2023

(30) Foreign Application Priority Data
Jun. 25, 2020 (EP) .................................... 20182364

(51) Int. Cl.
*A61K 31/505* (2006.01)
*A61K 31/4184* (2006.01)
(Continued)

(52) U.S. Cl.
CPC ........ *A61K 31/505* (2013.01); *A61K 31/4184* (2013.01); *A61K 31/437* (2013.01);
(Continued)

(58) Field of Classification Search
CPC .............. A61K 31/505; A61K 31/4148; A61K 31/437; A61K 31/454; A61K 31/4709; A61P 35/00
See application file for complete search history.

(56) References Cited

U.S. PATENT DOCUMENTS 3,773,919 A   11/1973   Boswell
4,485,045 A   11/1984   Regen
(Continued)

FOREIGN PATENT DOCUMENTS

CN   107406454 A   11/2017
CN   110621316 A   12/2019
(Continued)

OTHER PUBLICATIONS

Canon et al. (Nature (2019), 575, 217-223) (Year: 2019).*
(Continued)

*Primary Examiner* — Brandon J Fetterolf
(74) *Attorney, Agent, or Firm* — KDW Firm PLLC

(57) ABSTRACT

The present invention is inter alia concerned with (i) a combination of a CBP/p300 bromodomain inhibitor and a KRAS inhibitor for use in the treatment of a patient suffering from cancer, wherein the cancer exhibits an oncogenic alteration in the KRAS; (ii) a kit comprising (a) a pharmaceutical dosage form comprising a CBP/p300 bromodomain inhibitor and (b) a pharmaceutical dosage form comprising
(Continued)

a KRAS inhibitor, and (iii) a pharmaceutical dosage form comprising a CBP/p300 bromodomain inhibitor and a KRAS inhibitor.

18 Claims, 10 Drawing Sheets

(51) Int. Cl.
  *A61K 31/437*   (2006.01)
  *A61K 31/454*   (2006.01)
  *A61K 31/4709*   (2006.01)
  *A61P 35/00*   (2006.01)

(52) U.S. Cl.
  CPC ........ *A61K 31/454* (2013.01); *A61K 31/4709* (2013.01); *A61P 35/00* (2018.01)

(56) References Cited

U.S. PATENT DOCUMENTS

| | | | |
|---|---|---|---|
| 4,544,545 | A | 10/1985 | Ryan |
| 6,570,036 | B1 | 5/2003 | Reuter |
| 10,648,983 | B2 | 5/2020 | Filvaroff et al. |
| 2016/0046608 | A1 | 2/2016 | Cohen |
| 2016/0317632 | A1 | 11/2016 | Albrecht |
| 2017/0291902 | A1 | 10/2017 | Perl |
| 2018/0334454 | A1 | 11/2018 | Lanman |
| 2019/0144444 | A1 | 5/2019 | Blake |
| 2023/0226057 | A1 | 7/2023 | Fluckiger-Mangual |
| 2023/0255966 | A1 | 8/2023 | Fluckiger-Mangual |

FOREIGN PATENT DOCUMENTS

| | | |
|---|---|---|
| CN | 110996960 A | 4/2020 |
| CN | 110996962 A | 4/2020 |
| CN | 111328283 A | 6/2020 |
| DE | 3218121 A1 | 11/1983 |
| EP | 0036676 A1 | 9/1981 |
| EP | 0052322 A2 | 5/1982 |
| EP | 0088046 A2 | 9/1983 |
| EP | 0102324 A2 | 3/1984 |
| EP | 0133988 A2 | 3/1985 |
| EP | 0142641 A2 | 5/1985 |
| EP | 0143949 A1 | 6/1985 |
| JP | 2001089452 A | 4/2001 |
| JP | 2015524798 A | 8/2015 |
| WO | 9741833 A1 | 11/1997 |
| WO | 9916419 A1 | 4/1999 |
| WO | 2001085136 A2 | 11/2001 |
| WO | 0222607 A1 | 3/2002 |
| WO | 0222608 A1 | 3/2002 |
| WO | 03053411 A1 | 7/2003 |
| WO | 2005100341 A1 | 10/2005 |
| WO | 2008006583 A1 | 1/2008 |
| WO | 2009050183 A2 | 4/2009 |
| WO | 2013148114 A1 | 10/2013 |
| WO | 2014177524 A1 | 11/2014 |
| WO | 2015103355 A1 | 7/2015 |
| WO | 2016123054 A2 | 8/2016 |
| WO | 2016197009 A1 | 12/2016 |
| WO | 2018203256 A1 | 11/2018 |
| WO | 2019045824 A1 | 3/2019 |
| WO | 2019097078 A1 | 5/2019 |
| WO | 2020023768 A1 | 1/2020 |
| WO | 2020035065 A1 | 2/2020 |
| WO | 2020055755 A1 | 3/2020 |
| WO | 2020055757 A1 | 3/2020 |
| WO | 2020055758 A1 | 3/2020 |
| WO | 2020055761 A1 | 3/2020 |
| WO | 2020118066 A1 | 6/2020 |
| WO | 2020127200 A1 | 6/2020 |
| WO | 2021064142 A1 | 4/2021 |
| WO | 2021194326 A1 | 9/2021 |

OTHER PUBLICATIONS

Cochran et al. (Nature Reviews Drug Discovery (2019), 18, 609-628) (Year: 2019).*
Bai et al., "Application progress in pyrimidine compound," Shanxi Chemical Industry, Issue 1: 16-19 (Feb. 2009)—Abstract.
Elbadawy et al., "Emerging Roles of C-Myc in Cancer Stem Cell-Related Signaling and Resistance to Cancer Chemotherapy: A Potential Therapeutic Target Against Colorectal Cancer," International Journal of Molecular Sciences, vol. 20, No. 2340: 16 pages (2019).
Garcia-Carpizo et al., "CREBBP/EP300 bromodomains are critical to sustain the GATA1/MYC regulatory axis in proliferation," Epigenetics Chromatin, vol. 11, No. 30: 15 pages (2018).
Liu et al., "Idiopathic Pulmonary Fibrosis: Current Status, Recent Progress, and Emerging Targets," Journal of Medicinal Chemistry, vol. 60, Issue 2: 527-553 (2017)—Abstract.
Schleger et al., "c-MYC Activation in Primary and Metastatic Ductal Adenocarcinoma of the Pancreas: Incidence, Mechanisms, and Clinical Significance," Modern Pathology, vol. 15, No. 4: 462-469 (2002).
Zhuang et al., "Physiological Activity of Maillard Reaction Products (MRPs) and Technical Measures for Increasing their Production," Liquor-Making, vol. 36, No. 3: 80-83 (May 2009)—Abstract.
Chinese Office Action in CN Application 202180045103.8, dated Aug. 28, 2028, 7 pages.
International Search Report and Written Opinion for Application No. PCT/EP2021/067349 dated Aug. 19, 2021.
Jude Canon et al, "The clinical KRAS (G12C) inhibitor AMG 510 drives anti-tumor immuity," Nature, vol. 575, Oct. 30, 2019.
Van Maldegem Febe et al, "Mutant KRAS at the Heart of Tumor Immune Evasion," Immunity, vol. 52, Jan. 14, 2020.
Zhang Baojie et al, "A novel histone acetyltransferase inhibitor A485 improves sensitivity of non-small cell lung carcinoma cells to TRAIL," Biochemical Pharmacology, Elsevier, vol. 175, Mar. 12, 2020.
Fell Jay B. et al, "Identification of the Clinical Development Candidate MRTX849, a covalent KRASG12C Inhibitor for the Treatment of Cancer," Journal of Medicinal Chemsitory, vol. 63, Apr. 6, 2020.
Gabizon Ronen et al, "Hitting KRAS When It's Down," Journal of Medicinal Chemistry, vol. 63, Jul. 9, 2020.
Uprety Dipesh et al,"KRAS: From undruggable to druggable Cancer Target," Cancer Treatment Reviews, Elsevier, vol. 89, Jul. 15, 2020.
Mullard, "Cracking KRAS," Nature Reviews Drug Discovery, vol. 18, No. 12: 887-891 (Nov. 2019).
Wu et al., "A chemical toolbox for the study of bromodomains and epigenetic signaling," Nature Communications, vol. 10, No. 1 (Apr. 2019).
European Office Action in EP Application 21733159.4 dated May 31, 2024, 12 pages.
Atzrodt et al, "Synthesis of stable isotope labelled internal standards for drug-drug interaction (DDI) studies," Bioogranic Medicinal Chemistry, vol. 20, Issue 18: 5658-5667 (Sep. 15, 2012).
Boumahdi et al, "The great escape: tumour cell plasticity in resistance to targeted therapy," Nat Rev Drug Discov. Jan. 19, 2019.
Cai et al, "Intratumoral De Novo Steroid Synthesis Activates Androgen Receptor in Castration-Resistant Prostate Cancer and Is Upregulated by Treatment with CYP17A1 Inhibitors," Therapeutics, Targets, and Chemical Biology, American Association for Cancer Research, 71 (20), Oct. 15, 2011.
Eppstein et al., "Biological activity of liposome-encapsulated murine interferon gamma is mediated by a cell membrane receptor," Proc. Natl. Acad. Sci. (USA), vol. 82: 3688-3692 (1985).
Hay et al, "Discovery and Optimization for Small-Molecule Ligands for CBP/p300 Bromodomains," Journal of the American Chemical Society, vol. 136, pp. 9308-9319, Jun. 19, 2014.
Hwang et al., "Hepatic uptake and degradation of uniamellar sphingomyelin/cholesterol liposomes: a kinetic study," Proc. Natl. Acad. Sci. (USA), vol. 77: 4030-4034 (1980).

(56) References Cited

OTHER PUBLICATIONS

Leonnetti et al, "Resistance mechanisms to osimertinib in EGFR-mutated non-small cell lung cancer," British Journal of Cancer, Mar. 5, 2019.

Li et al., "A potent CBP/p300-Snail interaction inhibitor suppresses tumor growth and metastasis in wild-type p53-expressing cancer," Science Advances, Research Article, vol. 6: 17 pages (2020).

Lockley et al, "Metal-catalysed hydrogen isotope exhange labeling: a brief overview," Journal of Labelled Componds and Radiopharmceuticals, vol. 53, Issue 11-12, pp. 635-644, Dec. 17, 2010.

Masters et al, "Spray Drying Handbook," K. Masters Longman Group Ltd, Harlow, Essex, 710 pp. Apr. 25, 2007.

Modvig et al., "Two-chamber hydrogen generation and application: access to pressurized deuterium gas," J. Org. Chem., vol. 79: 5861-5868 (2014).

Ogiwara et al,"Targeting p300 Addiction in CBP-Deficient Cancers Causes Synthetic Lethality by Apoptotic Cell Death due to Abrogation of MYC Expression," American Association for Cancer Research, 2015.

Picaud et al, "Generation of a Selective Small Molecule Inhibitor of the CBP/p300 Bromodomain for Leukemia Therapy," Therapeutics, Targets, and Chemical Biology, Cancer Research, 75 (23) pp. 5106-5119, 2015.

Romero et al, "Supporting Information GNE-781, A Highly Advanced Potent and Selective Bromodomain Inhibitor of Cyclic Adenosine Monophosphate Response Element Binding Protein, Binding Protein (CBP)," Genentech, Inc, 2017.

Springuel et al, "The importance of solvent selection for stoichimetrically diverse cocrystal systems: Caffeine/Maleic Acid 1:1 and 2:1 cocrystals," Universite Catholique de Louvain, IMCN, 2012.

Wang et al, "Clopidogrel with Aspirin in Acute Minor Stroke or Transient Ischemic Attack," The New England Journal of Medicine, Jul. 4, 2013.

Wang et al., "Expression of p300/CBP and Smad4 and its significance in non-small-cell lung cancer," Journal of Wannan Medical College, vol. 30, No. 6: 452-456 (2011).

Welti et al, "Targeting the p300/CBP Axis in Lethal Prostate Cancer," Cancer Discovery, vol. 11, Issue 5, May 1, 2021.

Zhang-Xu et al., "Current Development of CBP/300 inhibitors in the last decade," European Journal of Medicinal Chemistry, vol. 209: 2-11 (2020).

Zhong et al, "p300 Acetyltransferase Regulates Androgen Receptor Degradation and PTEN-Deficient Prostate Tumorigeneis," Tumor and Stem Cell Biology, Cancer Research, 74(6) Mar. 5, 2014.

Australian Office Action for Application No. 2020360709, dated Oct. 9, 2023.

International Search Report and Written Opinion corresponding to International Patent Application No. PCT/EP2019/085557, dated Apr. 14, 2020.

International Search Report and Written Opinion corresponding to International Patent Application No. PCT/EP2020/077595, dated Dec. 4, 2020.

International Search Report and Written Opinion of the International Searching Authority issued in International Application No. PCT/EP2021/067346, mailed Aug. 27, 2021, 12 pages.

International Search Report for Application No. PCT/EP2022/059295, dated May 30, 2022.

Japanese Office Action for Application No. 2022520681, dated Oct. 31, 2023.

Office Action corresponding to CA Application No. 3122354, dated Aug. 17, 2022.

\* cited by examiner

COMBINATION OF A CBP/p300 BROMODOMAIN INHIBITOR AND A KRAS INHIBITOR FOR THE TREATMENT OF CANCER

CROSS-REFERENCE TO RELATED PATENT APPLICATIONS

This application is a national phase application of PCT International Patent Application No. PCT/EP2021/067349, filed Jun. 24, 2021, which claims the benefit of European Patent Application Serial No. EP20182364.8, filed Jun. 25, 2020; the disclosure of each of which is incorporated herein by reference in its entirety.

FIELD OF THE INVENTION

The present invention is in the field of cancer treatment. Thus, the present invention relates to a combination of a CBP/p300 bromodomain inhibitor and a KRAS inhibitor for use in the treatment of a patient suffering from cancer, wherein the cancer exhibits an oncogenic alteration in the KRAS. The present invention is also directed to a kit comprising a pharmaceutical dosage form comprising a CBP/p300 bromodomain inhibitor and a pharmaceutical dosage form comprising a KRAS inhibitor. Further, the present invention is concerned with a pharmaceutical dosage form comprising a CBP/p300 bromodomain inhibitor and a KRAS inhibitor.

BACKGROUND OF THE INVENTION

KRAS mutations are present in up to 25% of cancers, wherein the oncogenic variants have different prevalence rates in different cancers (see Box 1 of Mullard, *Nature reviews DRUG DISCOVERY* Vol. 18, December 2019:887-891). Thus, the frequency of KRAS mutations in human cancers is 90% in the pancreas, 30-50% in the colon, 35% in the small intestine, 26% in the biliary tract, 17% in the endometrium, 19% in the lung, 1% in the skin (melanoma), 8% in the cervix and 5% in the urinary tract (see Table 1 of Li et al., *Nature Reviews Cancer* 18, 767-777 (2018)). Accordingly, there is a strong interest in agents that block the proliferative signaling induced by the oncogenic KRAS variants.

While KRAS was regarded as undruggable target for decades, there are now at least five KRAS-modulating agents in the clinic (see Table 1 of Mullard, supra). While preliminary clinical data from the lead KRAS inhibitors as monotherapy in non-small cell lung cancer and in colorectal cancer look promising, combination strategies that could deliver deeper and longer-lasting responses are already being considered and tested in clinical studies such as NCT04185883 and NCT03785249. Examples of such combination therapies are a combination of AMG510 (sotorasib) or MRTX849 with pembrolizumab, a combination of a KRAS inhibitor and a SHP2 inhibitor, and a KRAS inhibitor and a CDK4 inhibitor (see the paragraph bridging pages 888 and 889 as well as the complete page 889 of Mullard, supra).

There is a need for further combination strategies that also result in deeper and longer-lasting responses, ideally for a combination strategy that overcomes a decrease in effect of the KRAS inhibitor over time when administered as single agent (or when administered in combination with other anti-cancer therapies).

OBJECTS AND SUMMARY OF THE INVENTION

The inventors of the present invention have surprisingly found that a CBP/p300 bromodomain inhibitor, i.e. a bromodomain inhibitor selectively binding to the bromodomain of CBP/p300, provides an effective treatment of cancer exhibiting an oncogenic alteration in the KRAS if administered in combination with a KRAS inhibitor, while the CBP/p300 bromodomain inhibitor does not affect the cell proliferation of the cancer cells if administered alone. In other words, the inventors have surprisingly found that the combination of a CBP/p300 bromodomain inhibitor and a KRAS inhibitor is more effective in treating cancer exhibiting an oncogenic alteration in the KRAS compared to the effect that either of the two actives exhibits on its own on the cancer exhibiting an oncogenic alteration in the KRAS. Thus, as noted above, the CBP/p300 bromodomain inhibitor has no effect when given alone (where "no effect" in particular means that there are no objective responses as defined by the RECIST 1.1 response criteria for target lesions or non-target lesions in a subject) while the effect of the KRAS inhibitor when given alone decreases over time, likely due to the development of resistance against the KRAS inhibitor.

In the first aspect, the present invention is directed to a combination of (i) a CBP/p300 bromodomain inhibitor and (ii) a KRAS inhibitor for use in the treatment of a patient suffering from cancer, wherein the cancer exhibits an oncogenic alteration in the KRAS. The first aspect may also be referred to as a combination of (i) a CBP/p300 bromodomain inhibitor and (ii) a KRAS inhibitor for use in the treatment of a patient suffering from cancer, wherein the cancer is characterized by the KRAS-mutational profile given in the one or more indications of the label of the KRAS inhibitor used in the combination (such as e.g. KRAS G12C) or wherein the cancer is characterized by the KRAS-mutational profile targeted in the clinical trial setting by the KRAS inhibitor used in the combination (such as e.g. KRAS G12C).

In a preferred embodiment of the first aspect, the oncogenic alteration in the KRAS results in overactivation of KRAS signalling. The oncogenic alteration in the KRAS may even result in constitutively active KRAS signalling (in the meaning that the signaling activity of the GTP-bound KRAS is constitutively active).

In a further preferred embodiment of the first aspect, the oncogenic alteration in the KRAS is caused by at least one base mutation in the KRAS gene resulting in an amino acid substitution in the KRAS selected from the group consisting of G12C, G12V, G12D, G13D, Q61H, Q61L, Q61R, K117N and combinations thereof. It can be preferred that the oncogenic alteration is caused by at least one base mutation in the KRAS gene resulting in an amino acid substitution in the KRAS selected from the group consisting of G12C, G12V and G12D. It is most preferred that the oncogenic alteration in the KRAS is caused by at least one base mutation in the KRAS gene resulting in the amino acid substitution G12C in the KRAS.

In another embodiment of the first aspect, the cancer is selected from the group consisting of lung cancer, colorectal cancer and pancreatic cancer. The lung cancer is preferably non-small cell lung cancer (NSCLC) and may be locally advanced or metastatic NSCLC, most preferably KRAS G12C-mutated locally advanced or metastatic NSCLC (which may, in the language as used herein, be alternatively formulated as the treatment of a patient suffering from NSCLC, optionally locally advanced or metastatic NSCLC, wherein the NSCLC exhibits the oncogenic alteration G12C in the KRAS).

In another embodiment of the first aspect, the CBP/p300 bromodomain inhibitor is a small molecule inhibitor. Thus, in such an embodiment, the CBP/p300 bromodomain inhibitor is not a nucleic acid-based inhibitor, such as e.g. a shRNA or RNAi directed to CBP and/or p300.

In another embodiment of the first aspect, the KRAS inhibitor is a small molecule inhibitor. Thus, in such an embodiment, the KRAS inhibitor is not a nucleic acid-based inhibitor, such as e.g. a shRNA or RNAi directed to KRAS. In a further embodiment of the first aspect, the KRAS inhibitor is targeted to KRAS G12C, i.e. targeted to treat a cancer that exhibits the oncogenic alteration G12C in the KRAS. Such an inhibitor may in particular be a covalent inhibitor, which targets the cysteine at position 12 present in the G12C KRAS through covalent interactions.

The CBP/p300 bromodomain inhibitor may be selected from the group consisting of Compound A, Compound C, Compound 00030, Compound 00071, CCS1477, GNE-781, GNE-049, SGC-CBP30, CPI-637, FT-6876, Compound 462, Compound 424 and Compound 515. These compounds are either commercially available or publicly disclosed as outlined further below, or their synthesis and structures are shown in the examples of the present application. It can be preferred that the CBP/p300 bromodomain inhibitor is selected from the group consisting of Compound A, Compound C, CCS1477, GNE-781, GNE-049, CPI-637, Compound 462, Compound 424 and Compound 515.

The KRAS inhibitor may be selected from the group consisting of AMG510, MRTX849, JNJ-74699157/ARS-3248, BI 1701963, BI 1823911, BAY-293, GDC-6036, MRTX1133, a RAS(ON) inhibitor (wherein the RAS(ON) inhibitor is preferably RMC-6291 or RMC-6236), and combinations thereof. In a more preferred embodiment, the KRAS inhibitor is AMG510 or MRTX849. It can be most preferred that the KRAS inhibitor is AMG510.

It needs to be understood that the combination of (i) and (ii) as referred to herein can be an open or a closed combination. Thus, the present combination of (i) and (ii) may be for use in the treatment of a patient suffering from cancer, wherein the cancer exhibits an oncogenic alteration in the KRAS, and wherein (i) and (ii) are the sole active agents (a "closed" combination). However, the combination of (i) and (ii) may alternatively be for use in the treatment of a patient suffering from cancer, wherein the cancer exhibits an oncogenic alteration in the KRAS, and wherein at least one additional active agent (iii) may be administered, such as e.g. an active agent (iii) selected from the group consisting of a PD1 inhibitor, a MEK inhibitor, an SHP2 allosteric inhibitor, a Pan-ErbB tyrosine kinase inhibitor, a PD-L1 inhibitor, an EGFR inhibitor, a chemotherapeutic regimen drug, an mTOR inhibitor, a CDK inhibitor, a VEGF inhibitor, pembrolizumab, cetuximab, atezolizumab, bevacizumab, and combinations of any of the foregoing (an "open" combination).

In a preferred embodiment of the first aspect, the combination is administered to the patient during each treatment cycle.

In another embodiment of the first aspect, the CBP/p300 bromodomain inhibitor and the KRAS inhibitor are administered as separate dosage forms or comprised in a single dosage form. If the CBP/p300 bromodomain inhibitor and the KRAS inhibitor are administered as separate dosage forms, the administration during each treatment cycle may be concomitantly or sequentially. This includes the option that the CBP/p300 bromodomain inhibitor is administered first, followed by the administration of the KRAS inhibitor.

In yet another embodiment of the first aspect, the treatment results in an extended duration of the therapeutic effect of the KRAS inhibitor compared to the duration of the therapeutic effect of the KRAS inhibitor when administered as the sole active agent. In still another embodiment, the treatment results in an increased therapeutic efficacy of the KRAS inhibitor compared to the therapeutic efficacy of the KRAS inhibitor when administered as the sole active agent. In another embodiment, the treatment results in the prevention of resistance to the KRAS inhibitor.

In another embodiment of the first aspect, the CBP/p300 bromodomain inhibitor is administered at a daily amount of between about 1 mg and about 3000 mg, preferably of between about 10 mg and about 2000 mg, more preferably of between about 15 mg and about 1000 mg. It can be preferred to administer the CBP/p300 bromodomain inhibitor at a daily amount of about 10 mg, about 15 mg, about 20 mg, about 50 mg, about 100 mg, about 250 mg, about 500 mg, about 1000 mg, about 1500 mg, about 2000 mg, about 2500 mg, or about 3000 mg. The administration may take place intermittently, i.e. not every day, but on a day the administration takes place, the afore-mentioned daily amount may be administered. If CCS1477, Compound 462, Compound 424 or Compound 515 is used as CBP/p300 bromodomain inhibitor, the respective compound may be administered at a daily amount of between about 10 mg and about 600 mg.

In another embodiment of the first aspect, the KRAS inhibitor is administered at a daily amount that is in the range of a typical daily amount (in particular the daily amount mentioned for the KRAS inhibitor in the label, if available) if the KRAS inhibitor is administered as the sole active agent. The typical daily amount (or the indicated daily amount, if available) depends on the specific KRAS inhibitor that will be used. Typically, a KRAS inhibitor will be administered at a daily amount of between about 10 mg and about 2000 mg. Thus, AMG510 may e.g. be administered in the combination for use of the present invention at a daily amount of between about 240 mg and about 1200 mg, about 480 mg and about 1200 mg, or about 600 mg to about 1200 mg, preferably of between about 720 mg to about 1080 mg, more preferably of between about 840 mg and about 960 mg or about 960 mg. MRTX849 may e.g. be administered in the combination for use of the present invention at a daily amount of between about 200 mg and about 1400 mg, or about 400 mg and about 1300 mg, preferably of between about 600 mg and about 1200 mg, most preferably at about 1200 mg.

In another embodiment of the first aspect, the KRAS inhibitor is administered at a daily amount that is lower than the above-mentioned typical daily amount if the KRAS inhibitor is administered as the sole active agent. In other words, if a KRAS inhibitor is not administered as the sole active agent but in the combination for use according to the present invention, the KRAS inhibitor may be administered at a lower amount than the amount used when the KRAS inhibitor is administered as the sole active agent. This e.g. means for the examples given above that the daily amount would be at the lower ends of the ranges given or even below these ranges.

In yet another embodiment of the first aspect, the present invention is directed to a combination of (i) a CBP/p300 bromodomain inhibitor and (ii) a KRAS G12D inhibitor (preferably MRTX1133) for use in the treatment of a patient suffering from cancer, wherein the cancer exhibits the oncogenic alteration G12D in the KRAS. It can further be preferred in this embodiment that the cancer is selected from the group consisting of lung cancer, preferably NSCLC, colorectal cancer and pancreatic cancer.

In a highly preferred embodiment of the first aspect, the present invention is directed to a combination of (i) a CBP/p300 bromodomain inhibitor and (ii) a KRAS G12C inhibitor for use in the treatment of a patient suffering from cancer, wherein the cancer exhibits the oncogenic alteration G12C in the KRAS. It can further be preferred in this embodiment that the cancer is selected from the group consisting of lung cancer, preferably NSCLC, colorectal cancer and pancreatic cancer.

Lung cancer may be preferred. It can also be preferred that the KRAS G12C inhibitor is selected from the group consisting of AMG510, MRTX849, JNJ-74699157/ARS-3248, BI 1823911, GDC-6036, a $RAS^{G12C}(ON)$ inhibitor (wherein the $RAS^{G12C}(ON)$ inhibitor is preferably RMC-6291), and combinations thereof; preferably wherein the KRAS G12C inhibitor is AMG510 or MRTX849.

In another preferred embodiment of the first aspect, the present invention is directed to a combination of (i) a CBP/p300 bromodomain inhibitor and (ii) a KRAS G12C inhibitor, preferably AMG510 or MRTX849, for use in the treatment of a patient suffering from locally advanced or metastatic NSCLC, who has received at least one prior systemic therapy, wherein the NSCLC exhibits the oncogenic alteration G12C in the KRAS.

In yet a further embodiment of the first aspect, the present invention is directed to a combination of (i) Compound A and (ii) a KRAS inhibitor for use in the treatment of a patient suffering from cancer, wherein the cancer exhibits an oncogenic alteration in the KRAS. It can be preferred in this embodiment that the KRAS inhibitor is a KRAS G12C inhibitor, preferably AMG510 or MRTX849, and that the cancer exhibits the oncogenic alteration G12C in the KRAS. It can further be preferred in this embodiment that the cancer is selected from the group consisting of lung cancer, preferably NSCLC, colorectal cancer and pancreatic cancer.

In yet a further embodiment of the first aspect, the present invention is directed to a combination of (i) Compound C and (ii) a KRAS inhibitor for use in the treatment of a patient suffering from cancer, wherein the cancer exhibits an oncogenic alteration in the KRAS. It can be preferred in this embodiment that the KRAS inhibitor is a KRAS G12C inhibitor, preferably AMG510 or MRTX849, and that the cancer exhibits the oncogenic alteration G12C in the KRAS. It can further be preferred in this embodiment that the cancer is selected from the group consisting of lung cancer, preferably NSCLC, colorectal cancer and pancreatic cancer.

In yet a further embodiment of the first aspect, the present invention is directed to a combination of (i) CCS1477 and (ii) a KRAS inhibitor for use in the treatment of a patient suffering from cancer, wherein the cancer exhibits an oncogenic alteration in the KRAS. It can be preferred in this embodiment that the KRAS inhibitor is a KRAS G12C inhibitor, preferably AMG510 or MRTX849, and that the cancer exhibits the oncogenic alteration G12C in the KRAS. It can further be preferred in this embodiment that the cancer is selected from the group consisting of lung cancer, preferably NSCLC, colorectal cancer and pancreatic cancer.

In yet a further embodiment of the first aspect, the present invention is directed to a combination of (i) GNE-781 or GNE-049 and (ii) a KRAS inhibitor for use in the treatment of a patient suffering from cancer, wherein the cancer exhibits an oncogenic alteration in the KRAS. It can be preferred in this embodiment that the KRAS inhibitor is a KRAS G12C inhibitor, preferably AMG510 or MRTX849, and that the cancer exhibits the oncogenic alteration G12C in the KRAS. It can further be preferred in this embodiment that the cancer is selected from the group consisting of lung cancer, preferably NSCLC, colorectal cancer and pancreatic cancer.

In yet a further embodiment of the first aspect, the present invention is directed to a combination of (i) CPI-637 and (ii) a KRAS inhibitor for use in the treatment of a patient suffering from cancer, wherein the cancer exhibits an oncogenic alteration in the KRAS. It can be preferred in this embodiment that the KRAS inhibitor is a KRAS G12C inhibitor, preferably AMG510 or MRTX849, and that the cancer exhibits the oncogenic alteration G12C in the KRAS. It can further be preferred in this embodiment that the cancer is selected from the group consisting of lung cancer, preferably NSCLC, colorectal cancer and pancreatic cancer.

In yet a further embodiment of the first aspect, the present invention is directed to a combination of (i) Compound 462 or Compound 424 or Compound 515 and (ii) a KRAS inhibitor for use in the treatment of a patient suffering from cancer, wherein the cancer exhibits an oncogenic alteration in the KRAS. It can be preferred in this embodiment that the KRAS inhibitor is a KRAS G12C inhibitor, preferably AMG510 or MRTX849, and that the cancer exhibits the oncogenic alteration G12C in the KRAS. It can further be preferred in this embodiment that the cancer is selected from the group consisting of lung cancer, preferably NSCLC, colorectal cancer and pancreatic cancer.

In an especially preferred embodiment of the first aspect, the present invention is directed to a combination of (i) a CBP/p300 bromodomain inhibitor, wherein the CBP/p300 bromodomain inhibitor is a small molecule inhibitor, and (ii) a KRAS inhibitor, wherein the KRAS inhibitor is a KRAS G12C small molecule inhibitor (preferably selected from the group consisting of AMG510, MRTX849, JNJ-74699157/ARS-3248, BI 1823911, GDC-6036, a $RAS^{G12C}(ON)$ inhibitor [preferably RMC-6291] and combinations thereof, most preferably AMG510 or MRTX849), for use in the treatment of a patient suffering from cancer, wherein the cancer exhibits the oncogenic alteration G12C in the KRAS. It can further be preferred in this embodiment that the cancer is selected from the group consisting of lung cancer, preferably NSCLC, colorectal cancer and pancreatic cancer.

In a second aspect, the present invention is concerned with a kit comprising (i) a pharmaceutical dosage form comprising a CBP/p300 bromodomain inhibitor and (ii) a pharmaceutical dosage form comprising a KRAS inhibitor.

The pharmaceutical dosage forms (i) and (ii) may be oral dosage forms, such as e.g. tablets. The amount of the CBP/p300 bromodomain inhibitor comprised in the dosage form preferably fits with the daily amount to be administered as stated above in the first aspect. Thus, the amount of the CBP/p300 bromodomain inhibitor in the dosage form may be the complete daily amount if administered once daily. However, it may also be less than the daily amount, e.g. half the daily amount, if administered twice daily or administered once daily via two tables. The amount of the KRAS inhibitor comprised in the dosage form preferably fits with the daily amount to be administered as stated above in the first aspect. Thus, the amount of the KRAS inhibitor in the dosage form may be the complete daily amount if administered once daily. However, it may also be less than the daily amount, e.g. half the daily amount, if administered twice daily or administered once daily via two tables. For AMG510, the amount can in particular be 120 mg, wherein the dosage form preferably corresponds to a tablet.

Each pharmaceutical dosage form typically contains at least one pharmaceutically acceptable excipient as defined in section 3 below.

In a preferred embodiment of the second aspect, the CBP/p300 bromodomain inhibitor is selected from the group consisting of Compound A, Compound C, Compound 00030, Compound 00071, CCS1477, GNE-781, GNE-049, SGC-CBP30, CPI-637, FT-6876, Compound 462, Compound 424 and Compound 515.

In another preferred embodiment of the second aspect, the KRAS inhibitor is selected from the group consisting of AMG510, MRTX849, JNJ-74699157/ARS-3248, BI 1701963, BI 1823911, BAY-293, GDC-6036, MRTX1133, a RAS(ON) inhibitor (preferably RMC-6291 or RMC-6236), and combinations thereof.

In yet another preferred embodiment of the second aspect, the kit comprises (i) a pharmaceutical dosage form comprising a CBP/p300 bromodomain inhibitor and (ii) a pharmaceutical dosage form comprising AMG510 or MRTX849.

In a third aspect, the present invention is concerned with a pharmaceutical dosage form comprising (i) a CBP/p300 bromodomain inhibitor and (ii) a KRAS inhibitor.

The pharmaceutical dosage form may be an oral dosage form, such as e.g. a tablet. The amount of the CBP/p300 bromodomain inhibitor comprised in the dosage form preferably fits with the daily amount to be administered as stated above in the first aspect. Thus, the amount of the CBP/p300 bromodomain inhibitor in the dosage form may be the complete daily amount if administered once daily. However, it may also be less than the daily amount, e.g. half the daily amount, if administered twice daily or administered once daily via two tables. The amount of the KRAS inhibitor comprised in the dosage form preferably fits with the daily amount to be administered as stated above in the first aspect. Thus, the amount of the KRAS inhibitor in the dosage form may be the complete daily amount if administered once daily. However, it may also be less than the daily amount, e.g. half the daily amount, if administered twice daily or administered once daily via two tables. For AMG510, the amount can in particular be 120 mg, wherein the dosage form preferably corresponds to a tablet.

The pharmaceutical dosage form typically contains at least one pharmaceutically acceptable excipient as defined in section 3 below.

In a preferred embodiment of the third aspect, the CBP/p300 bromodomain inhibitor is selected from the group consisting of Compound A, Compound C, Compound 00030, Compound 00071, CCS1477, GNE-781, GNE-049, SGC-CBP30, CPI-637, FT-6876, Compound 462, Compound 424 and Compound 515.

In another preferred embodiment of the third aspect, the KRAS inhibitor is selected from the group consisting of AMG510, MRTX849, JNJ-74699157/ARS-3248, BI 1701963, BI 1823911, BAY-293, GDC-6036, MRTX1133, a RAS(ON) inhibitor (preferably RMC-6291 or RMC-6236), and combinations thereof.

In yet another preferred embodiment of the third aspect, the pharmaceutical dosage form comprises (i) a CBP/p300 bromodomain inhibitor and (ii) AMG510 or MRTX849.

In a fourth aspect, the present invention is directed to a method of treating cancer in a patient in need thereof, said method comprising administering to the patient an effective amount of (i) a CBP/p300 bromodomain inhibitor and an effective amount of (ii) a KRAS inhibitor, wherein the cancer exhibits an oncogenic alteration in the KRAS.

In a fifth aspect, the present invention is directed to a method of extending the duration of the therapeutic effect of a KRAS inhibitor in a patient in need thereof, said method comprising administering to the patient an effective amount of (i) a CBP/p300 bromodomain inhibitor and an effective amount of (ii) the KRAS inhibitor, wherein the cancer exhibits an oncogenic alteration in the KRAS. In other words, the duration of the therapeutic effect of the KRAS inhibitor (when administered in the combination) is extended compared to the duration of the therapeutic effect of the KRAS inhibitior when administered as the sole active agent in cancer treatment.

In a sixth aspect, the present invention is directed to a method of increasing the therapeutic efficacy of a KRAS inhibitor in a patient in need thereof, said method comprising administering to the patient an effective amount of (i) a CBP/p300 bromodomain inhibitor and an effective amount of (ii) the KRAS inhibitor, wherein the cancer exhibits an oncogenic alteration in the KRAS. In other words, the therapeutic efficacy of the KRAS inhibitor (when administered in the combination) is increased compared to the therapeutic efficacy of the KRAS inhibitor when administered as the sole active agent in cancer treatment.

In a seventh aspect, the present invention is directed to a method of blocking proliferation of a cancer cell, said method comprising administering to the cell an effective amount of (i) a CBP/p300 bromodomain inhibitor and an effective amount of (ii) a KRAS inhibitor, wherein the cancer cell exhibits an oncogenic alteration in the KRAS.

In an eight aspect, the present invention is directed to a method of retarding the proliferation of a cancer cell, said method comprising administering to the cell an effective amount of (i) a CBP/p300 bromodomain inhibitor and an effective amount of (ii) a KRAS inhibitor, wherein the cancer cell exhibits an oncogenic alteration in the KRAS.

The embodiments outlined above for the first aspect equally apply for the methods of the fourth to eight aspects.

DETAILED DESCRIPTION OF THE INVENTION

Before the present invention is described in more detail, the following definitions are introduced.

1. Definitions

As used in the specification and the claims, the singular forms of "a" and "an" also include the corresponding plurals unless the context clearly dictates otherwise.

The term "about" in the context of the present invention denotes an interval of accuracy that a person skilled in the art will understand to still ensure the technical effect of the feature in question. The term typically indicates a deviation from the indicated numerical value of ±10% and preferably ±5%.

It needs to be understood that the term "comprising" is not limiting. For the purposes of the present invention, the term "consisting of" is considered to be a preferred embodiment of the term "comprising". If hereinafter a group is defined to comprise at least a certain number of embodiments, this is also meant to encompass a group which preferably consists of these embodiments only.

Figure 2:
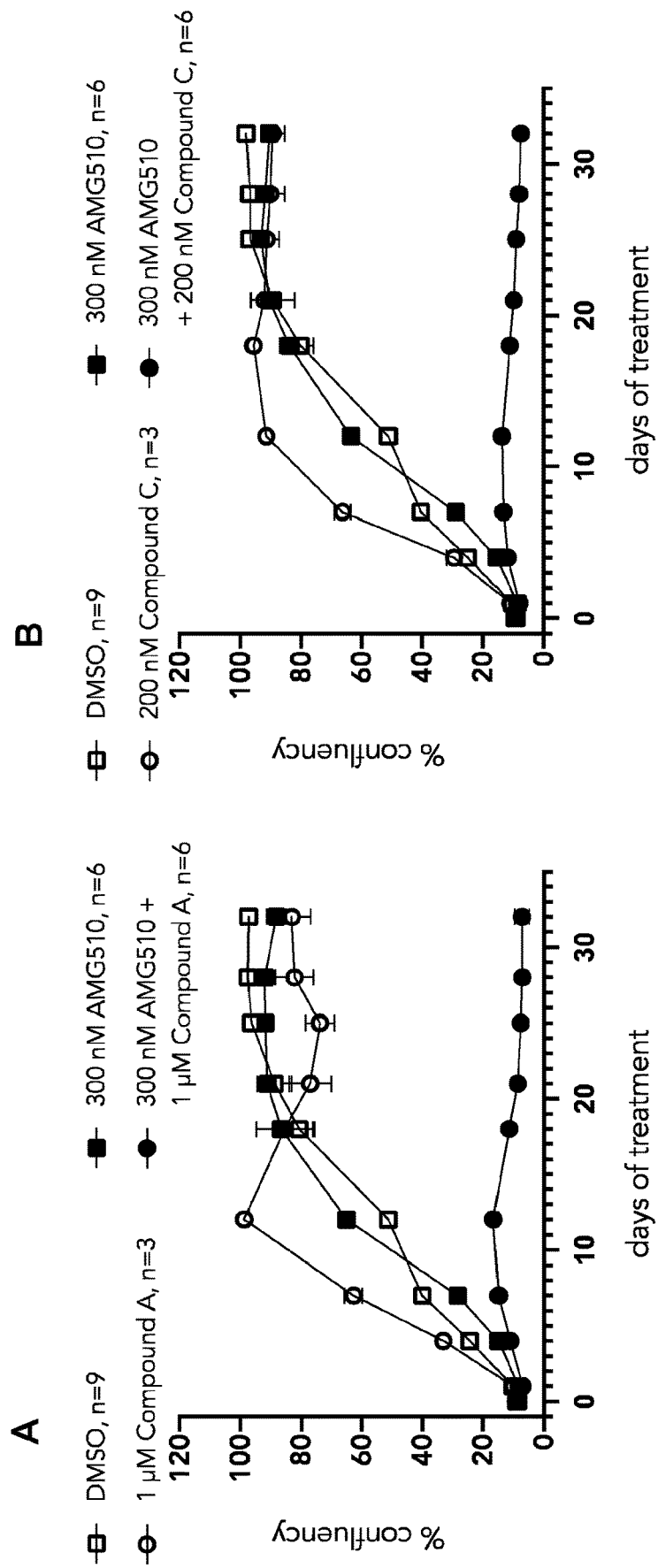
FIG. 2A-E: SNU-1411 confluency over 32 days, wherein the cells were treated as indicated, namely either with DMSO (control), or AMG510 alone or any of the different CBP/p300 bromodomain inhibitors alone, or with a combination of (i) AMG510 and (ii) any of the different CBP/p300 bromodomain inhibitors. Details can be found in example 6.
Figure 2:
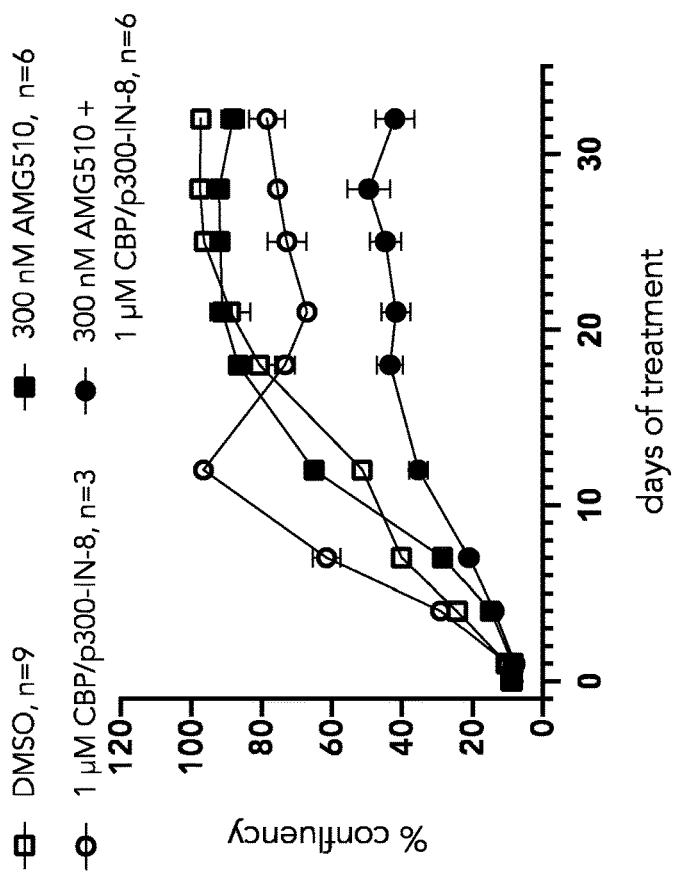
Figure 2:
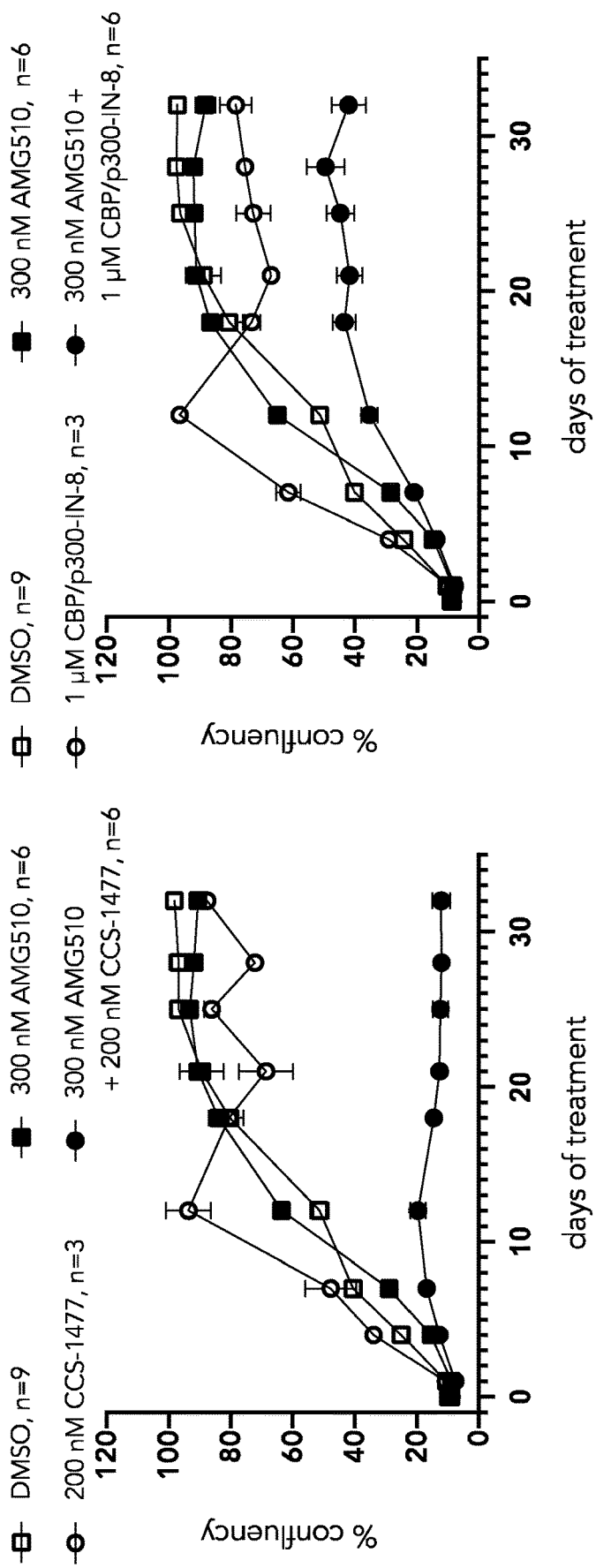
Figures 2, 3:
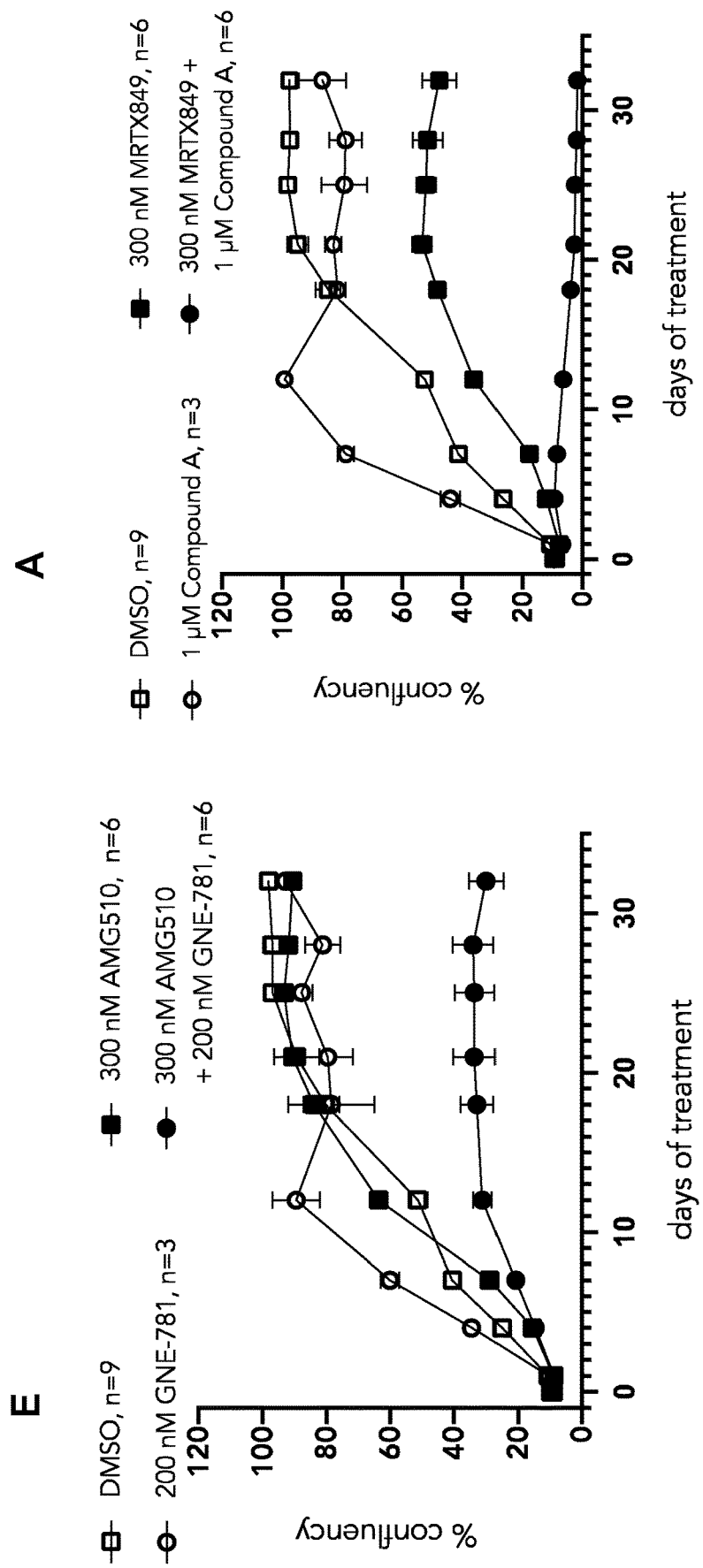
FIG. 3A-E: SNU-1411 confluency over 32 days, wherein the cells were treated as indicated, namely either with DMSO (control), or MRTX849 alone or any of the different CBP/p300 bromodomain inhibitors alone, or with a combination of (i) MRTX849 and (ii) any of the different CBP/p300 bromodomain inhibitors. Details can be found in example 7.
Figure 3:
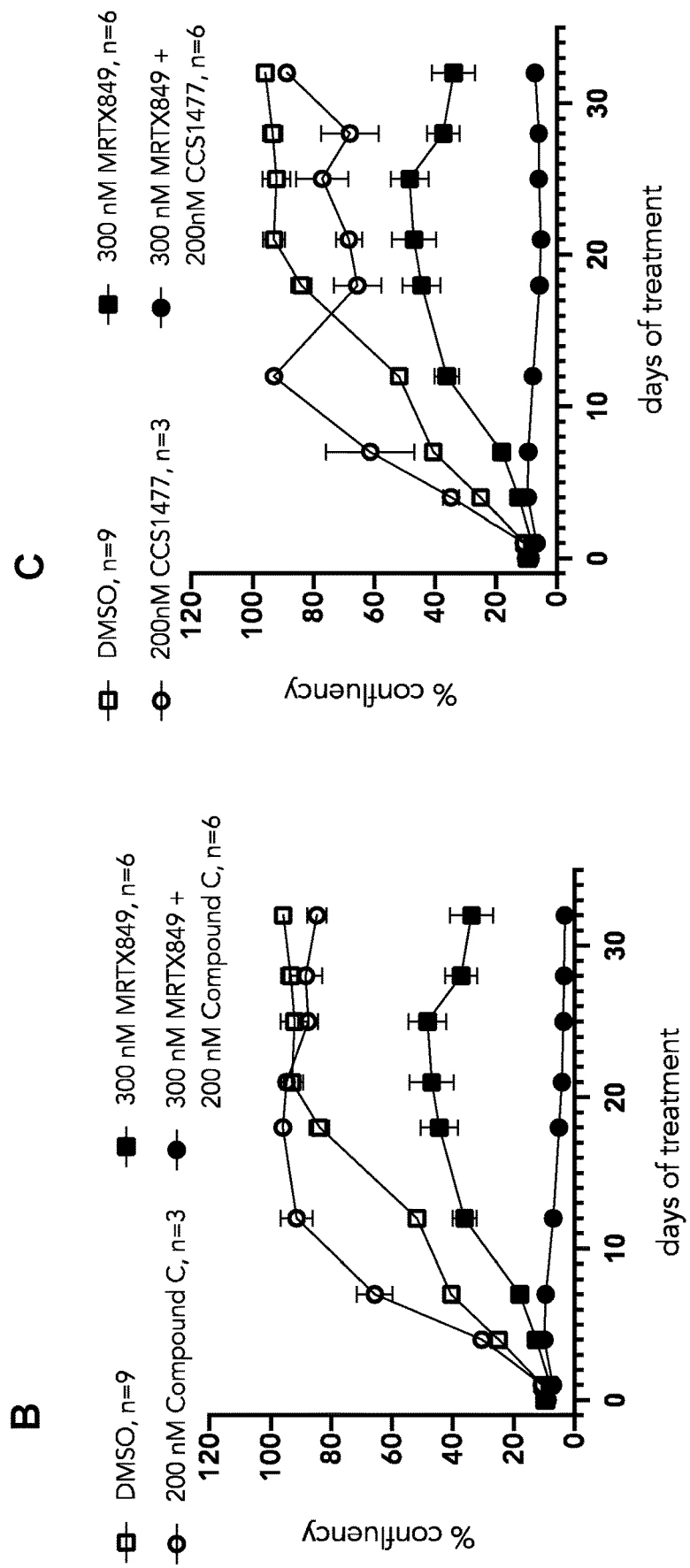
Figure 3:
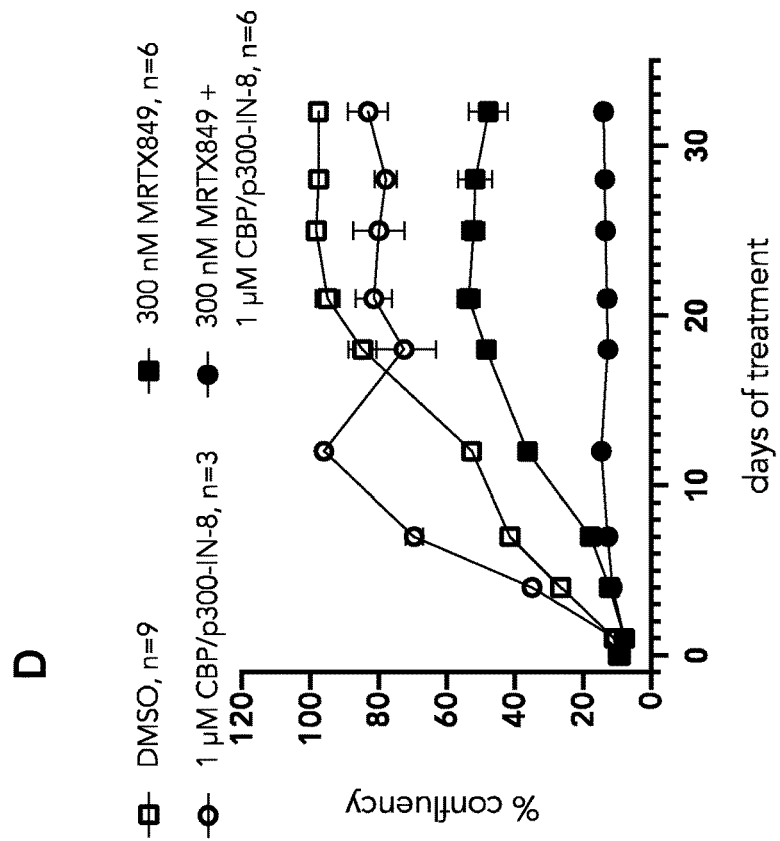
Figure 4:
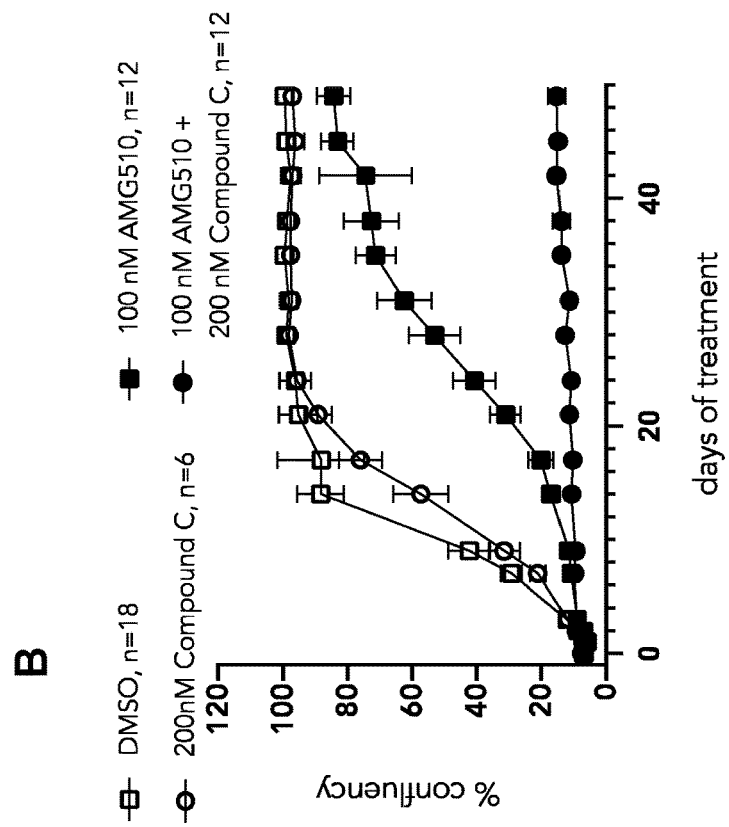
FIG. 4A-E: SW837 confluency over 49 days, wherein the cells were treated as indicated, namely either with DMSO (control), or AMG510 alone or any of the different CBP/p300 bromodomain inhibitors alone, or with a combination of (i) AMG510 and (ii) any of the different CBP/p300 bromodomain inhibitors. Details can be found in example 8.
Figure 4:
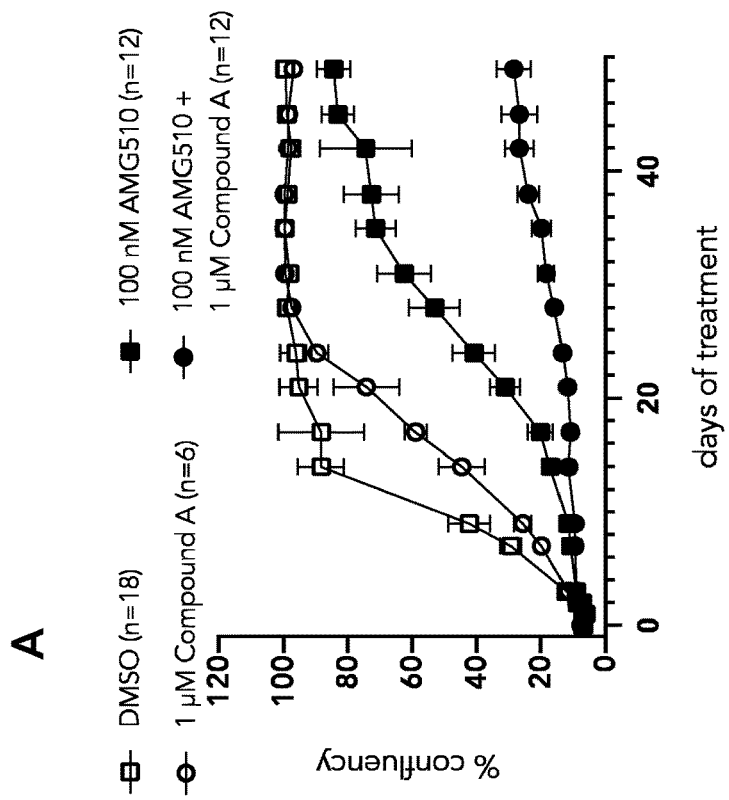
Figure 4:
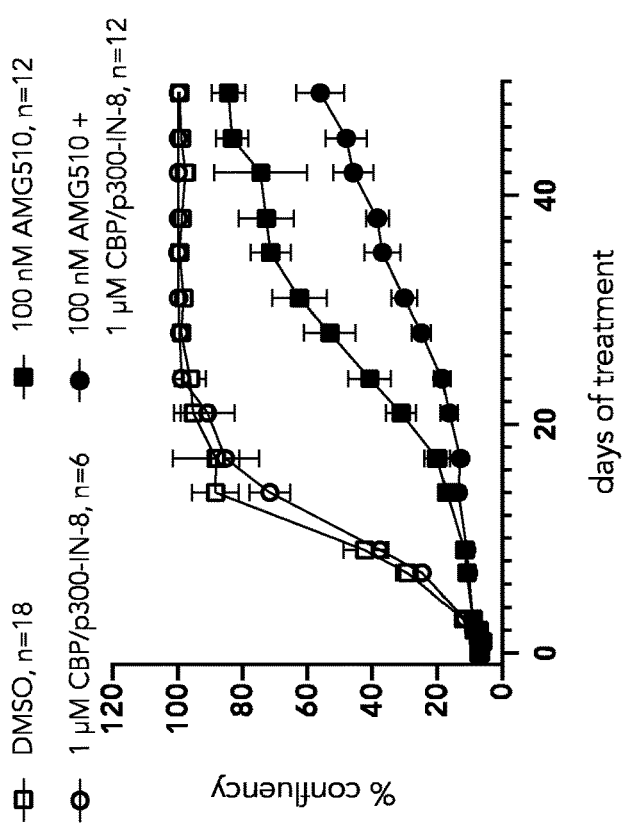
Figure 4:
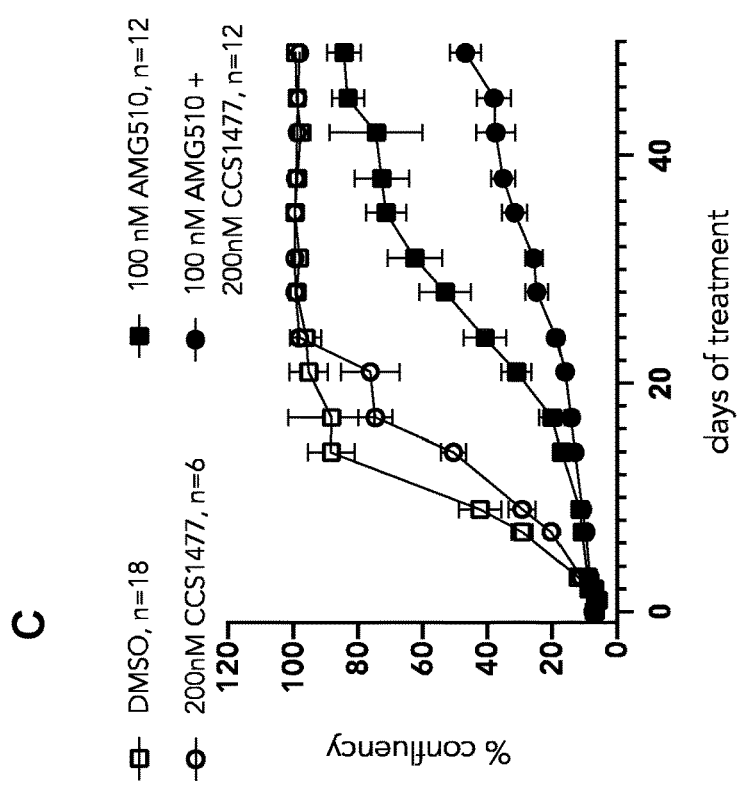
Figure 4:
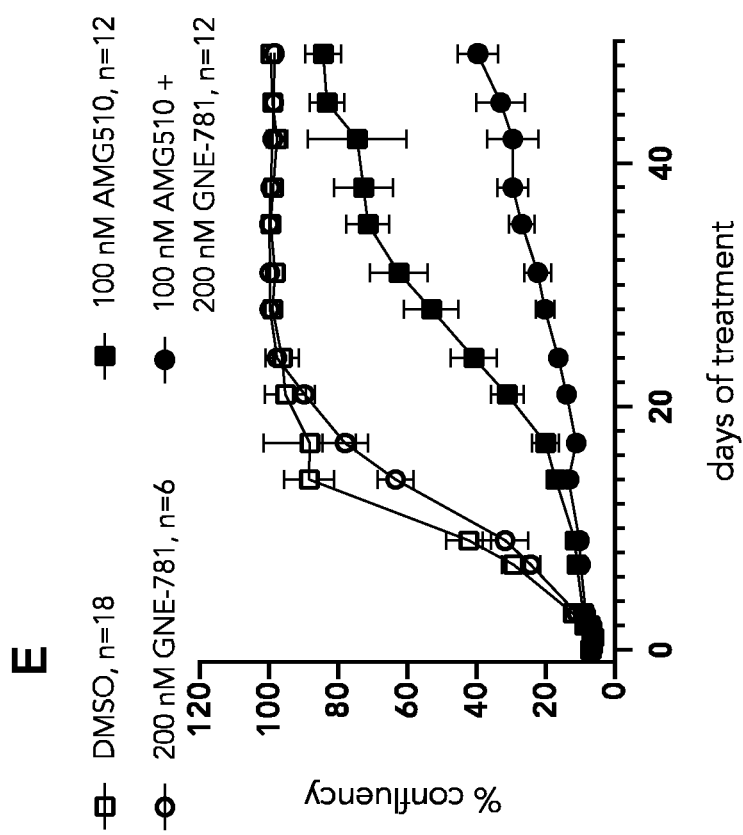

"p300" (also known as EP300 and KAT3B) is a large protein with many different domains that binds to diverse proteins including many DNA-binding transcription factors. The cyclic AMP-responsive element-binding protein (CREB) binding protein "CBP" (also known as CREBBP and KAT3A) is a protein that is very closely related to p300 and the two proteins are commonly referred to as paralogs in view of their extensive sequence identity and functional similarity, and herein as "CBP/p300". CBP/p300 are lysine acetyltransferases that have been shown to catalyze the attachment of an acetyl group to a lysine side chain of histones and other proteins. CBP/p300 have been proposed to activate transcription, wherein the mechanism of action seems to reside in bridging DNA-binding transcription factors to the RNA polymerase machinery or by helping assemble the transcriptional pre-initiation complex. For this purpose, the different CBP/p300 domains are believed to interact with arrays of different transcription factors assembled at promoters and enhancers for transcription of different genes (see Dyson and Wright, JBC Vo. 291, no. 13, pp. 6714-6722, FIG. 2).

One of the multiple domains of CBP/p300 is the bromodomain. The bromodomain as such was first identified in Drosophila in 1992 and described to be a binding module to acetyl-lysine about 10 years later. In humans, there are many bromodomain-containing proteins that may be classified into eight groups based on sequence and structural similarities. It seems that all bromodomain-containing proteins are involved in the regulation of transcriptional programs. Oncogenic rearrangements suggest that targeting bromodomain-containing proteins and more particularly their bromodomains might be beneficial in particular in the treatment of cancer.

For this reason, several drug candidates have been developed that are presently undergoing clinical testing, which target so-called "bromodomain and extra-terminal motif" proteins, typically referred to as BET-proteins, which constitute one group of bromodomain-containing proteins. Examples of BET-protein targeting drugs are INCB054329 (Incyte Corporation), ABBV-075 (AbbVie) and I-BET762 (GlaxoSmithKline). There are also drugs that selectively target the bromodomain of CBP and p300, which are part of a separate group of bromodomain-containing proteins. Such inhibitors include e.g. CCS1477 (CellCentric) which is presently undergoing clinical studies for the treatment of metastatic castration resistant prostate cancer and haematological malignancies or FT-7051 (Forma Therapeutics Inc.) which is presently undergoing studies for the treatment of metastatic castration resistant prostate cancer.

The term "a CBP/p300 bromodomain inhibitor" as used herein means a small molecule that strongly and selectively binds to the bromodomain of CBP and to the bromodomain of p300. This term is synonymous with the terms "a bromodomain inhibitor selectively binding to the bromodomain of CBP/p300" and "a bromodomain inhibitor selective for the inhibition of CBP/p300". "Strong binding" in this respect means a Kd of less than about 300 nM, preferably less than about 100 nM when binding to the bromodomain of CBP and the bromodomain of p300. "Selective binding" in this respect means that the small molecule binds to the bromodomain of CBP and the bromodomain of p300 with a Kd that is at least about 20 fold lower, preferably at least about fold lower, more preferably at least about 50 fold lower and most preferably at least about 70 fold lower than the Kd for binding of any other bromodomain-containing protein or bromodomain of the BROMOscan™, preferably when compared to the further bromodomain-containing proteins or bromodomains indicated by the DiscoveRx Gene Symbols in the Table of example 4 of the present application when carrying out the BROMOscan™ as indicated in example 4. For the comparison, the lowest Kd of any bromodomain-containing protein or bromodomain of the BROMOscan™ except for CBP and p300 is compared to the highest Kd of CBP and p300. Thus, if e.g. the Kd for BRD4 (full-length, short-iso.) is the lowest Kd of all bromodomain-containing proteins or bromodomains except for CBP and p300, and is 7100 nM, this is compared to the Kd for CBP, which is 29 nM (and not to the Kd for p300, which is 12 nM and thus lower than the Kd for CBP). The afore-mentioned example is made for Compound A in the Table of example 4 below.

By the strong and selective binding as outlined above, interactions with interaction partners in the cell that usually take place via the bromodomain of CBP/p300 are inhibited such that the molecule is referred to as "inhibitor". The term "inhibiting interactions" means that preferably no interaction at all (at least not to a detectable level) between the bromodomain of CBP/p300 and an interaction partner takes place anymore. However, when a given interaction between the bromodomain of CBP/p300 and an interaction partner (set to 100%) is greatly reduced, e.g. to a level of about 50%, about 40%, about 30%, preferably about 20%, more preferably about 10% or most preferably about 5% or less, such a reduced interaction is still encompassed by the term "inhibiting interactions". In terms of the medical use of a compound inhibiting an interaction, a complete inhibition of an interaction may not be required to achieve a sufficient therapeutic effect. Thus, it needs to be understood that the term "inhibiting" as used herein also refers to a reduction of an interaction, which is sufficient to achieve a desired effect.

The term "KRAS" as used herein refers to the "Kirsten Rat Sarcoma" protein. KRAS is a GTPase that is an essential mediator of intracellular signaling pathways involved in tumor cell growth and survival. In normal cells, KRAS functions as a molecular switch, alternating between inactive GDP-bound and active GTP-bound states. Transition between these states is facilitated by guanine nucleotide exchange factors (GEFs), which load GTP and activate KRAS, and GTP hydrolysis, which is catalyzed by GTPase-activating proteins (GAPs) to inactivate KRAS. GTP-binding to KRAS promotes binding of effectors to trigger signal transduction pathways including RAF-MEK-ERK (MAPK). Somatic activating mutations in KRAS are a hallmark of cancer and prevent the association of GAPs, thereby stabilizing effector-binding and enhancing KRAS signaling. Patients with KRAS mutant tumors have significantly poorer outcomes and worse prognosis.

The term "KRAS inhibitor" as used herein refers to molecules capable of acting on KRAS such that intracellular downstream signaling, which ultimately results in cell proliferation, is inhibited. The term "inhibited" in this context means that preferably no downstream signaling takes place any more. However, when a given downstream signaling (set to 100%) is greatly reduced, e.g. to a level of about 70%, about 60%, about 50%, about 40%, about 30%, preferably about 20%, more preferably about 10% or most preferably about 5% or less, such a reduced downstream signaling is still encompassed by the term "inhibiting intracellular downstream signaling". In terms of the medical use of a compound inhibiting downstream signaling, a complete inhibition of the signaling may not be required to achieve a sufficient therapeutic effect. Thus, it needs to be understood that the term "inhibiting" as used herein in this context also refers to a reduction of a downstream signaling, which is sufficient to achieve a desired effect A KRAS inhibitor may covalently bind to KRAS, in particular to the cysteine at position 12 in the KRAS G12C. If the KRAS inhibitor targets and/or binds to this cysteine, the inhibitor is typically referred to as "KRAS G12C inhibitor" and examples of such inhibitors are AMG510 (CAS-Nr. 2296729-00-3), MRTX849 (CAS-Nr. 2326521-71-3), JNJ-74699157/ARS-3248, BI 1823911, GDC-6036 and RMC-6291. Very recently, the first KRAS G12C-modulating agent obtained FDA-approval, namely LUMAKRAS (sotorasib corresponding to AMG510 from Amgen) tablets for the treatment of KRAS G12C-mutated locally advanced or metastatic non-small cell lung cancer (NSCLC). Another KRAS G12C-modulating agent is expected to follow soon, namely adagrasib (corresponding to MRTX849 from Mirati Therapeutics). A "KRAS G12D inhibitor" is an inhibitor specific for KRAS G12D, and so on. An example of a KRAS G12D inhibitor is MRTX1133. Alternatively, a KRAS inhibitor may block the interactions of KRAS with other proteins, in particular the KRAS-SOS1 interaction. Such KRAS-SOS1 inhibitors are e.g. BI 1701963 and BAY-293 (CAS Nr. 2244904-70-7). There are also so-called RAS(ON) inhibitors, which bind to the mutated GTP-bound KRAS (e.g. G12C GTP-bound KRAS or G12V GTP-bound KRAS or G12D GTP-bound KRAS or G13D GTP-bound KRAS or Q61H GTP-bound KRAS or Q61L GTP-bound KRAS or Q61R GTP-bound KRAS) and prevent RAF engagement by blocking the effector face of the respective KRAS in that they form a three-component complex between the RAS (ON) inhibitor (a synthetic ligand), KRAS and cyclophilin A (see Revolution Medicines for further details, e.g. WO 2021/091956). RMC-6291 is a RAS$^{G12}$(ON) inhibitor by Revolution Medicines that targets KRAS$^{G12}$ by the aforementioned mechanism. RMC-6236 is a RAS(ON) inhibitor by Revolution Medicines that targets multiple RAS mutations including KRAS mutations by the afore-mentioned mechanism.

The term "wherein the cancer exhibits an oncogenic alteration in the KRAS" as used herein means that the tumor has a mutated version of the KRAS, wherein this mutated version of the KRAS is implicated in the development of the cancer. In other words, the mutated version of the KRAS can be regarded as being linked to or causative of the development of the cancer, optionally amongst other factors. The mutated version of the KRAS is present in the tumor because of an alteration in the KRAS gene, wherein such an alteration is in particular at least one base mutation in the KRAS gene resulting in an amino acid substitution in the KRAS. Corresponding specific alterations are outlined above, wherein a prominent alteration is in particular the KRAS G12C alteration. As noted above, KRAS mutations are present in up to 25% of cancers, wherein the oncogenic variants have different prevalence rates in different cancers (see Box 1 of Mullard, supra).

The term "overactivation" of the KRAS as used herein means that the KRAS is more active compared to the wild-type situation, in particular more active with respect to downstream activation and signaling, thus resulting in cancerous cell growth.

The term "small molecule" as used herein refers to a small organic compound having a low molecular weight. A small molecule in the context of the present invention preferably has a molecular weight of less than 5000 Dalton, more preferably of less than 4000 Dalton, more preferably less than 3000 Dalton, more preferably less than 2000 Dalton or even more preferably less than 1000 Dalton. In a particularly preferred embodiment a small molecule in the context of the present invention has a molecular weight of less than 800 Dalton. In another preferred embodiment, a small molecule in the context of the present invention has a molecular weight of 50 to 3000 Dalton, preferably of 100 to 2000 Dalton, more preferably of 100 to 1500 Dalton and even more preferably of 100 to 1000 Dalton.

The term "treatment" as used herein refers to clinical intervention in order to cure or ameliorate a disease, prevent recurrence of a disease, alleviate symptoms of a disease, diminish any direct or indirect pathological consequences of a disease, achieve a stabilized (i.e., not worsening) state of disease, prevent metastasis, decrease the rate of disease progression, and/or prolong survival as compared to expected survival if not receiving treatment.

The term "treatment cycle" as used herein means that a medicament is administered for a period of time after an initial assessment of the patient's condition, wherein the patient's condition is then typically reassessed before starting another treatment cycle. The details of the CBP/p300 bromodomain inhibitors referred to herein are as follows: The structures of Compound A, Compound C, Compound 00030 and Compound 00071 are shown in the example section of the present application. Further, the synthesis routes for these compounds are shown in the example section of the present application. CC51477 is commercially available e.g. at Aobious and its CAS-no. is 2222941-37-7. GNE-781 is commercially available e.g. at MCE (MedChemExpress) and its CAS-no. is 1936422-33-1. GNE-049 is commercially available e.g. at MCE (MedChemExpress) and its CAS-no. is 1936421-41-8. SGC-CBP30 is commercially available e.g. at MCE (MedChemExpress) and its CAS-no. is 1613695-14-9. CPI-637 is commercially available e.g. at MCE (MedChemExpress) and its CAS-no. is 1884712-47-3. FT-6876 is commercially available e.g. at MCE (MedChemExpress) and its CAS-no. is 2304416-91-7 (FT-6876 is also referred to as "CBP/p300-IN-8"). The structures of Compounds 462, 424 and 515 are depicted below, wherein these structures and the synthesis routes are given in WO 2020/006483 (see in particular pages 33 and 34 for Compound 424, pages 42 and 43 for Compound 462, and pages 47 and 48 for Compound 515):

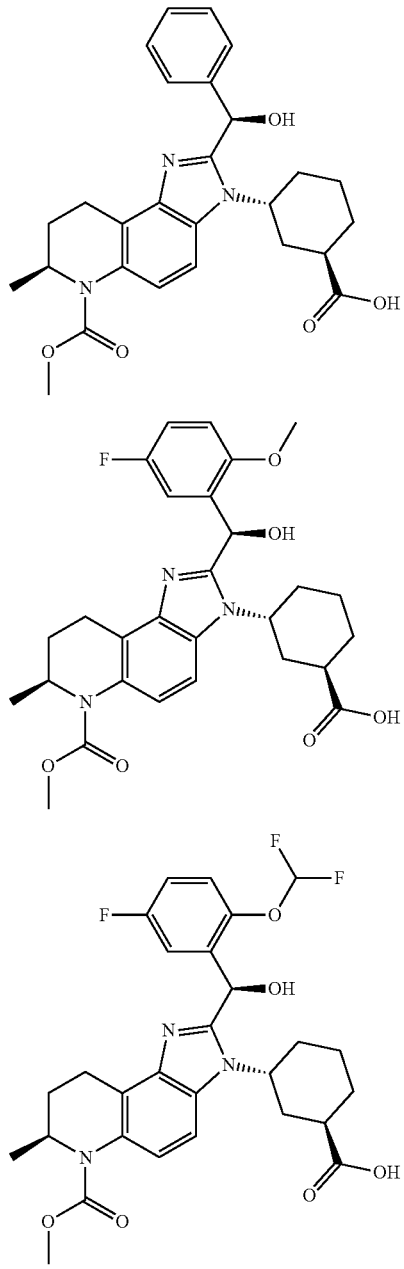

2. The Surprising Findings by the Inventors

The present inventors identified novel compounds that strongly bind to the bromodomain of CBP/p300 and showed that the binding to the bromodomain of CBP/p300 is also selective, as it is well known that there are many proteins that comprise bromodomains.

Figure 1:
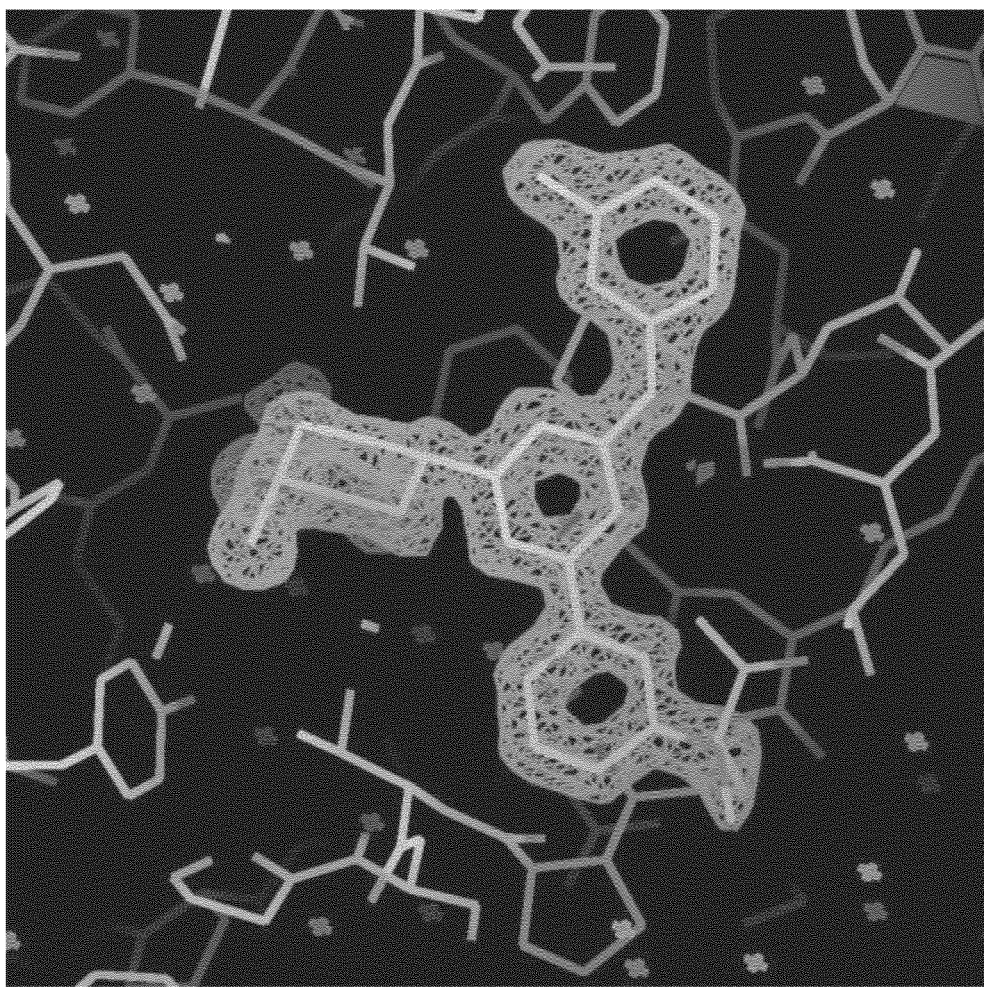
FIG. 1: The initial Fo-Fc difference electron density map of the model (contoured at 4.0σ) resulting from refinement of the initial model prior to modelling of the compound with REFMAC5, in the determination of the crystal structure of the bromodomain of human CREBBP in complex with compound 00004.

CBP/p300 have been identified as central nodes in eukaryotic transcriptional regulatory networks and as interacting with more than 400 transcription factors and other regulatory proteins. CBP/p300 regulate crosstalk and interference between numerous cellular signaling pathways and are targeted by tumor viruses to hjack the cellular regulatory machinery (see Dyson and Wright, supra, page 6714, right column). CBP/p300 are large proteins that contain several domains, as can be derived from FIG. 1 of Dyson and Wright, supra. These domains are the NRID, TAZ1, TAZ2, KIX, CRD1, BRD, CH2 (with a PHD domain and a RING finger domain), HAT, ZZ and NCBD domains. It is already evident from the size of these proteins and their different domains that their cellular functions are very diverse, e.g. by interacting with many different interaction partners due to the variety of interactions that CBP/p300 are capable of. CBP/p300's enzymatic activity as a histone acetyltransferase is located in the HAT domain. As noted above, this enzymatic function is mainly implicated in transcriptional activation. CBP/p300 is also subject to posttranslational modifications, in particular phosphorylation. Their own enzymatic activity as well as the proteins being subject to posttranslational modifications introduces yet another level of complexity to the various functions and effects of CBP/p300. That these functions and effects can even be opposed is nicely summarized in the introductory section of Goodman and Smolk, *Genes & Development* 2000, 141553-1577, where it is stated that one of the major paradoxes in CBP/p300 function is that these proteins appear to be capable of contributing to diametrically opposed cellular processes, and that it appears to be highly context dependent whether CBP/p300 promote apoptosis or cell proliferation. For the implication in diseases and in particular in cancer, this means that the context of the specific disease and specific cancer type will be decisive on how CBP/p300 are involved, if they are involved at all.

In view of the above, it is not surprising that it is not possible to assign a single function to CBP/p300 in a cellular process, which could be influenced e.g. by a general "CBP/p300 inhibitor".

Rather, due to the enormous level of complexity, the dissection of the various functions of CBP/p300 appears only to be possible when investigating the specific domains of CBP/p300, i.e. by analyzing the effects achieved when e.g. inhibiting the enzymatic activity of CBP/p300 in their HAT domains or when rendering specific interactions to interaction partners impossible by blocking (or "inhibiting") certain domains. Furthermore, this must be seen in the respective context, e.g. a specific disease or cancer type, as outlined above.

Thus, the inventors moved on to study their effects in specific contexts, where their inhibitors render interactions with interaction partners via the bromodomain of CBP/p300 impossible, and initially investigated the effect of their inhibitors in non-small cell lung cancer (NSCLC) cells in view of a recent publication by Hou et al. (Hou et al., *BMC Cancer* (2018) 18:641). However, the inventors failed to see an effect on the proliferation of the tested NSCLC cell lines when applying the inhibitor alone. Surprisingly, the inventors found that their CBP/p300 bromodomain inhibitors prolonged the effect of an EGFR inhibitor in NSCLC cells exhibiting an oncogenic alteration in the EGFR compared to the administration of the EGFR inhibitor alone. In other words, while failing to have an effect on its own on the proliferation of NSCLC exhibiting an oncogenic alteration in the EGFR, the CBP/p300 bromodomain inhibitors of the inventors exhibited an effect with an EGFR inhibitor. Further surprisingly, this combination concept found by the inventors turned out to not only work in EGFR signaling and correspondingly with EGFR inhibitors but also with KRAS signaling and KRAS inhibitors, respectively, as will be outlined next.

For their experiments, the inventors used colorectal cancer cell lines (SNU-1411 and SW837, both rectal adenocarcinoma cell lines carrying a KRAS G12C mutation) as well as a NSCLC cell line (NCI-H358, carrying a KRAS G12C mutation). These cell lines may thus be regarded as model system for first-line treatment of patients with cancers that have mutated KRAS, in particular a KRAS G12C mutation. AMG510 and MRTX849, respectively, were used as KRAS inhibitor in combination with the CBP/p300 bromodomain inhibitors (see the examples below).

The observed remarkable proliferation inhibition over long-term incubation for the combination in all tested cell lines is in particular noteworthy since—due to the development of resistance—the proliferation inhibition over time will not remain complete when using a KRAS inhibitor alone. As the data in the experimental section below show, this is the case for AMG510 as well as for MRTX849 when applied alone.

Given the results for their CBP/p300 inhibitors, the inventors went on to investigate whether the observed effect can be generalized to CBP/p300 inhibitors as such. To this aim, further CBP/p300 bromodomain inhibitors were tested, namely CCS1477, FT-6876 and GNE-781. It is noted that the structures of the different sets of CBP/p300 inhibitors that were tested by the inventors are not related such that their feature in common exclusively relates to the effect that is achieved by these inhibitors, namely the selective inhibition of the CBP/p300 bromodomain. The structures of all tested CBP/p300 inhibitors are as follows:

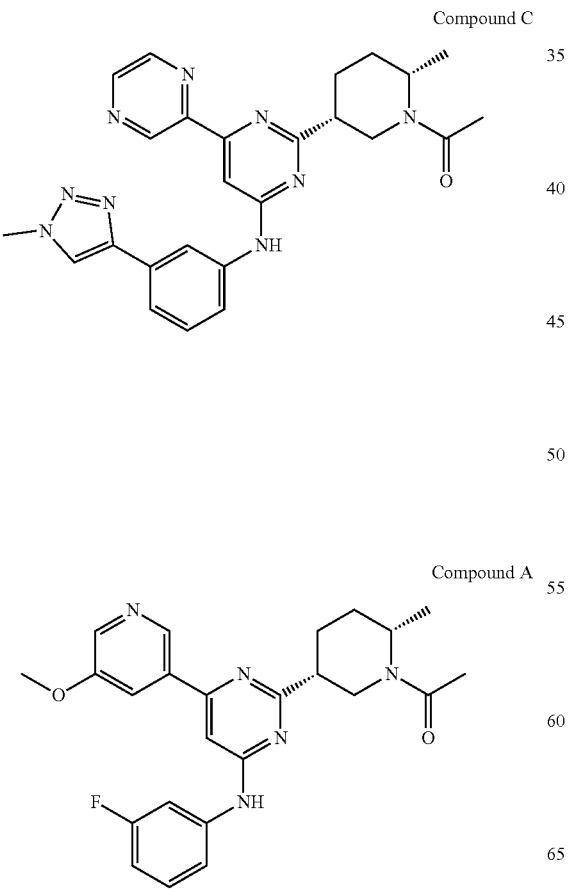

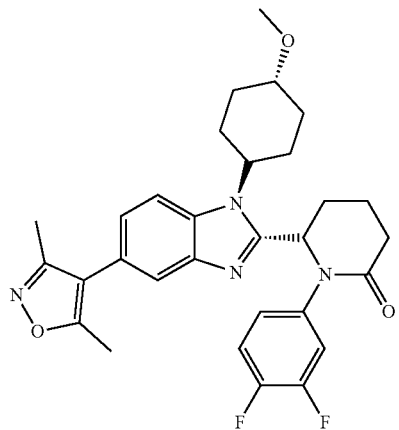

CCS1477

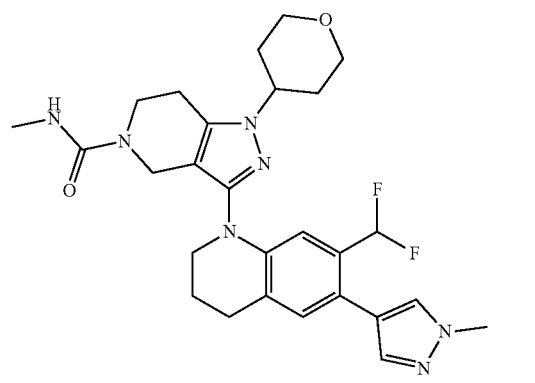

GNE-781

FT-6876

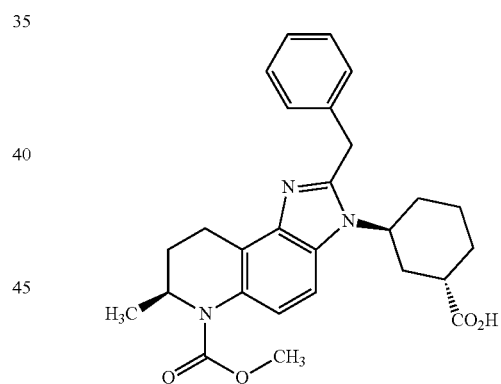

It should also be mentioned that the tested KRAS inhibitors AMG510 and MRTX849 are quite different in their structure but have in common their inhibitory function against KRAS G12C (by acting as covalent inhibitors).

Furthermore, not only a single cancer cell line carrying an oncogenic mutation in KRAS was tested by the inventors, but overall three different cancer cells lines (SNU-1411 and SW837, two rectal adenocarcinoma cell lines, and NCI-H358, a NSCLC cell line) were used.

3. Pharmaceutical Composition of the Compound of the Present Invention

The "CBP/p300 bromodomain inhibitor" and the "KRAS inhibitor" are "pharmaceutically active agents" for the use as claimed herein. As noted above, they may either be present in separate dosage forms or comprised in a single dosage form.

"Pharmaceutically active agents" as used herein means that the compounds are potent of modulating a response in a patient, i.e. a human or animal being in vivo. The term "pharmaceutically acceptable excipient" as used herein refers to excipients commonly comprised in pharmaceutical compositions, which are known to the skilled person. Such excipients are exemplary listed below.

In view of the definition "pharmaceutically active agents" as given above, a pharmaceutically acceptable excipient can be defined as being pharmaceutically inactive.

If a marketed KRAS inhibitor is used in combination with the CBP/p300 bromodomain inhibitor, it is preferred that the administration occurs via separate dosage forms and that the KRAS inhibitor is administered in the dosage form and via the administration route that is authorized (this applies e.g. for AMG510 (as approved in LUMAKRAS). The CBP/p300 bromodomain inhibitor may be administered in a dosage form as set out in the following or in a dosage form in which it is currently undergoing clinical testing.

A dosage form for use according to the present invention may be formulated for oral, buccal, nasal, rectal, topical, transdermal or parenteral application. Oral application can be preferred.

Parenteral application can also be preferred and includes intravenous, intramuscular or subcutaneous administration. A dosage form of the present invention may also be designated as formulation or pharmaceutical composition.

In general, a pharmaceutical composition according to the present invention can comprise various pharmaceutically acceptable excipients which will be selected depending on which functionality is to be achieved for the composition. A "pharmaceutically acceptable excipient" in the meaning of the present invention can be any substance used for the preparation of pharmaceutical dosage forms, including coating materials, film-forming materials, fillers, disintegrating agents, release-modifying materials, carrier materials, diluents, binding agents and other adjuvants. Typical pharmaceutically acceptable excipients include substances like sucrose, mannitol, sorbitol, starch and starch derivatives, lactose, and lubricating agents such as magnesium stearate, disintegrants and buffering agents.

The term "carrier" denotes pharmaceutically acceptable organic or inorganic carrier substances with which the active ingredient is combined to facilitate the application. Suitable pharmaceutically acceptable carriers include, for instance, water, salt solutions, alcohols, oils, preferably vegetable oils, polyethylene glycols, gelatin, lactose, amylose, magnesium stearate, surfactants, perfume oil, fatty acid monoglycerides and diglycerides, petroethral fatty acid esters, hydroxymethylcellulose, polyvinylpyrrolidone and the like. The pharmaceutical compositions can be sterilized and if desired, mixed with auxiliary agents, like lubricants, preservatives, stabilizers, wetting agents, emulsifiers, salts for influencing osmotic pressure, buffers, colorings, flavoring and/or aromatic substances and the like which do not deleteriously react with the active compound.

If liquid dosage forms are considered for the present invention, these can include pharmaceutically acceptable emulsions, solutions, suspensions and syrups containing inert diluents commonly used in the art such as water. These dosage forms may contain e.g. microcrystalline cellulose for imparting bulk, alginic acid or sodium alginate as a suspending agent, methylcellulose as a viscosity enhancer and sweeteners/flavouring agents.

For parenteral application, particularly suitable vehicles consist of solutions, preferably oily or aqueous solutions, as well as suspensions, emulsions, or implants. Pharmaceutical formulations for parenteral administration are particularly preferred and include aqueous solutions in water-soluble form. Additionally, suspensions may be prepared as appropriate oily injection suspensions. Suitable lipophilic solvents or vehicles include fatty oils such as sesame oil, or synthetic fatty acid esters, such as ethyl oleate or triglycerides, or liposomes. Aqueous injection suspensions may contain substances which increase the viscosity of the suspension, such as sodium carboxymethyl cellulose, sorbitol, or dextran.

Particularly preferred dosage forms are injectable preparations of a pharmaceutical composition of the present invention. Thus, sterile injectable aqueous or oleaginous suspensions can for example be formulated according to the known art using suitable dispersing agents, wetting agents and/or suspending agents. A sterile injectable preparation can also be a sterile injectable solution or suspension in a non-toxic parenterally acceptable diluent or solvent. Among the acceptable vehicles and solvents that can be used are water and isotonic sodium chloride solution. Sterile oils are also conventionally used as solvent or suspending medium.

Suppositories for rectal administration of a pharmaceutical composition of the present invention can be prepared by e.g. mixing the compound with a suitable non-irritating excipient such as cocoa butter, synthetic triglycerides and polyethylene glycols which are solid at room temperature but liquid at rectal temperature such that they will melt in the rectum and release the active agent from said suppositories.

For administration by inhalation, the pharmaceutical composition comprising a compound according to the present invention may be conveniently delivered in the form of an aerosol spray from pressurized packs or a nebulizer, with the use of a suitable propellant, e.g., dichlorodifluoromethane, trichlorofluoromethane, dichlorotetrafluoroethane, carbon dioxide or other suitable gas. In the case of a pressurized aerosol the dosage unit may be determined by providing a valve to deliver a metered amount. Capsules and cartridges of e.g. gelatin for use in an inhaler or insufflator may be formulated containing a powder mix of the compound and a suitable powder base such as lactose or starch.

Oral dosage forms may be liquid or solid and include e.g. tablets, troches, pills, capsules, powders, effervescent formulations, dragees and granules. Pharmaceutical preparations for oral use can be obtained as solid excipient, optionally grinding a resulting mixture, and processing the mixture of granules, after adding suitable auxiliaries, if desired, to obtain tablets or dragee cores.

Suitable excipients are, in particular, fillers such as sugars, including lactose, sucrose, mannitol, or sorbitol; cellulose preparations such as, for example, maize starch, wheat starch, rice starch, potato starch, gelatin, gum tragacanth, methyl cellulose, hydroxypropylmethyl-cellulose, sodium carboxymethylcellulose, and/or polyvinylpyrrolidone (PVP). If desired, disintegrating agents may be added, such as the cross-linked polyvinyl pyrrolidone, agar, or alginic acid or a salt thereof such as sodium alginate. The oral dosage forms may be formulated to ensure an immediate release of the active agent or a sustained release of the active agent.

4. Further Disclosure and Embodiments

The clinical anti-tumor effect of receptor tyrosine kinase (RTK) inhibitors and other kinase inhibitors is not durable. Resistance to these inhibitors usually develops. More specifically the clinical anti-tumor effect of EGFR inhibitors (EGFRi) is not durable. Resistance to EGFR inhibitors usually develops within 9 to 19 months depending on the therapeutic agent and clinical setting. Therefore it is desirable to develop a mode of cancer treatment that would prevent drug resistance in cancer patients. Historically, most approaches to tackle drug resistance have focused on the genetic drivers of relapsing tumors. In an effort to overcome already established drug resistance, a newly mutated protein that drives tumor regrowth would be therapeutically targeted alone or in combination with the primary cancer drug. One resistance mechanism to EGFRi treatment is the development of a gatekeeper mutation in the EGFR protein—a mutation that renders the EGFRi ineffective. Most commonly this gatekeeper mutation is a T790M mutation. Mutation-specific inhibitors such as Osimertinib are used to overcome established drug resistance to first generation EGFR inhibitors that are not inhibiting mutated EGFR T790M. Another resistance mechanism to EGFRi treatment is bypass signalling which is activated via other receptor tyrosine kinases, for example through the amplification, overexpression or activation of MET, ErbB2, HGF, ErbB3, IGF1R, AXL, NTRK1, BRAF, FGFR3, or FGFR1. Therapeutic interventions to inhibit bypass signalling have been tested in the clinic with mixed results.

Previous disclosures such as patent application WO2018022637, describe the use of CBP/p300 inhibitors as novel cancer therapies, particularly for the treatment of cancers harbouring p300 mutations. WO2011085039 describes methods for treating cancer comprising inhibiting the activity of CBP/p300 histone acetyltransferase (HAT) and the use of CBP/p300 HAT inhibitors for treating a subject having cancer, in particular in combination with DNA damaging chemotherapeutic anti-cancer agents.

There is a need for new effective methods and compositions to prevent the development of cancer drug resistance. This is inter alia addressed by the embodiments of the present section 4.

Embodiment 1: A CBP/p300 bromodomain inhibitor for use in a method of treating cancer in an animal comprising administering to the animal in need thereof, a CBP/p300 bromodomain inhibitor and a receptor tyrosine kinase inhibitor selected from the group consisting of EGFR, ALK, MET, HER2, ROS1, RET, NTRK1 and AXL inhibitor, or a KRas (Kirsten Rat Sarcoma) or BRAF (proto-oncoqene B-Raf and v-Raf murine sarcoma viral oncoqene homoloq B) inhibitor, wherein the cancer comprises an alteration in the corresponding receptor tyrosine kinase or in KRas or BRAF and wherein the CBP/p300 bromodomain inhibitor alone does not slow the progression of the cancer.

Embodiment 2: A CBP/p300 bromodomain inhibitor for use in a method of extending the duration of response to a receptor tyrosine kinase inhibitor or KRas or BRAF inhibitor cancer therapy in an animal, comprising administering to an animal with cancer a CBP/p300 bromodomain inhibitor or a pharmaceutically acceptable salt thereof, wherein the duration of response to the cancer therapy when the CBP/p300 bromodomain inhibitor or a pharmaceutically acceptable salt thereof is administered is extended compared to the duration of response to the cancer therapy in the absence of the administration of the CBP/p300 bromodomain inhibitor or a pharmaceutically acceptable salt thereof, and wherein the receptor tyrosine kinase inhibitor is selected from the group consisting of EGFR, ALK, MET, HER2, ROS1, RET, NTRK1 and AXL inhibitor.

Embodiment 3: A composition for use in the treatment of cancer, said composition comprising a synergistic combination of a CBP/p300 bromodomain inhibitor or a pharmaceutically acceptable salt thereof, and a receptor tyrosine kinase inhibitor selected from the group consisting of an inhibitor of EGFR, ALK, MET, HER2, ROS1, RET, NTRK1 and AXL, or a KRas or BRAF inhibitor, wherein the cancer comprises an alteration in the corresponding receptor tyrosine kinase or KRas or BRAF and wherein the CBP/p300 bromodomain inhibitor alone does not slow the progression of the cancer.

Embodiment 4: A method of inhibiting the growth of a cancer cell comprising administering a CBP/p300 bromodomain inhibitor and a receptor tyrosine kinase inhibitor selected from the group consisting of EGFR, ALK, MET, HER2, ROS1, RET, NTRK1 and AXL inhibitor, or a KRas or BRAF inhibitor and wherein the cancer cell comprises an alteration in the corresponding receptor tyrosine kinase or KRas or BRAF and wherein the CBP/p300 bromodomain inhibitor alone does not inhibit the growth of the cancer cell.

Embodiment 5: The CBP/p300 bromodomain inhibitor or composition for use or method according to any preceding embodiment, wherein the alteration to the receptor tyrosine kinase or to KRas or BRAF is an oncogenic alteration.

Embodiment 6: The CBP/p300 bromodomain inhibitor or composition for use or method according to any preceding embodiment, wherein the receptor tyrosine kinase inhibitor is an EGFR inhibitor.

Embodiment 7: The CBP/p300 bromodomain inhibitor or composition for use or method according to embodiment 6, wherein the alteration to the receptor tyrosine kinase is a mutation in EGFR.

Embodiment 8: The CBP/p300 bromodomain inhibitor or composition for use or method according to any preceding embodiment, wherein the composition or combination of a CBP/p300 bromodomain inhibitor or a pharmaceutically acceptable salt thereof, and receptor tyrosine kinase inhibitor or KRas or BRAF inhibitor, is synergistic in treating cancer, compared to the CBP/p300 inhibitor alone or the receptor tyrosine kinase or KRas or BRAF inhibitor alone.

Embodiment 9: The CBP/p300 bromodomain inhibitor or composition for use or method according to any preceding embodiment, wherein the composition or combination of a CBP/p300 bromodomain inhibitor or a pharmaceutically acceptable salt thereof, and receptor tyrosine kinase inhibitor or KRas or BRAF inhibitor, delays or reduces the risk of resistance of the cancer to the receptor tyrosine kinase inhibitor or Kras or BRAF inhibitor.

Embodiment 10: The CBP/p300 bromodomain inhibitor or composition for use or method according to any preceding embodiment, wherein the CBP/p300 bromodomain inhibitor is administered in an effective amount to prevent resistance of the cancer cell to the receptor tyrosine kinase inhibitor or KRas or BRAF inhibitor.

Embodiment 11: The CBP/p300 bromodomain inhibitor or composition for use or method according to any preceding embodiment, wherein the EGFR inhibitor is selected from the group comprising cetuximab, panitumumab, zalutumumab, nimotuzumab, matuzumab, gefitinib, erlotinib, dacomitinib, lapatinib, neratinib, vandetanib, necitumumab, osimertinib, afatinib, AP26113, EGFR inhibitor (CAS No. 879127-07-8), EGFR/ErbB2/ErbB-4 Inhibitor (CAS No. 881001-19-0), EGFR/ErbB-2 Inhibitor (CAS No. 17924861-4), EGFR inhibitor II (BIBX 1382, CAS No. 196612-93-8), EGFR inhibitor Ill (CAS No. 733009-42-2), EGFR/ErbB-2/ErbB-4 Inhibitor II (CAS No. 944341-54-2) or PKCsII/EGFR Inhibitor (CAS No. 145915-60-2).

Embodiment 12: The CBP/p300 bromodomain inhibitor or composition for use or method according to any preceding embodiment, wherein the CBP/p300 inhibitor is a compound of formula (1)

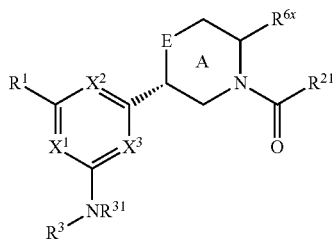

(I)

wherein
R¹ is selected from halogen and -(optionally substituted hydrocarbon group which contains from 1 to 20 carbon atoms and optionally 1 to 15 heteroatoms selected from O, N and S);
R²¹ is selected from hydrogen, -(optionally substituted $C_{1-6}$ alkyl) which may contain one to three oxygen atoms between carbon atoms, and -(optionally substituted $C_{3-6}$ cycloalkyl);
R³ is selected from -(optionally substituted heterocyclyl), -(optionally substituted carbocyclyl), -(optionally substituted $C_{1-6}$alkylene)-(optionally substituted heterocyclyl) and -(optionally substituted $C_{1-6}$ alkylene)-(optionally substituted carbocyclyl);
each of X¹, X² and X³ is independently selected from N, CH and CR$^x$, wherein at least one of said X¹, X² and X³ is N;
R³¹ is selected from -hydrogen, —$C_{1-6}$-alkyl, and —($C_{1-6}$-alkyl substituted with one or more F); wherein R³ and any R³¹ can be optionally linked; and
E is either absent or is selected from —CH₂—, —CHR$^x$—, —CR$^x_2$—, —NH—, —NR$^x$—, —O—, -L¹-L²- and -L²-L¹-, wherein L¹ is selected from —CH₂—, —CHR$^x$—, —CR$^x_2$—, —NH—, —NR$^x$— and —O— and L² is selected from —CH₂—, —CHR$^x$— and —CR$^x_2$—;
R$^{6x}$ is -halogen, —OH, =O, $C_{1-6}$ alkyl, $C_{1-6}$ haloalkyl, $C_{1-6}$ alkyl substituted with one or more OH, monocyclic aryl optionally substituted with one or more R$^{xb}$, monocyclic heteroaryl optionally substituted with one or more R$^{xb}$, monocyclic cycloalkyl optionally substituted with one or more R$^{xb}$, monocyclic heterocycloalkyl optionally substituted with one or more R$^{xb}$, monocyclic cycloalkenyl optionally substituted with one or more R$^{xb}$, monocyclic heterocycloalkenyl optionally substituted with one or more R$^{xb}$, wherein said R$^{xb}$ is independently selected from -halogen, —OH, =O, $C_{1-4}$ alkyl, $C_{1-2}$ haloalkyl, $C_{1-2}$ alkyl substituted with one or two OH;
wherein Ring A may further be substituted with one or more groups R$^x$, wherein any two R$^x$ groups at ring A can be optionally linked and/or any R$^x$ group at ring A can be optionally linked with R²¹; and/or wherein Ring A may be further substituted with one group R$^x$ so as to form together with R$^{6x}$ a bicyclic moiety having the following partial structure:

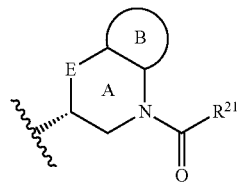

wherein Ring B is an -(optionally substituted heterocycle) or -(optionally substituted carbocycle); each R$^x$ is independently selected from -halogen, —OH, —O-(optionally substituted $C_{1-4}$ alkyl), —NH-(optionally substituted $C_{1-4}$ alkyl), —N(optionally substituted $C_{1-4}$ alkyl)₂, =O, -(optionally substituted $C_{1-4}$ alkyl), -(optionally substituted carbocyclyl), -(optionally substituted heterocyclyl), -(optionally substituted $C_{1-4}$ alkylene)-(optionally substituted carbocyclyl), -(optionally substituted $C_{1-6}$ alkylene)-(optionally substituted heterocyclyl), —O-(optionally substituted $C_{1-6}$ alkylene)-(optionally substituted carbocyclyl), and —O-(optionally substituted $C_{1-4}$ alkylene)-(optionally substituted heterocyclyl), and
wherein the optional substituent of the optionally substituted hydrocarbon group, optionally substituted $C_{3-4}$ cycloalkyl, optionally substituted heterocyclyl, optionally substituted heterocycle, optionally substituted carbocyclyl, optionally substituted carbocycle and optionally substituted $C_{1-6}$ alkylene is independently selected from —($C_{1-6}$ alkyl which is optionally substituted with one or more halogen), -halogen, —CN, —NO₂, oxo, —C(O)R*, —COOR*, —C(O)NR*R*, —NR*R*, —N(R*)—C(O)R*, —N(R*)—C(O)—OR*, —N(R*)—C(O)—NR*R*, —N(R*)—S(O)₂R*, —OR*, —O—C(O)R*, —O—C(O)—NR*R*, —SR*, —S(O)R*, —S(O)₂R*, —S(O)₂—NR*R*, —N(R*)—S(O)₂—NR*R*, heterocyclyl which is optionally substituted with halogen or $C_{1-6}$alkyl, and carbocyclyl which is optionally substituted with halogen or $C_{1-6}$ alkyl; wherein each R* is independently selected from H, $C_{1-6}$ alkyl which is optionally substituted with halogen, heterocyclyl which is optionally substituted with halogen or $C_{1-6}$ alkyl, and carbocyclyl which is optionally substituted with halogen or $C_{1-6}$ alkyl; wherein any two R* connected to the same nitrogen atom can be optionally linked, and
wherein the optional substituent of the optionally substituted $C_{1-6}$ alkyl and of the optionally substituted $C_{1-6}$ alkylene is independently selected from -halogen, —CN, —NO₂, oxo, —C(O)R, —COOR, —C(O)NRR, —NRR, —N(R)—C(O)R, —N(R)—C(O)—OR, —N(R)—C(O)—NRR, —N(R)—S(O)₂R, —OR, —O—C(O)R, —O—C(O)—NRR, —SR, —S(O)R, —S(O)₂R, —S(O)₂—NRR, and —N(R)—S(O)₂—NRR; wherein R is independently selected from H, $C_{1-6}$ alkyl which is optionally substituted with halogen, heterocyclyl which is optionally substituted with halogen or $C_{1-6}$ alkyl, and carbocyclyl which is optionally substituted with halogen or $C_{1-6}$ alkyl; wherein any two R** connected to the same nitrogen atom can be optionally linked.

Embodiment 13: The CBP/p300 bromodomain inhibitor or composition for use or method according to any preceding embodiment, wherein the CBP/p300 inhibitor is an arylimidazolyl isoxazole of formula (A)

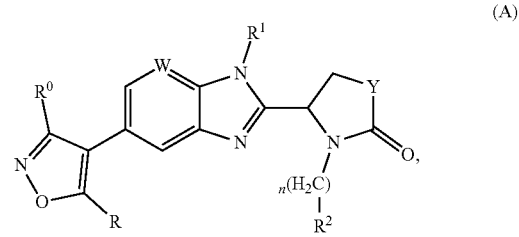

(A)

wherein

R° and R, which are the same or different, are each H or $C_1$-$C_6$alkyl which is unsubstituted or substituted by OH, —OC(O)R' or OR' wherein R' is unsubstituted $C_1$-$C_6$alkyl;

W is N or CH;

$R^1$ is a group which is unsubstituted or substituted and is selected from C-linked 4- to 6-membered heterocyclyl; $C_3$-$C_6$ cycloalkyl; $C_1$-$C_6$ alkyl which is unsubstituted or substituted by $C_6$-$C_{10}$ aryl, 5- to 12-membered N-containing heteroaryl, $C_3$-$C_6$ cycloalkyl, OH, —OC(O)R' or OR' wherein R' is as defined above; and a spiro group of the following formula:

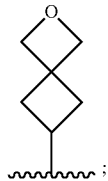 [SMILES: *C1CC2(COC2)C1]

Y is —CH$_2$—, —CH$_2$CH$_2$— or —CH$_2$CH$_2$CH$_2$—;

n is 0 or 1;

$R^2$ is a group selected from $C_6$-$C_{10}$ aryl, 5- to 12-membered N-containing heteroaryl, $C_3$-$C_6$ cycloalkyl and $C_5$-$C_6$ cycloalkenyl, wherein the group is unsubstituted or substituted and wherein $C_6$-$C_{10}$ aryl is optionally fused to a 5- or 6-membered heterocyclic ring;

or a pharmaceutically acceptable salt thereof, and wherein preferably said arylimidazolyl isoxazole has the formula (Aa*):

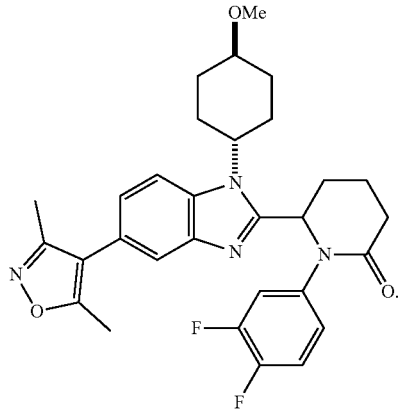

(Aa*; CCS1477 [CAS 2222941-37-7])

Embodiment 14: The CBP/p300 bromodomain inhibitor or composition for use or method according to any preceding embodiment, wherein the CBP/p300 inhibitor is a compound of formula (Ba)

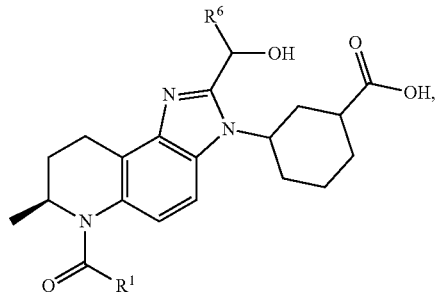

(Ba)

wherein $R^1$ is —O($C_1$-$C_3$alkyl);

$R^6$ is phenyl optionally substituted independently with one or more $R^B$, wherein $R^B$ is selected from —O—$C_{1-6}$alkyl, —O—$C_{3-6}$cycloalkyl, —O-aryl, or —O-heteroaryl, wherein each alkyl, cycloalkyl, aryl or heteroaryl is optionally substituted independently with one or more halogen;

or wherein the CBP/p300 inhibitor is a compound of formula (Bc)

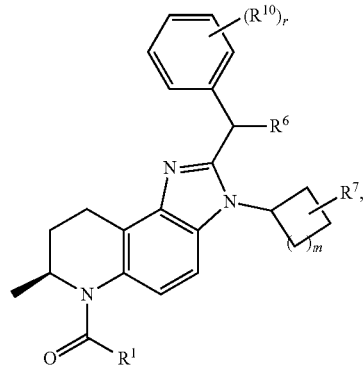

(Bc)

wherein $R^1$ is —OR;

$R^5$ is —$C_{1-6}$alkyl, —$C_{3-8}$cycloalkyl, heterocyclyl, aryl, or heteroaryl;

$R^6$ is —OH, halogen, oxo, —NO$_2$, —CN, —NH2, —$C_{1-6}$alkyl, —$C_{3-8}$cycloalkyl, —$C_{4-8}$cycloalkenyl, heterocyclyl, aryl, spirocycloalkyl, spiroheterocyclyl, heteroaryl, —O$C_{3-6}$cycloalkyl, —Oaryl, —Oheteroaryl, —(CH$_2$)n-OR$^8$, —C(O)R$^8$, —C(O)OR$^8$, or —C(O)NR$^8$R$^9$, —NHC$_{1-6}$alkyl, —N(C$_{1-6}$alkyl)2, —S(O)$_2$NH(C$_{1-6}$alkyl), —S(O)$_2$N(C$_{1-6}$alkyl)$_2$, —S(O)$_2$C$_{1-6}$alkyl, —N(C$_{1-6}$alkyl)SO$_2$C$_{1-6}$alkyl, —S(O)(C$_{1-6}$alkyl), —S(O)N(C$_{1-6}$alkyl)$_2$, or —N(C$_{1-6}$alkyl)S(O)(C$_{1-6}$alkyl), wherein each alkyl, cycloalkyl, cycloalkenyl, heterocyclyl, spirocycloalkyl, spiroheterocyclyl, heteroaryl, or aryl is optionally substituted with one or more $R^{10}$;

$R^7$ is independently, at each occurrence, —H, halogen, —OH, —CN, —OC$_{1-6}$alkyl, —NH$_2$, —NH(C$_{1-6}$alkyl), —N(C$_{1-6}$alkyl)$_2$, —S(O)$_2$H(C$_{1-6}$alkyl), —S(O)$_2$N(C$_{1-6}$alkyl)$_2$, —S(O)$_2$(C$_{1-6}$alkyl, —S(O)$_2$OH, —C(O)C$_{1-6}$alky, —C(O)NH$_2$, —C(O)NH(C$_{1-6}$alkyl), —C(O)N(C$_{1-6}$alkyl)$_2$, —C(O)OH, —C(O)OC$_{1-6}$alkyl, —N(C$_{1-6}$alkyl)SO$_2$C$_{1-6}$ alkyl, —S(O)(C$_{1-6}$alkyl), —S(O)N(C$_{1-6}$alkyl)$_2$, —S(O)$_2$NH$_2$, —N(C$_{1-6}$alkyl)S(O)(C$_{1-6}$alkyl) or tetrazole;

R¹⁰ is independently, at each occurrence, —C₁₋₆alkyl, —C₂₋₆alkenyl, —C₂₋₆alkynyl, —C₃₋₈cycloalkyl, —C₄₋₈cycloalkenyl, heterocyclyl, heteroaryl, aryl, —OH, halogen, oxo, —NO₂, —CN, —NH₂, —OC₁₋₆alkyl, —OC₃₋₆cycloalkyl, —Oaryl, —Oheteroaryl, —NHC₁₋₆alkyl, —N(C₁₋₆alkyl)₂, —S(O)₂NH(C₁₋₆alkyl), —S(O)₂N(C₁₋₆alky)₂, —S(O)₂C₁₋₆alkyl, —C(O)C₁₋₆alkyl, —C(O)NH₂, —C(O)NH(—C₁₋₆alkyl), —NHC(O)C₁₋₆alkyl —C(O)N(C₁₋₆ alkyl)₂, —C(O)OC₁₋₆alkyl, —N(C₁₋₆alkyl)SO2-C₁₋₆alkyl, —S(O)(C₁₋₆alkyl), —S(O)N(C₁₋₆alkyl)₂, or —N(C₁₋₆alkyl)S(O)(C₁₋₆alkyl), wherein each alkyl, alkenyl, alkynyl, cycloalkyl, cycloalkenyl, heterocyclyl, heteroaryl, or aryl is optionally substituted with one or more —R¹²;

R¹² is independently, at each occurrence, halogen;

m is an integer from 0 to 5;

r is an integer from 0 to 5.

Embodiment 15: The CBP/p300 bromodomain inhibitor or composition for use or method according to the preceding embodiment, wherein a slow progression of the cancer is measured using the RECIST 1.1. Response Criteria for target lesions or non-target lesions in the animal.

Embodiment 16: The CBP/p300 bromodomain inhibitor or composition for use or method according to any preceding embodiment, wherein the cancer is non-small cell lung cancer (NSCLC).

Embodiment 17: The CBP/p300 bromodomain inhibitor or composition for use or method according to the preceding embodiment, wherein the CBP/p300 bromodomain inhibitor is a compound of formula (1) of embodiment 12, the receptor tyrosine kinase inhibitor is an EGFR inhibitor, the receptor tyrosine kinase is EGFR and the cancer is NSCLC, more preferably the NSCLC comprises an EGFR T790M mutation, more preferably wherein the receptor tyrosine kinase inhibitor is Osimertinib.

Embodiment 18: The CBP/p300 bromodomain inhibitor or composition for use or method according to the preceding embodiment, wherein the CBP/p300 bromodomain inhibitor is a compound of formula (A) of embodiment 13, preferably CCS1477 (CAS 2222941-37-7), the receptor tyrosine kinase inhibitor is an EGFR inhibitor, the receptor tyrosine kinase is EGFR and the cancer is NSCLC, more preferably the NSCLC comprises an EGFR T790M mutation, more preferably wherein the receptor tyrosine kinase inhibitor is Osimertinib.

As regards the above embodiment 13, it is noted that the compounds of formula (A) has been described in WO2016170324, WO2018073586 and WO2019202332, all applications and their disclosures are incorporated herein by reference in its entirety, in particular with respect to the synthesis of the compounds of formula (A).

In another embodiment, there is provided a method of treating cancer in an animal comprising administering to the animal in need thereof, a CBP/p300 bromodomain inhibitor and a receptor tyrosine kinase inhibitor selected from the group consisting of EGFR, ALK, MET, HER2, ROS1, RET, NTRK1 and AXL inhibitor, or a KRas or BRAF inhibitor, wherein the cancer comprises an alteration in the corresponding receptor tyrosine kinase or KRas or BRAF and wherein the CBP/p300 bromodomain inhibitor alone does not slow the progression of the cancer.

In another embodiment, there is provided a method of treating cancer with a composition, said composition comprising a synergistic combination of a CBP/p300 bromodomain inhibitor or a pharmaceutically acceptable salt thereof, and a receptor tyrosine kinase inhibitor selected from the group consisting of EGFR, ALK, MET, HER2, ROS1, RET, NTRK1 and AXL inhibitor, or a Kras or BRAF inhibitor, wherein the cancer comprises an alteration in the corresponding receptor tyrosine kinase or Kras or BRAF and wherein the CBP/p300 bromodomain inhibitor alone does not slow the progression of the cancer.

In another embodiment, there is provided a method of extending the duration of response to a receptor tyrosine kinase inhibitor or Kras or BRAF inhibitor cancer therapy in an animal, comprising administering to an animal with cancer a CBP/p300 bromodomain inhibitor or a pharmaceutically acceptable salt thereof, wherein the duration of response to the cancer therapy when the CBP/p300 inhibitor or a pharmaceutically acceptable salt thereof is administered is extended compared to the duration of response to the cancer therapy in the absence of the administration of the CBP/p300 inhibitor or a pharmaceutically acceptable salt thereof, and wherein the receptor tyrosine kinase inhibitor is selected from the group consisting of EGFR, ALK, MET, HER2, ROS1, RET, NTRK1 and AXL or is a KRas or BRAF inhibitor.

In another embodiment, there is provided a method for inhibiting growth of a cancer cell which comprises administering to the cancer cell a CBP/p300 bromodomain inhibitor and a receptor tyrosine kinase inhibitor selected from the group consisting of EGFR, ALK, MET, HER2, ROS1, RET, NTRK1 and AXL inhibitor, or a KRas or BRAF inhibitor, wherein the cancer cell comprises an alteration in the corresponding receptor tyrosine kinase or KRas or BRAF and wherein the CBP/p300 bromodomain inhibitor alone does not inhibit the growth of the cancer cell and wherein the CBP/p300 bromodomain inhibitor is administered in an effective amount to prevent resistance of the cancer cell to the kinase inhibitor.

In another embodiment, there is provided a method for inducing cell death in a cancer cell comprising administering to the cancer cell a CBP/p300 bromodomain inhibitor and a receptor tyrosine kinase inhibitor selected from the group consisting of EGFR, ALK, MET, HER2, ROS1, RET, NTRK1 and AXL inhibitor, or a KRas or BRAF inhibitor wherein the cancer cell comprises an alteration in the corresponding receptor tyrosine kinase or KRas or BRAF and wherein the CBP/p300 bromodomain inhibitor alone does not induce cell death in a cancer cell.

In one embodiment, the alteration to the receptor tyrosine kinase may be an oncogenic alteration, wherein the term "oncogenic alteration" in this embodiment of section 4 may refer to the genetic changes to cellular proto-oncogenes. The consequence of these genetic changes/alterations may be to confer a growth advantage to the cell. In one embodiment the genetic mechanisms of mutation, gene amplification, gene fusions and/or chromosome rearrangements may activate oncogenes in human neoplasms.

In another embodiment, the oncogenic alteration is an EGFR gene mutation selected from the group comprising EGFR-Exon 19 deletion, EGFR-L858R, EGFR-T790M, EGFR-T854A, EGFR-D761Y, EGFR-L747S, EGFR-G796S/R, EGFR-L792F/H, EGFR-L718Q, EGFR-exon 20 insertion, EGFR-G719X (where X is any other amino acid), EGFR-L861X, EGFR-S7681, or EGFR amplification. In a preferred embodiment the alteration is EGFR-T790M. In another embodiment the cancer is NSCLC and the alteration is a mutation comprising EGFR Exon 19 deletion, L858R or T790M.

In another embodiment, the oncogenic alteration is a RET gene mutation or rearrangement selected from the group comprising KIF5B-RET, CCDC6-RET, NCOA4-RET, TRIM33-RET, RET-V804L, RET-L730, RET-E732, RET-V738, RET-G810A, RET-Y806, RET-A807 or RET-S904F.

In another embodiment, the oncogenic alteration is a HER2 gene mutation selected from the group comprising HER2 exon 20 insertion or mutation and HER2-C805S, HER2 T798M, HER2 L869R, HER2 G309E, HER2 S310F or HER2 amplification.

In another embodiment, the oncogenic alteration is a ROS1 gene fusion or rearrangement selected from the group comprising CD74-ROS1, GOPC-ROS1, EZR-ROS1, CEP85L-ROS1, SLC34A2-ROS1, SDC4-ROS1, FIG-ROS1, TPM3-ROS1, LRIG3-ROS1, KDELR2-ROS1, CCDC6-ROS1, TMEM106B-ROS1, TPD52L1-ROS1, CLTC-ROS1 and LIMA1-ROS1 or a mutation comprising ROS1 G2032R, D2033N, S1986Y/F, L2026M and/or L1951R.

In another embodiment, the oncogenic alteration is a MET gene amplification, a MET gene mutation such as MET Y1230C, D1227N, D1228V, Y1248H as well as MET exon 14 skipping, or gene fusion or rearrangements selected from the group comprising TPR-MET, CLIP2-MET, TFG-MET Fusion, KIF5B-MET fusion.

In another embodiment, the oncogenic alteration is a KRas gene mutation selected from the group comprising G12C, G12V, G12D, G13D, Q61H or L or R, K117N.

In another embodiment, the oncogenic alteration is an ALK gene mutation or gene fusion or rearrangement selected from the group comprising EML4-ALK, TFG-ALK, KIF5B-ALK, KLC1-ALK, STRN-ALK in NSCLC, EML4-ALK, C2orf44-ALK, EML4-ALK, TPM-ALK, VCL-ALK, TPM3-ALK, EML4-ALK, or VCL-ALK.

In another embodiment, the oncogenic alteration is a BRAF gene mutation selected from the group comprising V600E or V600K.

In another embodiment, the oncogenic alteration is an NTKR gene fusion or rearrangement selected from the group comprising TPM3-NTRK1, ETV6-NTRK3, TPM3-NTRK1, TPR-NTRK1, TFG-NTRK1, PPL-NTRK1, ETV6-NTRK3, TPR-NTRK1, MPRIP-NTRK1, CD74-NTRK1, SQSTM1-NTRK1, TRIM24-NTRK2, LMNA-NTRK, ETV6-NTRK3, BCAN-NTRK1, ETV6-NTRK3, AML, GIST, NFASC-NTRK1, BCAN-NTRK1, AGBL4-NTRK2, VCL-NTRK2, ETV6-NTRK3, BTBD1-NTRK3, RFWD2-NTRK1, RABGAP1L-NTRK1, TP53-NTRK1, AFAP1-NTRK2, NACC2-NTRK2, OKI-NTRK2, PAN3-NTRK2, or an NTKR1 gene mutation selected from the group comprising F589L, G595R, G667C/S, A608D, or an NTRK3 gene mutation selected from the group comprising G623R, G696A.

In another embodiment, the receptor tyrosine kinase inhibitor is an EGFR inhibitor. In another embodiment, the EGFR inhibitor is selected from the group cetuximab, panitumumab, zalutumumab, nimotuzumab, matuzumab, gefitinib, erlotinib, lapatinib, neratinib, vandetanib, necitumumab, osimertinib, afatinib, dacomitinib, AP26113, poziotinib, EGFR inhibitor (CAS No. 879127-07-8), EGFR/ErbB2/ErbB-4 Inhibitor (CAS No. 881001-19-0), EGFR/ErbB-2 Inhibitor (CAS No. 17924861-4), EGFR inhibitor II (BIBX 1382, CAS No. 196612-93-8), EGFR inhibitor Ill (CAS No. 733009-42-2), EGFR/ErbB-2/ErbB-4 Inhibitor II (CAS No. 944341-54-2) or PKCsII/EGFR Inhibitor (CAS No. 145915-60-2).

In another embodiment, the alteration to the receptor tyrosine kinase is a mutation in an EGFR gene.

In another embodiment, the receptor tyrosine kinase inhibitor is an RET inhibitor. In another embodiment, the RET inhibitor is selected from the group comprising Cabozantinib, Vandetanib, Lenvatinib, Alectinib, Apatinib, Ponatinib, LOXO-292, BLU-667, or RXDX-105.

In another embodiment, the receptor tyrosine kinase inhibitor is an HER2 inhibitor. In another embodiment, the HER2 inhibitor is selected from the group comprising trastuzumab, hyaluronidase/trastuzumab fam-trastumzumab deruxtecan, ado-trastuzumab emtansine, lapatinib, neratinib, pertuzumab, tucatinib, poziotinib, or dacomitinib.

In another embodiment, the receptor tyrosine kinase inhibitor is an ROS1 inhibitor. In another embodiment, the ROS1 inhibitor is selected from the group comprising Crizotinib, Ceritinib, Brigatinib, Lorlatinib, Etrectinib, Cabozantinib, DS-6051b, TPX-0005.

In another embodiment, the receptor tyrosine kinase inhibitor is an MET inhibitor. In another embodiment, the MET inhibitor is selected from the group comprising crizotinib, cabozantinib, MGCD265, AMG208, altiratinib, golvatinib, glesantinib, foretinib, avumatinib, tivatinib, savolitinib, AMG337, capmatinib and tepotinib, OMO-1 [JNJ38877618] or anti-MET antibodies onartuzumab and emibetuzumab [LY2875358] or anti-HGF antibodies ficlatuzumab [AV-299] and rilotumumab [AMG102].

In another embodiment, the inhibitor is a KRas inhibitor. In another embodiment, the KRas inhibitor is selected from the group comprising AMG510, MRTX849, JNJ-74699157/ARS-3248, B11701963, BAY-293, or "RAS(ON)" inhibitors.

In another embodiment, the receptor tyrosine kinase inhibitor is an ALK inhibitor. In another embodiment, the ALK inhibitor is selected from the group comprising Crizotinib, Ceritinib, Alectinib, Loratinib or Brigatinib.

In another embodiment, the inhibitor is a BRAF inhibitor. In another embodiment, the BRAF inhibitor is selected from the group comprising Vemurafenib, dabrafenib, encorafenib or any unspecific RAF inhibitor.

In another embodiment, the receptor tyrosine kinase inhibitor is an NTRK inhibitor. In another embodiment, the NTRK inhibitor is selected from the group comprising Entrectinib, larotrectinib (LOXO-101), LOCO-195, DS-6051b, cabozantinib, merestinib, TSR-011, PLX7486, MGCD516, crizotinib, regorafenib, dovitinib, lestaurtinib, BMS-754807, danusertib, ENMD-2076, midostaurin, PHA-848125 AC, BMS-777607, altriratinib, AZD7451, MK5108, PF-03814735, SNS-314, foretinib, nintedanib, ponatinib, ONO-5390556 or TPX-0005.

In another embodiment, the composition or combination of a CBP/p300 bromodomain inhibitor or a pharmaceutically acceptable salt thereof, and receptor tyrosine kinase inhibitor or KRas or BRAF inhibitor, is synergistic in treating cancer, compared to the CBP/p300 inhibitor alone or the receptor tyrosine kinase or KRas or BRAF inhibitor alone. As used in the context of the embodiments of section 4, the term "synergistic" refers to an interaction between two or more drugs that causes the total effect of the drugs to be greater than the sum of the individual effects of each drug. In a preferred embodiment the synergistic effect is an increase in response rate of the animal to the combination of the CBP/p300 bromodomain inhibitor and the receptor tyrosine kinase inhibitor or KRas or BRAF inhibitor. In another embodiment the increase in response rate is measured as an increase in efficacy in the treatment of the cancer.

In another embodiment, the anti-cancer effect provided by the composition or combination of a CBP/p300 bromodomain inhibitor or a pharmaceutically acceptable salt thereof, and receptor tyrosine kinase or Kras or BRAF inhibitor, is greater than the anti-cancer effect provided by a monotherapy with the same dose of the CBP/p300 inhibitor or the receptor tyrosine kinase inhibitor or the KRas or BRAF inhibitor. As used in the context of the embodiments of section 4, the term "anti-cancer" refers to the treatment of malignant or cancerous disease. In another embodiment, the present invention provides a composition for use or method, wherein the anti-cancer effect provided by the composition or combination of a CBP/p300 bromodomain inhibitor or a pharmaceutically acceptable salt thereof, and receptor tyrosine kinase inhibitor or Kras or BRAF inhibitor, is at least 2 fold greater, at least 3 fold greater, at least 5 fold greater, or at least 10 fold greater than the monotherapy alone.

In another embodiment, the composition or combination of a CBP/p300 bromodomain inhibitor or a pharmaceutically acceptable salt thereof, and receptor tyrosine kinase inhibitor or Kras or BRAF inhibitor, delays or reduces the risk of resistance of the cancer to the receptor tyrosine kinase inhibitor or Kras or BRAF inhibitor. As used in the context of the embodiments of section 4, the term "resistance of the cancer" refers to the reduction in effectiveness of a medication; more specifically the term may refer to the development of drug resistance by the cancer cells. In another embodiment, the cancer does not become resistant to the receptor tyrosine kinase inhibitor or Kras or BRAF inhibitor for at least 3 months, 6 months, 9 months, 12 months, 24 months, 48 months, or 60 months. In another embodiment, the CBP/p300 bromodomain inhibitor is administered in an effective amount to prevent resistance of the cancer cell to the receptor tyrosine kinase inhibitor or KRas or BRAF inhibitor.

In another embodiment, the CBP/p300 bromodomain inhibitor inhibits a bromodomain of CBP and/or p300. p300 (also called Histone acetyltransferase p300, E1A binding protein p300, E1A-associated protein p300) and CBP (also known as CREB-binding protein or CREBBP) are two structurally very similar transcriptional co-activating proteins.

As used in the context of the embodiments of section 4, the term "CBP/p300 bromodomain inhibitor" may be regarded as referring to a compound that binds to the CBP bromodomain and/or p300 bromodomain and inhibits and/or reduces a biological activity or function of CBP and/or p300. In some embodiments, CBP/p300 bromodomain inhibitor may bind to the CBP and/or p300 primarily (e.g., solely) through contacts and/or interactions with the CBP bromodomain and/or p300 bromodomain. In some embodiments, CBP/p300 bromodomain inhibitor may bind to the CBP and/or p300 through contacts and/or interactions with the CBP bromodomain and/or p300 bromodomain as well as additional CBP and/or p300 residues and/or domains. In some embodiments, CBP/p300 bromodomain inhibitor may substantially or completely inhibit the biological activity of the CBP and/or p300. In some embodiments, the biological activity may be binding of the bromodomain of CBP and/or p300 to chromatin (e.g., histones associated with DNA) and/or another acetylated protein. In certain embodiments in the context of the embodiments of section 4, an inhibitor may have an IC50 or binding constant of less about 50 μM, less than about 1 μM, less than about 500 nM, less than about 100 nM, less than about 10 nM, or less than about 1 nM. In some embodiments, the CBP/p300 bromodomain inhibitor may bind to and inhibit CBP bromodomain. In some embodiments, the CBP/p300 bromodomain inhibitor may bind to and inhibit p300 bromodomain. In some embodiments the CBP/p300 bromodomain inhibitor may not inhibit histone acetyl transferase activity of CBP/p300.

In one embodiment, the CBP/p300 bromodomain inhibitor is a compound of formula (1). In one embodiment, the CBP/p300 bromodomain inhibitor is a compound of formula (A), preferably CCS1477 (CAS 2222941-37-7). In another embodiment, the CBP/p300 bromodomain inhibitor is FT-7051. In another embodiment the compound of formula (1), the compound of formula (A), preferably CCS1477, or FT-7051 is a daily dose of the drug at a concentration selected from the list comprising 10 mg, 15 mg, 25 mg, 50 mg, 100 mg, 150 mg, or 200 mg. In another embodiment the CCS1477 is administered 2, 3, 4, 5, 6, or 7 days a week. In another embodiment the CCS1477 is administered twice a day. In another embodiment, the administering to the cancer cell comprises contacting the cancer cell with the CBP/p300 inhibitor and the receptor tyrosine kinase inhibitor or KRas or BRAF inhibitor.

In another embodiment, the dosage depends on a variety of factors including the age, weight and condition of the patient and the route of administration. Daily dosages can vary within wide limits and will be adjusted to the individual requirements in each particular case. Typically, however, the dosage adopted for each route of administration when a compound is administered alone to adult humans may be in the range of 0.0001 to 50 mg/kg, most commonly in the range of 0.001 to 10 mg/kg, body weight, for instance 0.01 to 1 mg/kg. Such a dosage may be given, for example, from 1 to 5 times daily. For intravenous injection a suitable daily dose can be from 0.0001 to 1 mg/kg body weight, preferably from 0.0001 to 0.1 mg/kg body weight. A daily dosage can be administered as a single dosage or according to a divided dose schedule.

In another embodiment, a progression of the cancer or duration of response to the cancer therapy may be measured using the RECIST 1.1. response criteria for target lesions or non-target lesions in a subject/animal.

In another embodiment, the term "does not slow progression of the cancer" may be defined in the embodiments of section 4 as the subjects not achieving any RECIST 1.1 clinical response. In another embodiment, the term "does not slow progression of the cancer" may be defined in the embodiments of section 4 as the subjects/animals not achieving a partial RECIST 1.1 clinical response. In another embodiment, the term "does not slow the progression of the cancer" is measured as no objective response rate and/or no increased progression free survival according to RECIST 1.1. In another embodiment, the term "does not slow the progression of the cancer" is measured as a decrease of less than 30% in the sum of the longest diameters of target lesions, taking as reference the baseline sum of the longest diameters of target lesions.

In certain embodiments, the cancer is selected from acoustic neuroma, acute leukemia, acute lymphocytic leukemia, acute myelocytic leukemia, acute t-cell leukemia, basal cell carcinoma, bile duct carcinoma, bladder cancer, brain cancer, breast cancer, bronchogenic carcinoma, cervical cancer, chondrosarcoma, chordoma, choriocarcinoma, chronic leukemia, chronic lymphocytic leukemia, chronic myelocytic leukemia, chronic myelogenous leukemia, colon cancer, colorectal cancer, craniopharyngioma, cystadenocarcinoma, diffuse large B-cell lymphoma, dysproliferative changes, embryonal carcinoma, endometrial cancer, endotheliosarcoma, ependymoma, epithelial carcinoma, erythroleukemia, esophageal cancer, estrogen-receptor positive breast cancer, essential thrombocythemia, Ewing's tumor, fibrosarcoma, follicular lymphoma, germ cell testicular cancer, glioma, glioblastoma, gliosarcoma, heavy chain disease, head and neck cancer, hemangioblastoma, hepatoma, hepatocellular cancer, hormone insensitive prostate cancer, leiomyomacoma, leukemia, liposarcoma, lung cancer, lymphangioendotheliosarcoma, lymphangiosarcoma, lymphoblastic leukemia, lymphoma, lymphoid malignancies of T-cell or B-cell origin, medullary carcinoma, medulloblastoma, melanoma, meningioma, mesothelioma, multiple myeloma, myelogenous leukemia, myeloma, myxosarcoma, neuroblastoma, NUT midline carcinoma (NMC), non-small cell lung cancer (NSCLC), oligodendroglioma, oral cancer, osteogenic sarcoma, ovarian cancer, pancreatic cancer, papillary adenocarcinomas, papillary carcinoma, pinealoma, polycythemia vera, prostate cancer, rectal cancer, renal cell carcinoma, retinoblastoma, rhabdomyosarcoma, sarcoma, sebaceous gland carcinoma, seminoma, skin cancer, small cell lung carcinoma, solid tumors (carcinomas and sarcomas), small cell lung cancer, stomach cancer, squamous cell carcinoma, synovioma, sweat gland carcinoma, thyroid cancer, Waldenstrom's macroglobulinemia, testicular tumors, uterine cancer, and Wilms' tumor. In certain embodiments, the cancer is melanoma, NSCLC, renal, ovarian, colon, pancreatic, hepatocellular, or breast cancer. In certain embodiments of any of the methods, the cancer is lung cancer, breast cancer, pancreatic cancer, colorectal cancer, and/or melanoma. In certain embodiments, the cancer is lung. In certain embodiments, the lung cancer is non-small cell lung cancer NSCLC. In certain embodiments, the cancer is breast cancer. In certain embodiments, the cancer is melanoma. In certain embodiments, the cancer is colorectal cancer.

In another embodiment, the CBP/p300 bromodomain inhibitor and receptor tyrosine kinase inhibitor or KRas or BRAF inhibitor are administered to the animal simultaneously as a single composition. In another embodiment, the CBP/p300 bromodomain inhibitor and receptor tyrosine kinase inhibitor or KRas or BRAF inhibitor are administered to the animal separately. In another embodiment, the CBP/p300 bromodomain inhibitor and receptor tyrosine kinase inhibitor or KRas or BRAF inhibitor are administered to the animal concurrently. In another embodiment, the CBP/p300 bromodomain inhibitor is administered to the animal prior to the receptor tyrosine kinase inhibitor or the KRas or BRAF inhibitor. In another embodiment, the animal is a human.

In an embodiment, the term "effective amount" of an agent, e.g., a pharmaceutical formulation, may refer to an amount effective, at dosages and for periods of time necessary, to achieve the desired therapeutic or prophylactic result. In some embodiments, the effective amount refers to an amount of a CBP/p300 bromodomain inhibitor and receptor tyrosine kinase inhibitor or KRas or BRAF inhibitor that (i) treats the particular disease, condition or disorder, (ii) attenuates, ameliorates or eliminates one or more symptoms of the particular disease, condition, or disorder, or (iii) prevents or delays the onset of one or more symptoms of the particular disease, condition or disorder described herein. In some embodiments, the effective amount of the CBP/p300 bromodomain inhibitor and receptor tyrosine kinase inhibitor or KRas or BRAF inhibitor may reduce the number of cancer cells; may reduce the tumor size; may inhibit (i.e., slow to some extent and preferably stop) cancer cell infiltration into peripheral organs; may inhibit (i.e., slow to some extent and preferably stop) tumor metastasis; may inhibit, to some extent, tumor growth; and/or may relieve to some extent one or more of the symptoms associated with the cancer. For cancer therapy, efficacy can, for example, be measured by assessing the time to disease progression (TTP) and/or determining the response rate (RR). In some embodiments, an effective amount is an amount of a CBP/p300 bromodomain inhibitor and receptor tyrosine kinase inhibitor or KRas or BRAF inhibitor entity described herein sufficient to significantly decrease the activity or number of drug tolerant or drug tolerant persisting cancer cells.

In an embodiment, a compound of the disclosure may be administered to a human or animal patient in conjunction with radiotherapy or another chemotherapeutic agent for the treatment of cancer. In another embodiment, a combination therapy may be provided, where the CBP/P300 inhibitor or RTK inhibitor or KRas or BRAF inhibitor is administered concurrently or sequentially with radiotherapy; or is administered concurrently sequentially or as a combined preparation with another chemotherapeutic agent or agents, for the treatment of cancer. The or each other chemotherapeutic agent will typically be an agent conventionally used for the type of cancer being treated. Classes of chemotherapeutic agents for combination may in an embodiment be e.g. for the treatment of prostate cancer androgen receptor antagonists, for instance Enzalutamide, and inhibitors of CYP17A1 (17a-hydroxylase/C 17,20 lyase), for instance Abiraterone. In other embodiments, other chemotherapeutic agents in combination therapy can include Docetaxel.

In one embodiment, the term "combination" may in the section 4 refer to simultaneous, separate or sequential administration. Where the administration is sequential or separate, the delay in administering the second component should not be such as to lose the beneficial effect of the combination In another embodiment, the response to the CBP/p300 bromodomain inhibitor and receptor tyrosine kinase inhibitor or KRas or BRAF inhibitor is a sustained response. In one embodiment, "sustained response" may refer to the sustained effect on reducing tumor growth after cessation of a treatment. For example, the tumor size may remain to be the same or smaller as compared to the size at the beginning of the administration phase.

In another embodiment, the term "treatment" (and variations such as "treat" or "treating") may refer to clinical intervention in an attempt to alter the natural course of the individual or cell being treated, and can be performed either for prophylaxis or during the course of clinical pathology. Desirable effects of treatment might include one or more of preventing occurrence or recurrence of disease, alleviation of symptoms, diminishment of any direct or indirect pathological consequences of the disease, stabilized (i.e., not worsening) state of disease, preventing metastasis, decreasing the rate of disease progression, amelioration or palliation of the disease state, prolonging survival as compared to expected survival if not receiving treatment and remission or improved prognosis. In certain embodiments, a CBP/p300 bromodomain inhibitor and receptor tyrosine kinase or a KRas or BRAF inhibitor might be used to delay development of a disease or disorder or to slow the progression of a disease or disorder. In an embodiment, those individuals in need of treatment may include those already with the condition or disorder as well as those prone to have the condition or disorder, (for example, through a genetic mutation or aberrant expression of a gene or protein) or those in which the condition or disorder is to be prevented.

In an embodiment, the term "delay" might refer to defer, hinder, slow, retard, stabilize, and/or postpone development of the disease (such as cancer) or resistance of the disease. This delay can be of varying lengths of time, depending on the history of the disease and/or individual being treated. As is evident to one skilled in the art, a sufficient or significant delay can, in effect, encompass prevention, in that the individual does not develop the disease. For example, a late stage cancer, such as development of metastasis, may be delayed.

5. EXAMPLES

The following Examples are merely illustrative and shall describe the present invention in a further way. These Examples shall not be construed to limit the present invention thereto.

The preparation of compounds 00003 (Compound B), 00004 (Compound A), 00030, 00071 and Compound C is described in the following. If deemed helpful, the synthesis route for an intermediate compound and/or a compound close to the afore-mentioned compounds are given.

General Experimental Methods
LCMS Methods:

Method A: Apparatus: Agilent 1260 Bin. Pump: G1312B, degasser; autosampler, ColCom, DAD: Agilent G1315D, 220-320 nm, MSD: Agilent LC/MSD G6130B ESI, pos/neg 100-800, ELSD Alltech 3300 gas flow 1.5 mL/min, gas temp: 40° C.; column: Waters XSelect™ C18, 30×2.1 mm, 3.5p, Temp: 35° C., Flow: 1 mL/min, Gradient $t_0$=5% A, $t_{1.6\ min}$=98% A, $t_{3\ min}$=98% A, Posttime: 1.3 min, Eluent A: 0.1% formic acid in acetonitrile, Eluent B: 0.1% formic acid in water).

Method B: Apparatus: Agilent 1260 Bin. Pump: G1312B, degasser; autosampler, ColCom, DAD: Agilent G1315D, 220-320 nm, MSD: Agilent LC/MSD G6130B ESI, pos/neg 100-800, ELSD Alltech 3300 gas flow 1.5 mL/min, gas temp: 40° C.; column: Waters XSelect™ C18, 50×2.1 mm, 3.5μ, Temp: 35° C., Flow: 0.8 mL/min, Gradient: $t_0$=5% A, $t_{3.5\ min}$=98% A, $t_{6\ min}$=98% A, Posttime: 2 min; Eluent A: 0.1% formic acid in acetonitrile, Eluent B: 0.1% formic acid in water).

Method C: Apparatus: Agilent 1260 Bin. Pump: G1312B, degasser; autosampler, ColCom, DAD: Agilent G1315C, 220-320 nm, MSD: Agilent LC/MSD G6130B ESI, pos/neg 100-800; column: Waters XSelect™ CSH C18, 30×2.1 mm, 3.5μ, Temp: 25° C., Flow 1 mL/min, Gradient: $t_0$=5% A, $t_{1.6\ min}$=98% A, $t_{3\ min}$=98% A, Posttime: 1.3 min, Eluent A: 95% acetonitrile+5% 10 mM ammoniumbicarbonate in water in acetonitrile, Eluent B: 10 mM ammoniumbicarbonate in water (pH=9.5).

Method D: Apparatus: Agilent 1260 Bin. Pump: G1312B, degasser; autosampler, ColCom, DAD: Agilent G1315C, 220-320 nm, MSD: Agilent LC/MSD G6130B ESI, pos/neg 100-800; column: Waters XSelect™ CSH C18, 50×2.1 mm, 3.5μ, Temp: 25° C., Flow: 0.8 mL/min, Gradient: $t_0$=5% A, $t_{3.5\ min}$=98% A, $t_{6\ min}$=98% A, Posttime: 2 min, Eluent A: 95% acetonitrile+5% 10 mM ammoniumbicarbonate in water in acetonitrile, Eluent B: 10 mM ammoniumbicarbonate in water (pH=9.5).

UPLC Methods:

Method A: Apparatus: Agilent Infinity II; Bin. Pump: G7120A, Multisampler, VTC, DAD: Agilent G7117B, 220-320 nm, PDA: 210-320 nm, MSD: Agilent G6135B ESI, pos/neg 100-1000, ELSD G7102A: Evap 40° C., Neb 50° C., gasflow 1.6 mL/min, Column: Waters XSelect CSH C18, 50×2.1 mm, 2.5 μm Temp: 25° C., Flow: 0.6 mL/min, Gradient: $t_0$=5% B, $t_{2\ min}$=98% B, $t_{2.7\ min}$=98% B, Post time: 0.3 min, Eluent A: 10 mM ammonium bicarbonate in water (pH=9.5), Eluent B: acetonitrile.

Method B: Apparatus: Agilent Infinity II; Bin. Pump: G7120A, Multisampler, VTC, DAD: Agilent G7117B, 220-320 nm, PDA: 210-320 nm, MSD: Agilent G6135B ESI, pos/neg 100-1000, ELSD G7102A: Evap 40° C., Neb 40° C., gasflow 1.6 mL/min, Column: Waters XSelect™ CSH C18, 50×2.1 mm, 2.5 μm Temp: 40° C., Flow: 0.6 mL/min, Gradient $t_0$=5% B, $t_{2\ min}$=98% B, $t_{2.7\ min}$=98% B, Post time: 0.3 min, Eluent A: 0.1% formic acid in water, Eluent B: 0.1% formic acid in acetonitrile.

GCMS Methods:

Method A: Instrument: GC: Agilent 6890N G1530N and MS: MSD 5973 G2577A, EI-positive, Det.temp.: 280° C. Mass range: 50-550; Column: RXi-5MS 20 m, ID 180 μm, df 0.18 μm; Average velocity: 50 cm/s; Injection vol: 1 μl; Injector temp: 250° C.; Split ratio: 100/1; Carrier gas: He; Initial temp: 100° C.; Initial time: 1.5 min; Solvent delay: 1.0 min; Rate 75° C./min; Final temp 250° C.; Hold time 4.3 min.

Method B: Instrument: GC: Agilent 6890N G1530N, FID: Det. temp: 300° C. and MS: MSD 5973 G2577A, EI-positive, Det.temp.: 280° C. Mass range: 50-550; Column: Restek RXi-5MS 20 m, ID 180 μm, df 0.18 μm; Average velocity: 50 cm/s; Injection vol: 1 μl; Injector temp: 250° C.; Split ratio: 20/1; Carrier gas: He; Initial temp: 60° C.; Initial time: 1.5 min; Solvent delay: 1.3 min; Rate 50° C./min; Final temp 250° C.; Hold time 3.5 min.

Method C: Instrument: GC: Agilent 6890N G1530N, FID: Det. temp: 300° C. and MS: MSD 5973 G2577A, EI-positive, Det.temp.: 280° C. Mass range: 50-550; Column: Restek RXi-5MS 20 m, ID 180 μm, df 0.18 μm; Average velocity: 50 cm/s; Injection vol: 1 μl; Injector temp: 250° C.; Split ratio: 20/1; Carrier gas: He; Initial temp: 100° C.; Initial time: 1.5 min; Solvent delay: 1.3 min; Rate 75° C./min; Final temp 250° C.; Hold time 4.5 min.

Chiral LC:

Method A: (apparatus: Agilent 1260 Quart. Pump: G1311C, autosampler, ColCom, DAD: Agilent G4212B, 220-320 nm, column: Chiralcel OD-H 250×4.6 mm, Temp: 25° C., Flow: 1 mL/min, Isocratic: 90/10, time: 30 min, Eluent A: heptane, Eluent B: ethanol).

Preparative Reversed Phase Chromatography:

Method A: Instrument type: Reveleris' prep MPLC; Column: Phenomenex LUNA C18 (150×25 mm, 10p); Flow: 40 mL/min; Column temp: room temperature; Eluent A: 0.1% (v/v) formic acid in water, Eluent B: 0.1% (v/v) formic acid in acetonitrile; Gradient: t=0 min 5% B, t=1 min 5% B, t=2 min 30% B, t=17 min 70% B, t=18 min 100% B, t=23 min 100% B; Detection UV: 220/254 nm. Appropriate fractions combined and lyophilized.

Method B: Instrument type: Reveleris' prep MPLC; Column: Waters XSelect™ CSH C18 (145×25 mm, 10μ); Flow: 40 mL/min; Column temp: room temperature; Eluent A: 10 mM ammoniumbicarbonate in water pH=9.0); Eluent B: 99% acetonitrile+1% 10 mM ammoniumbicarbonate in water; Gradient: t=0 min 5% B, t=1 min 5% B, t=2 min 30% B, t=17 min 70% B, t=18 min 100% B, t=23 min 100% B; Detection UV: 220/254 nm. Appropriate fractions combined and lyophilized.

Chiral (Preparative) SFC

Method A: (Column: SFC instrument modules: Waters Prep100q SFC System, PDA: Waters 2998, Fraction Collector: Waters 2767; Column: Phenomenex Lux Amylose-1 (250×20 mm, 5 μm), column temp: 35° C.; flow: 100 mL/min; ABPR: 170 bar; Eluent A: $CO_2$, Eluent B: 20 mM ammonia in methanol; isocratic 10% B, time: 30 min, detection: PDA (210-320 nm); fraction collection based on PDA).

Method B: (Column: SFC instrument modules: Waters Prep100q SFC System, PDA: Waters 2998, Fraction Collector: Waters 2767; Column: Phenomenex Lux Cellulose-1 (250×20 mm, 5 μm), column temp: 35° C.; flow 100 mL/min; ABPR:170 bar Eluent A: $CO_2$, Eluent B: 20 mM ammonia in methanol; isocratic 10% B, time: 30 min, detection: PDA (210-320 nm); fraction collection based on PDA).

Method C: (Column: SFC instrument modules: Waters Prep100q SFC System, PDA: Waters 2998; Column: Chiralpak IC (100×4.6 mm, 5 μm), column temp: 35° C.; flow:

2.5 mL/min; ABPR:170 bar; Eluent A: CO₂, Eluent B: methanol with 20 mM ammonia; t=0 min 5% B, t=5 min 50% B, t=6 min 50% B, detection: PDA (210-320 nm); fraction collection based on PDA).

Method D: (Column: SFC instrument modules: Waters Prep 100 SFC UV/MS directed system; Waters 2998 Photodiode Array (PDA) Detector; Waters Acquity QDa MS detector; Waters 2767 Sample Manager; Column: Waters Torus 2-PlC 130A OBD (250×19 mm, 5 μm); Column temp: 35C; Flow. 70 mL/min; ABPR: 120 bar; Eluent A: C02, Eluent B: 20 mM Ammonia in Methanol; Linear gradient: t=0 mi 10% B, t=4 min 50% B, t=6 m 50% B; Detection: PDA (210-400 nm); Fraction collection based on PDA TIC).

Starting Materials

Standard reagents and solvents were obtained at highest commercial purity and used as such, specific reagents purchased are described below.

| Compound name | Supplier | CAS |
| --- | --- | --- |
| tetrakis(triphenylphosphine)palladium(0) | Sigma-Aldrich | 14221-01-3 |
| 1,1'-bis(diphenylphosphino)ferrocenepalladium(II) dichloride | Sigma-Aldrich | 72287-26-4 |
| 2-dicyclohexylphosphino-2',4',6'-triisopropyl-biphenyl | Sigma-Aldrich | 564483-18-7 |
| bis(triphenylphosphine)palladium(II) dichloride | Fluorochem | 13965-03-2 |
| 2-tributylstannylpyrazine | Combi-Blocks | 205371-27-3 |
| N-acetyl-D-leucine | Accela Chembio | 19764-30-8 |
| methyl 6-methylpiperidine-3-carboxylate | Combi-Blocks | 908245-03-4 |
| 3-bromo-5-fluoroaniline | Combi-Blocks | 134168-97-1 |
| 1-methyl-4-(tributylstannyl)-1H-imidazole | Synthonix | 446285-73-0 |
| 3-fluoro-5-iodoaniline | Combi-Blocks | 660-49-1 |
| 4-(4,4,5,5-tetramethyl-1,3,2-dioxaborolan-2-yl)-1H-pyrazol | Combi-Blocks | 269410-08-4 |
| 3-bromoaniline | Combi-Blocks | 591-19-5 |
| 1,3,5-trimethyl-4-(4,4,5,5-tetramethyl-1,3,2-dioxaborolan-2-yl)-1H-pyrazole | Combi-Blocks | 844891-04-9 |
| 3-fluoro-5-nitrobenzoic acid | Combi-Blocks | 14027-75-9 |
| Acetohydrazide | Combi-Blocks | 1068-57-1 |
| N-(3-dimethylaminopropyl)-N'-ethylcarbodiimide hydrochloride | Fluorochem | 25952-53-8 |
| 1-hydroxy-7-azabenzotriazole | Enamine | 39968-33-7 |
| (methoxycarbonylsulfamoyl)triethylammonium hydroxide (Burgess reagent) | Combi-Blocks | 29684-56-8 |
| 3-nitrophenylacetylene | Combi-Blocks | 3034-94-4 |
| L-ascorbic acid sodium salt | Sigma-Aldrich | 134-03-2 |
| 2-azidopropane, 2.5M in DMF | Enamine | 691-57-6 |
| azidooxetane, 0.5M in MTBE | Enamine | 81764-67-2 |
| azidotrimethylsilane | Acros | 4648-54-8 |
| 1-fluoro-3-iodo-5-nitrobenzene | Combi-Blocks | 3819-88-3 |
| 1-bromo-3-chloro-5-nitrobenzene | Combi-Blocks | 219817-43-3 |
| 2-Iodo-1-methyl-4-nitrobenzene | Fluorochem | 7745-92-8 |
| 3-bromo-5-nitrotoluene | Combi-Blocks | 52488-28-5 |
| 4-bromo-1-methyl-1,2,3-triazole | Combi-Blocks | 13273-53-5 |
| 3-nitrobenzaldehyde | Acros | 99-61-6 |
| 3-nitrophenylacetylene | Combi-Blocks | 3034-94-4 |
| chloro(pentamethylcyclopentadienyl)bis(triphenylphosphine)ruthenium(II) | STREM chemicals | 92361-49-4 |
| tetrabutylammonium fluoride 1.0M solution in THF | Fluorochem | 429-41-4 |
| 3-ethynyl-4-fluoroaniline | Synthonix | 77123-60-5 |
| tert-butyl 3-cyanopiperidine-1-carboxylate | Combi-Blocks | 91419-53-3 |
| Raney ®-Nickel, 50% slurry in water | Acros Organics | 7440-02-0 |
| tris(dibenzylideneacetone)dipalladium(0) | Sigma-Aldrich | 51364-51-3 |
| Xphos | Sigma-Aldrich | 564483-18-7 |
| 2-(tributylstannyl)-pyrimidine | Sigma-Aldrich | 153435-63-3 |
| 10% palladium on activated carbon | ACROS | 7440-05-3 |

SYNTHETIC PROCEDURES FOR KEY INTERMEDIATES

Intermediate 1: 1-5-(4,6-dichloropyrimidin-2-yl)-2-methylpiperidin-1-yl)ethan-1-one

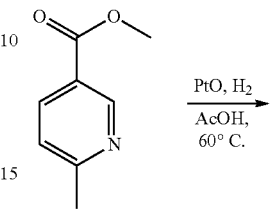

-continued

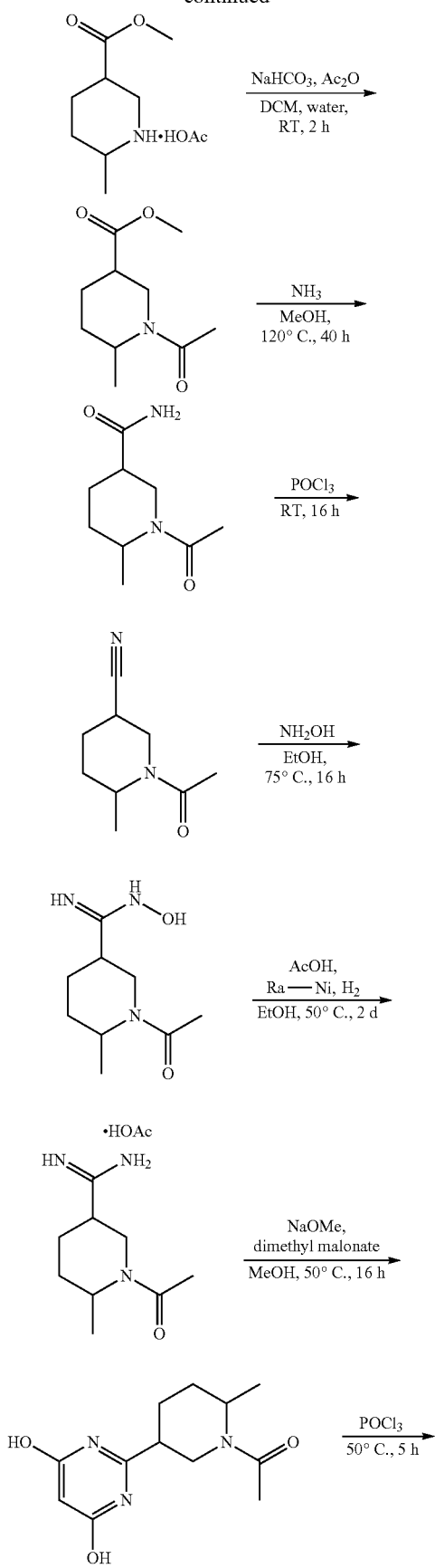

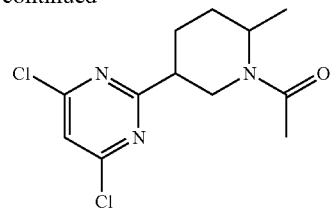

To a solution of methyl 6-methylnicotinate (100 g, 662 mmol) in acetic acid (250 mL) in a 1 L steel autoclave, platinum(IV) oxide (0.5 g, 2.202 mmol) was added after which the reaction mixture was stirred under 10 bar hydrogen atmosphere at 60° C. Rapid hydrogen consumption was observed and the autoclave was refilled several times until hydrogen consumption stopped and the reduction was complete. The mixture was cooled to room temperature and filtrated over Celite. The filtrate was concentrated to afford methyl 6-methylpiperidine-3-carboxylate acetate as a mixture of diastereoisomers (143.8 g, 100%) that was used as such in the next step. GCMS (Method A): tR 2.40 (80%) and 2.48 min (20%), 100%, MS (EI) 157.1 (M)+, 142.1 (M-Me)+. To a solution of methyl 6-methylpiperidine-3-carboxylate acetate (53 g, 244 mmol) in a mixture of water (500 mL) and dichloromethane (500 mL), sodium bicarbonate (82 g, 976 mmol) was added carefully (effervescence!!) after which acetic anhydride (29.9 g, 293 mmol) was added slowly. The reaction mixture was stirred at room temperature for 2 hours. The organic layer was separated, dried over sodium sulfate, filtered and concentrated in vacuo to afford methyl 1-acetyl-6-methylpiperidine-3-carboxylate (49 g, 100%) as a yellow oil. A solution of methyl 1-acetyl-6-methylpiperidine-3-carboxylate (49 g, 246 mmol) in ammonia in methanol (7N, 500 mL, 3.5 mol) was stirred in a pressure vessel at 120° C. for 40 hours. The mixture was cooled to room temperature and concentrated to afford a light yellow solid. This solid was dissolved in dichloromethane and filtered over a plug of silica. The filtrate was concentrated to afford 1-acetyl-6-methylpiperidine-3-carboxamide as an off white solid that was used as such in the next step. A solution of 1-acetyl-6-methylpiperidine-3-carboxamide (266 mmol) from the previous step in phosphorus oxychloride (500 mL, 5.37 mol) was stirred at room temperature for 16 hours. The reaction mixture was evaporated in vacuo affording a thick oil. This oil was co-evaporated twice with toluene and carefully partitioned between cold saturated sodium carbonate (effervescence!) and ethyl acetate. The organic layer was separated from the basic water layer, dried on sodium sulfate, filtered and concentrated in vacuo to afford the product as a thick oil that solidified upon standing. The crude was dissolved in dichloromethane and filtered over a plug of silica (eluted with 10% methanol in dichloromethane).

This afforded 1-acetyl-6-methylpiperidine-3-carbonitrile (28 g, 63%) as an oil that solidified upon standing. GCMS (Method A): tR 3.78 (63%) and 3.89 min (378%), 100%, MS (EI) 166.1 (M)+. To a solution of 1-acetyl-6-methylpiperidine-3-carbonitrile (23 g, 138 mmol) in ethanol (300 ml), hydroxylamine solution (50% in water, 25.4 mL, 415 mmol) was added after which the reaction mixture was stirred at reflux for 16 hours. The reaction mixture was concentrated and co-evaporated with ethyl acetate three times to dryness to afford 1-acetyl-N-hydroxy-6-methylpiperidine-3-carboximidamide as a sticky solid. LCMS (Method A): tR 0.13 min, 100%, MS (ESI) 200.2 (M+H)+. Assuming quantitative yield, the product was used as such in the next step. To a solution of 1-acetyl-N-hydroxy-6-methylpiperidine-3-carboximidamide (23 g, 138 mmol) from the previous step in ethanol (500 mL), acetic acid (23.79 mL, 416 mmol) and 50% Raney®-Nickel slurry in water (5 mL) were added after which the reaction mixture was stirred under hydrogen atmosphere for 2 days at 50° C. The mixture was filtered over Celite, washed with some ethanol and concentrated to afford 70 g of a thick oil. This was co-evaporated twice with ethyl acetate and extensively dried in vacuo to afford 1-acetyl-6-methylpiperidine-3-carboximidamide acetate (33 g, 98%) as a greenish yellow oil that was used as such in the next step. LCMS (Method A): tR 0.14 min, 90%, MS (ESI) 184.1 (M+H)+. To a solution of sodium (18.14 g, 789 mmol) in dry methanol under nitrogen atmosphere (60 mL) 1-acetyl-6-methylpiperidine-3-carboximidamide acetate (32 g, 132 mmol) and dimethyl malonate (26.1 g, 197 mmol) were added, after which the reaction mixture was stirred at 50° C. for 16 hours. The reaction mixture was concentrated, taken up in water (300 mL), acidified to pH 4 using 6N hydrochloric acid and allowed to precipitate. The precipitate was filtered off to afford 1-(5-(4,6-dihydroxypyrimidin-2-yl)-2-methylpiperidin-1-yl)ethan-1-one as a yellow solid (10.4 g, 31%) that was used as such in the next step. A suspension of 1-(5-(4,6-dihydroxypyrimidin-2-yl)-2-methylpiperidin-1-yl)ethan-1-one (10.4 g, 41.4 mmol) in phosphorus oxychloride (200 mL, 2146 mmol) was stirred at 50° C. The solids slowly dissolved after approximately 3 hours. After 5 hours, the reaction mixture was concentrated in vacuo and co-evaporated with toluene twice. The remaining oil was carefully quenched with ice and neutralised with saturated aqueous sodium bicarbonate and extracted with ethyl acetate (2×100 mL). The combined organic layers were dried over sodium sulfate and concentrated in vacuo to afford 1-(5-(4,6-dichloropyrimidin-2-yl)-2-methylpiperidin-1-yl)ethan-1-one (Intermediate 1, 6.8 g, 57%) as a yellow oil that solidified upon standing. LCMS (Method A): tR 1.88 min, 100%, MS (ESI) 288.1 (M+H)+.

Intermediate 2: 1-((2S,5R)-5-(4,6-dichloropyrimidin-2-yl)-2-methylpiperidin-1-yl)ethan-1-one

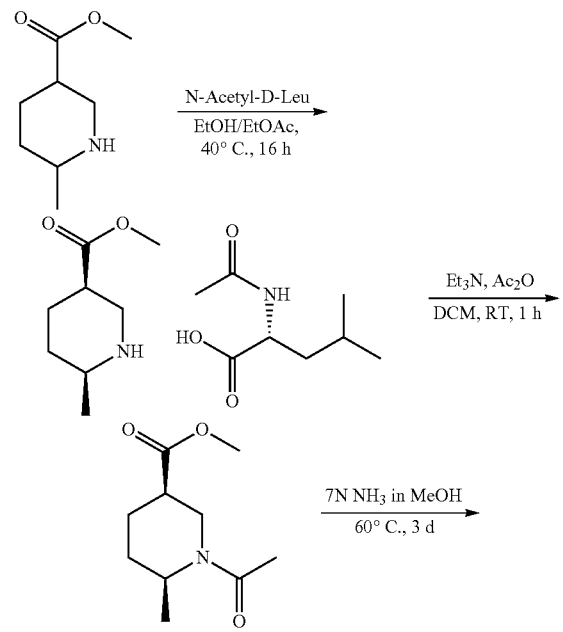

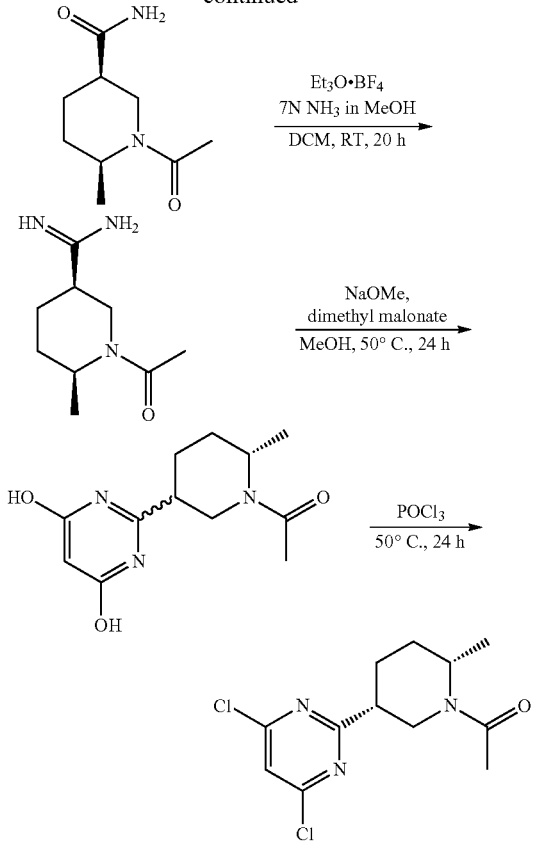

To a solution of N-acetyl-D-leucine (1 kg, 5.77 mol) in ethanol (1.5 L) was added a solution of methyl 6-methylpiperidine-3-carboxylate (934 g, 2.38 mol, prepared under Intermediate 1) in ethyl acetate (3 L) and the mixture was heated to 40° C. The resulting solution was allowed to reach room temperature over 16 hours during which precipitation occurred. The precipitate was filtered off, washed with diethyl ether (500 mL) and air dried to afford crude methyl (3R,6S)-6-methylpiperidine-3-carboxylate acetyl-D-leucinate (287 g, 34%) as a white solid. The crude methyl (3R,6S)-6-methylpiperidine-3-carboxylate acetyl-D-leucinate (287 g, 869 mmol) was crystallised from a hot mixture of ethanol and ethyl acetate 1:2 (1 L). The precipitate was filtered off and the filtercake was triturated in a mixture of diethyl ether and n-pentane 1:1 (500 mL). The precipitate was filtered off and air dried to afford methyl (3R,6S)-6-methylpiperidine-3-carboxylate acetyl-D-leucinate (128 g, 44%) as a white solid. To a solution of methyl (3R,6S)-6-methylpiperidine-3-carboxylate acetyl-D-leucinate (128 g, 387 mmol) in dichloromethane (1 L) was added a saturated sodium carbonate solution (1 L). The biphasic system was stirred vigorous for 10 minutes and the layers were separated. The organic layer was dried with sodium sulfate and filtered to afford a clear solution. Next, triethylamine (65 mL, 465 mmol) and acetic anhydride (44 mL, 465 mmol) were added and the mixture was stirred at room temperature for 1 hour. The mixture was washed with saturated sodium bicarbonate solution, dried over sodium sulfate and concentrated to afford methyl (3R,6S)-1-acetyl-6-methylpiperidine-3-carboxylate (93 g) as a light yellow solid. An autoclave was charged with methyl (3R,6S)-1-acetyl-6-methylpiperidine-3-carboxylate (93 g, 387 mmol) in 7N ammonia in methanol (600 mL, 4200 mmol) and was heated to 60° C. for 3 days. The mixture was concentrated to afford (3R,6S)-1-acetyl-6-methylpiperidine-3-carboxamide (102 g) as a pale yellow oil. Assuming quantitative yield, the product was used as such in the next step. Chiral LC (Method A) tR=12.35 min, >98% ee. To a solution of (3R,6S)-1-acetyl-6-methylpiperidine-3-carboxamide (50 g, 271 mmol) in dichloromethane (500 mL) was added triethyloxonium tetrafluoroborate (77 g, 407 mmol) portion wise and the mixture was stirred at room temperature for 4 hours. Slowly, 7N ammonia in methanol (200 ml, 9.15 mol) was added and the mixture was stirred at room temperature for 16 hours. The mixture was concentrated to afford (3R,6S)-1-acetyl-6-methylpiperidine-3-carboximidamide (50 g) as a pink solid which was used as such in the next step. To a solution of 5.4M sodium methoxide in methanol (99 mL, 535 mmol) in methanol (200 mL) was added, (3R,6S)-1-acetyl-6-methylpiperidine-3-carboximidamide (49 g, 267 mmol) in methanol (400 mL) and dimethyl malonate (61.4 mL, 535 mmol). The mixture was heated to 50° C. and stirred for 24 hours. The mixture was acidified (pH~3) with concentrated hydrochloric acid and was concentrated to a smaller volume. The residue was filtered through silica (20% methanol in dichloromethane) and concentrated to afford an orange oil. The crude product was purified with silica column chromatography (0% to 20% methanol in dichloromethane) to afford 1-((2S,5R)-5-(4,6-dihydroxypyrimidin-2-yl)-2-methylpiperidin-1-yl)ethan-1-one (12 g, 17%) as a colorless gum. LCMS (Method C): tR 0.17 min, 100%, MS (ESI) 252.1 (M+H)+. A solution of 1-((2S,5R)-5-(4,6-dihydroxypyrimidin-2-yl)-2-methylpiperidin-1-yl)ethan-1-one (12 g, 47.8 mmol) in phosphorus oxychloride (80 mL, 858 mmol) was stirred at 60° C. for 24 hours. The reaction mixture was concentrated and co-evaporated with toluene twice to afford a yellow oil. The oil was dissolved in ethyl acetate and washed with saturated sodium bicarbonate solution. The aqueous layer was extracted with ethyl acetate twice. The combined organic layers were washed with brine, dried over sodium sulfate and concentrated to afford a yellow oil. The oil was purified with silica column chromatography (0% to 20% tetrahydrofuran in toluene) to afford 1-((2S,5R)-5-(4,6-dichloropyrimidin-2-yl)-2-methylpiperidin-1-yl)ethan-1-one (Intermediate 2, 1.5 g, 11%) as a colorless gum. LCMS (Method B): tR 3.34 min, 100%, MS (ESI) 288.0 (M+H)+; Chiral UPLC (Method: A) tR 2.54 min, >95% ee and de.

Intermediate 3: Synthesis of 1-((2S,5R)-5-(4-chloro-6-(pyrazin-2-yl)pyrimidin-2-yl)-2-methylpiperidin-1-yl)ethan-1-one

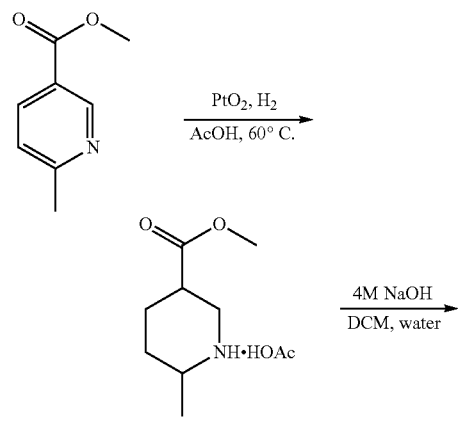

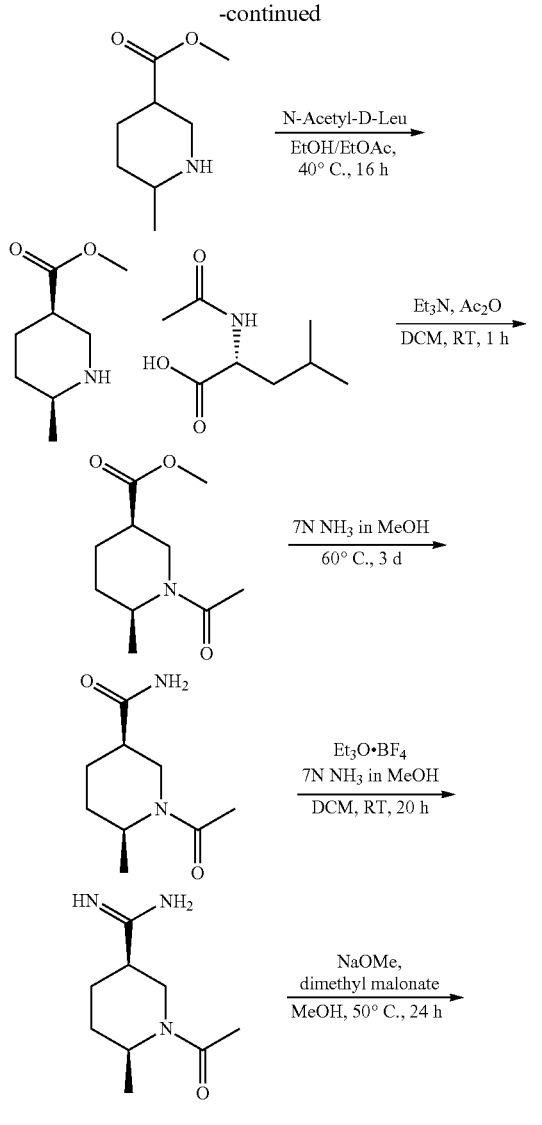

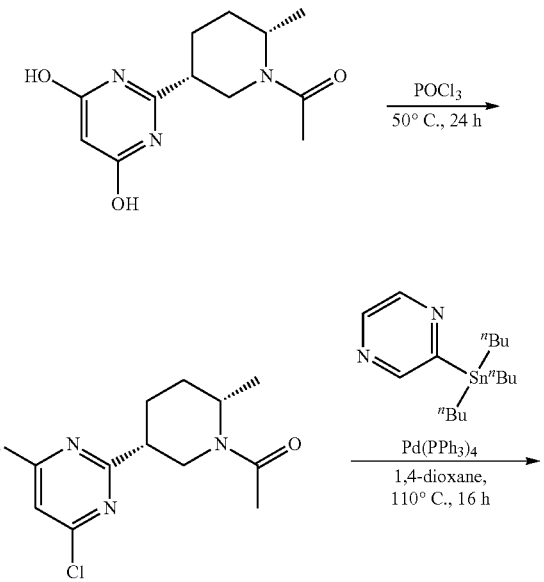

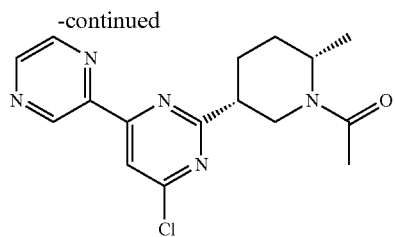

To a solution of methyl 6-methylnicotinate (100 g, 662 mmol) in acetic acid (250 mL) in a 1 L steel autoclave, platinum(IV) oxide (0.5 g, 2.202 mmol) was added after which the reaction mixture was stirred under 10 bar hydrogen atmosphere at 60° C. Rapid hydrogen consumption was observed and the autoclave was refilled several times until hydrogen consumption stopped. The mixture was cooled to room temperature and filtered over Celite. The filtrate was carefully concentrated to afford methyl 6-methylpiperidine-3-carboxylate acetate as a mixture of diastereoisomers (143.8 g, 100%) that was used as such in the next step. GCMS (Method A): $t_R$ 2.40 (80%) and 2.48 min (20%), 100%, MS (EI) 157.1 (M)⁺. Methyl 6-methylpiperidine-3-carboxylate acetate as a mixture of diastereoisomers (2.1 kg, 9924 mmol) was diluted with dichloromethane (4 L) and 4M sodium hydroxide solution was added slowly until pH~9. The layers were separated and the aqueous layer was extracted with dichloromethane twice (the aqueous layer was re-basified with 4M sodium hydroxide solution to pH-9 after each extraction). The combined organic layers were dried with sodium sulfate and concentrated (35° C., 450 mbar) to a smaller volume (~2 L) to afford methyl 6-methylpiperidine-3-carboxylate (2.8 kg, 8905 mmol) as a ~50% yellow solution in dichloromethane. ¹H NMR (400 MHz, CDCl₃, mixture of rotamers) δ 5.10 (s, 3H), 3.63 (s, 1H), 3.49-3.42 (m, 2.2H), 3.41-3.34 (m, 0.8H), 3.18-3.10 (m, 0.8H), 3.09-3.03 (m, 0.2H), 2.64-2.54 (m, 0.8H), 2.53-2.34 (m, 1.2H), 2.30-2.20 (m, 1H), 1.95-1.76 (m, 1H), 1.53-1.36 (m, 1H), 1.35-1.21 (m, 1H), 1.04-0.90 (m, 1H), 0.89-0.84 (m, 0.8H), 0.83-0.76 (m, 2.2H). To a solution of N-acetyl-D-leucine (1 kg, 5.77 mol) in ethanol (1.5 L) was added a solution of methyl 6-methylpiperidine-3-carboxylate (934 g, 2.38 mol) in ethyl acetate (3 L) and the mixture was heated to 40° C. The resulting solution was allowed to reach room temperature over 16 hours during which precipitation occurred. The precipitate was filtered off, washed with diethyl ether (500 mL) and air dried to afford crude methyl (3R,6S)-6-methylpiperidine-3-carboxylate acetyl-D-leucinate (287 g, 34%) as a white solid. The crude methyl (3R,6S)-6-methylpiperidine-3-carboxylate acetyl-D-leucinate (287 g, 869 mmol) was crystallized from a hot mixture of ethanol and ethyl acetate 1:2 (1 L). The precipitate was filtered off and the filter cake was triturated in a mixture of diethyl ether and n-pentane 1:1 (500 mL). The precipitate was filtered off and air dried to afford methyl (3R,6S)-6-methylpiperidine-3-carboxylate acetyl-D-leucinate (128 g, 44%) as a white solid. ¹H-NMR (400 MHz, DMSO-a6) δ 7.80 (d, J=8.2 Hz, 1H), 5.80-5.00 (s, 2H), 4.20-4.04 (m, 1H), 3.63 (s, 3H), 3.32-3.21 (m, 1H), 2.93-2.80 (m, 2H), 2.73-2.65 (m, 1H), 2.04-1.94 (m, 1H), 1.82 (s, 3H), 1.68-1.49 (m, 3H), 1.49-1.37 (m, 2H), 1.30-1.15 (m, 1H), 1.02 (d, J=6.4 Hz, 3H), 0.85 (m, 6H). To a solution of methyl (3R,6S)-6-methylpiperidine-3-carboxylate acetyl-D-leucinate (128 g, 387 mmol) in dichloromethane (1 L) was added a saturated sodium carbonate solution (1 L). The biphasic system was stirred vigorous for 10 minutes and the layers were separated. The organic layer was dried with sodium sulfate and filtered to afford a clear solution. Next, triethylamine (65 mL, 465 mmol) and acetic anhydride (44 mL, 465 mmol) were added and the mixture was stirred at room temperature for 1 hour. The mixture was washed with saturated aqueous sodium bicarbonate solution, dried over sodium sulfate and concentrated to afford methyl (3R,6S)-1-acetyl-6-methylpiperidine-3-carboxylate (93 g) as a light yellow solid. ¹H-NMR (400 MHz, CDCl₃, mixture of rotamers) δ 5.02-4.87 (m, 0.5H), 4.84-4.68 (m, 0.5H), 4.18-4.05 (m, 0.5H), 3.89-3.77 (m, 0.5H), 3.71 (d, J=11.6 Hz, 3H), 3.31-3.18 (m, 0.5H), 2.79-2.67 (m, 0.5H), 2.51-2.31 (m, 1H), 2.11 (d, J=6.7 Hz, 3H), 2.01-1.90 (m, 1H), 1.88-1.55 (m, 3H), 1.33-1.21 (m, 1.5H), 1.20-1.06 (m, 1.5H). An autoclave was charged with methyl (3R,6S)-1-acetyl-6-methylpiperidine-3-carboxylate (93 g, 387 mmol) in 7N ammonia in methanol (600 mL, 4200 mmol) and was heated to 60° C. for 3 days. The mixture was concentrated to afford (3R,6S)-1-acetyl-6-methylpiperidine-3-carboxamide (102 g) as a pale yellow oil. Assuming quantitative yield, the product was used as such in the next step. ¹H-NMR (400 MHz, DMSO-a6, mixture of rotamers) δ 7.38 (s, 1H), 6.89 (d, J=24.7 Hz, 1H), 4.76-4.59 (m, 0.5H), 4.39-4.24 (m, 0.5H), 4.16-4.01 (m, 0.5H), 3.72-3.51 (m, 0.5H), 3.14-2.99 (m, 0.5H), 2.68-2.51 (m, 0.5H), 2.30-2.12 (m, 0.5H), 2.11-1.92 (m, 3.5H), 1.78-1.38 (m, 4H), 1.23-1.11 (m, 1.5H), 1.09-0.94 (m, 1.5H); Chiral LC (Method A) $t_R$=12.35 min, >98% ee. To a solution of (3R,6S)-1-acetyl-6-methylpiperidine-3-carboxamide (50 g, 271 mmol) in dichloromethane (500 mL) was added triethyloxonium tetrafluoroborate (77 g, 407 mmol) portion wise and the mixture was stirred at room temperature for 4 hours. Slowly, 7N ammonia in methanol (200 mL, 9.15 mol) was added and the mixture was stirred at room temperature for 16 hours. The mixture was concentrated to afford (3R,6S)-1-acetyl-6-methylpiperidine-3-carboximidamide (50 g) as a pink solid which was used as such in the next step. To a solution of 5.4M sodium methoxide in methanol (99 mL, 535 mmol) in methanol (200 mL) was added, (3R,6S)-1-acetyl-6-methylpiperidine-3-carboximidamide (49 g, 267 mmol) in methanol (400 mL) and dimethyl malonate (61.4 mL, 535 mmol). The mixture was heated to 50° C. and stirred for 24 hours. The mixture was acidified (pH ~3) with concentrated hydrochloric acid and was concentrated to a smaller volume. The residue was filtered through silica (20% methanol in dichloromethane) and concentrated to afford an orange oil. The crude product was purified with silica column chromatography (0% to 20% methanol in dichloromethane) to afford 1-((2S,5R)-5-(4,6-dihydroxypyrimidin-2-yl)-2-methylpiperidin-1-yl)ethan-1-one (12 g, 17%) as a colorless gum. LCMS (Method C): $t_R$ 0.17 min, 100%, MS (ESI) 252.1 (M+H)⁺. A solution of 1-((2S,5R)-5-(4,6-dihydroxypyrimidin-2-yl)-2-methylpiperidin-1-yl)ethan-1-one (12 g, 47.8 mmol) in phosphorus oxychloride (80 mL, 858 mmol) was stirred at 60° C. for 24 hours. The reaction mixture was concentrated and co-evaporated with toluene twice to afford a yellow oil. The oil was dissolved in ethyl acetate and washed with saturated sodium bicarbonate solution. The aqueous layer was extracted with ethyl acetate twice. The combined organic layers were washed with brine, dried over sodium sulfate and concentrated to afford a yellow oil. The oil was purified with silica column chromatography (0% to 20% tetrahydrofuran in toluene) to afford 1-((2S,5R)-5-(4,6-dichloropyrimidin-2-yl)-2-methylpiperidin-1-yl)ethan-1-one (1.5 g, 11%) as a colorless gum. ¹H-NMR (400 MHz, DMSO-a6, mixture of rotamers) δ 7.95 (d, J=7.3 Hz, 1H), 4.85-4.72 (m, 1H), 4.69-4.62 (m, 1H), 4.23-4.13 (m, 1H), 4.07-3.98 (m, 1H), 3.97-3.88 (m, 1H), 3.00-2.89 (m, 1H), 2.81-2.67 (m, 1H), 2.09-1.72 (m, 7H), 1.71-1.58 (m, 2H), 1.25-1.14 (m, 3H), 1.12-1.05 (m, 2H); LCMS (Method B): $t_R$ 3.34 min, MS (ESI) 288.0 (M+H)+; Chiral UPLC (Method: A) $t_R$ 2.54 min, >95% ee and de. Under argon, 2-tributyl-stannylpyrazine (607 mg, 1.65 mmol), 1-((2S,5R)-5-(4,6-dichloropyrimidin-2-yl)-2-methylpiperidin-1-yl)ethan-1-one (500 mg, 1.74 mmol) and bis(triphenylphosphine)palladium(II) chloride (244 mg, 0.34 mmol) in 1,4-dioxane (20 mL) were heated to 100° C. and stirred for 32 hours. The mixture was diluted with dichloromethane containing 1% triethylamine and coated onto silica. This was purified with silica column chromatography (0% to 40% acetonitrile in dichloromethane containing 1% triethylamine) to afford 1-((2S,5R)-5-(4-chloro-6-(pyrazin-2-yl)pyrimidin-2-yl)-2-methylpiperidin-1-yl)ethan-1-one (Intermediate 3, 134 mg, 18%) as an orange gum. 1H-NMR (400 MHz, DMSO-d6, mixture of rotamers) δ 9.46-9.41 (m, 1H), 8.80-8.76 (m, 1H), 8.65-8.59 (m, 1H), 8.33-8.29 (m, 1H), 7.66-7.59 (m, 1H), 4.86-4.70 (m, 0.5H), 4.27-4.17 (m, 0.5H), 4.09-3.97 (m, 0.5H), 3.55-3.41 (m, 0.5H), 3.06-2.98 (m, 0.5H), 2.88-2.82 (m, 0.5H), 2.10-1.90 (m, 6H), 1.89-1.76 (m, 0.5H), 1.75-1.61 (m, 1.5H), 1.29-1.20 (m, 1.5H), 1.17-1.10 (m, 1.5H); LCMS (Method C): $t_R$ 1.81 min, MS (ESI) 331.1 (M+H)+.

Synthetic Procedures for Final Products

Example 1: Synthesis of 1-((2S,5R)-2-methyl-5-(4-((5-methylpyridin-3-yl)amino)-6-(pyrazin-2-yl)pyrimidin-2-yl)piperidin-1-yl)ethan-1-one (00001) and 1-((2R,5S)-2-methyl-5-(4-((5-methylpyridin-3-yl)amino)-6-(pyrazin-2-yl)pyrimidin-2-yl)piperidin-1-yl)ethan-1-one (00002)

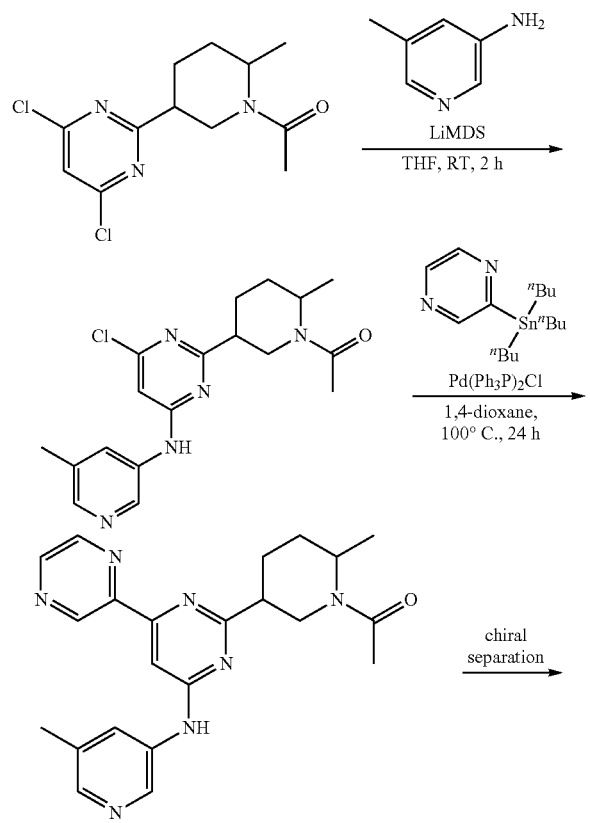

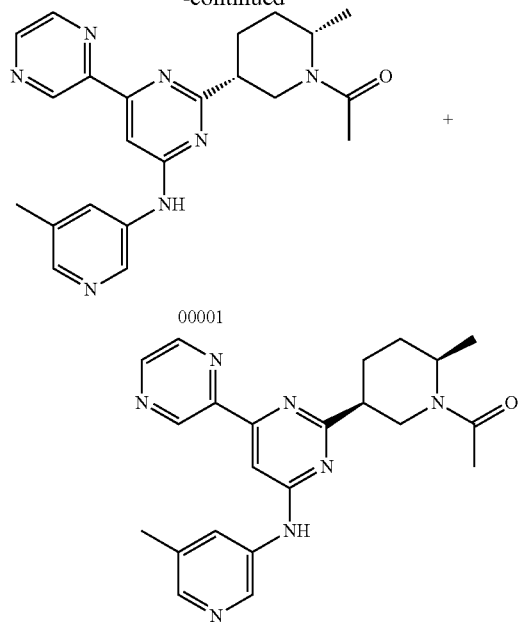

To a solution of 3-amino-5-methylpyridine (0.751 g, 6.94 mmol) in tetrahydrofuran (20 mL) was added 1M lithium bis(trimethylsilyl)amide in tetrahydrofuran (6.94 mL, 6.94 mmol) and the mixture was stirred at room temperature for 10 minutes. Next, 1-(5-(4,6-dichloropyrimidin-2-yl)-2-methylpiperidin-1-yl)ethan-1-one (Intermediate 1, 1 g, 3.47 mmol) in tetrahydrofuran (20 ml) was added and the mixture was stirred at room temperature for 2 hours. The mixture was poured into saturated ammonium chloride solution and was extracted with ethyl acetate twice. The combined organic layers were washed with brine once, dried over sodium sulfate and concentrated to afford a yellow solid. The solid was purified with silica column chromatography (0% to 5% methanol in dichloromethane) to afford 1-(5-(4-chloro-6-((5-methylpyridin-3-yl)amino)pyrimidin-2-yl)-2-methylpiperidin-1-yl)ethan-1-one (788 mg, 60%) as a yellow foam. LCMS (Method B): tR 1.81 min, 100%, MS (ESI) 360.1 (M+H)+. Under nitrogen, 2-(tributylstannyl)pyrazine (103 mg, 0.28 mmol), 1-(5-(4-chloro-6-((5-methylpyridin-3-yl)amino)pyrimidin-2-yl)-2-methylpiperidin-1-yl)ethan-1-one (50 mg, 0.14 mmol) and bis(triphenylphosphine) palladium(II) dichloride (9.75 mg, 0.01 mmol) were dissolved in N,N-dimethylformamide (3 mL). The mixture was heated to 80° C. for 24 hours and cooled to room temperature. The mixture was eluted through a C18 plug using acetonitrile, the filtrate was purified with reversed phase chromatography (method B) and lyophilized to afford 1-(2-methyl-5-(4-((5-methylpyridin-3-yl)amino)-6-(pyrazin-2-yl)pyrimidin-2-yl)piperidin-1-yl)ethan-1-one (22 mg, 37%) as a white solid. The obtained mixture of cis enantiomers was submitted for chiral preparative SFC (Method A) and lyophilized to afford both stereoisomers. 1-((2S,5R)-2-methyl-5-(4-((5-methylpyridin-3-yl)amino)-6-(pyrazin-2-yl)pyrimidin-2-yl)piperidin-1-yl)ethan-1-one (5 mg, 22%) LCMS (Method D): tR 3.17 min, 100%, MS (ESI) 404.1 (M+H)+; Chiral UPLC (Method: A): tR 3.17 min, >95% ee and de. 1-((2R,5S)-2-methyl-5-(4-((5-methylpyridin-3-yl)amino)-6-(pyrazin-2-yl)pyrimidin-2-yl)piperidin-1-yl)ethan-1-one (6 mg, 27%) LCMS (Method D): tR 3.17 min, 100%, MS (ESI) 404.2 (M+H)+; Chiral UPLC (Method A): tR 4.60 min, >95% ee and de.

Compounds 00003 (which is also referred to herein as Compound B) and 00004 (which is also referred to herein as Compound A) were prepared using procedures analogous to Example 1, using the appropriate starting materials.

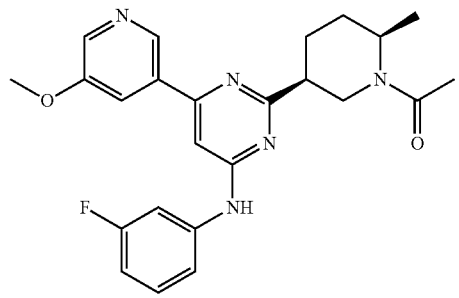

00003

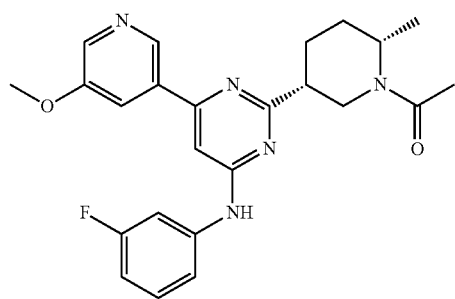

00004

Example 2: Synthesis of 1-((2S,5R)-5-(4-(imidazo[1,2-a]pyridin-6-ylamino)-6-(pyridin-3-yl)pyrimidin-2-yl)-2-methylpiperidin-1-yl)ethan-1-one (00013)

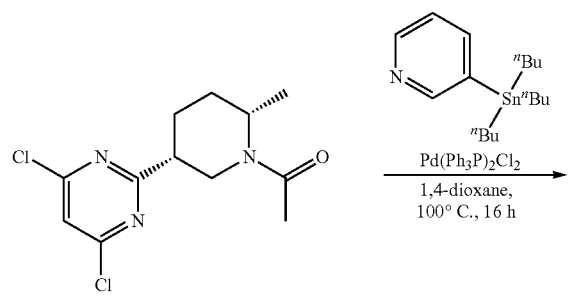

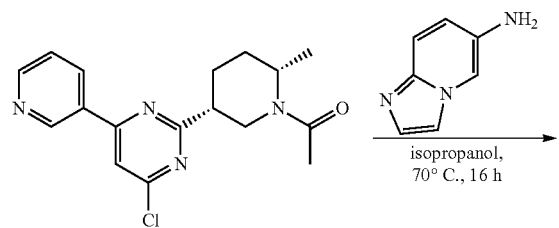

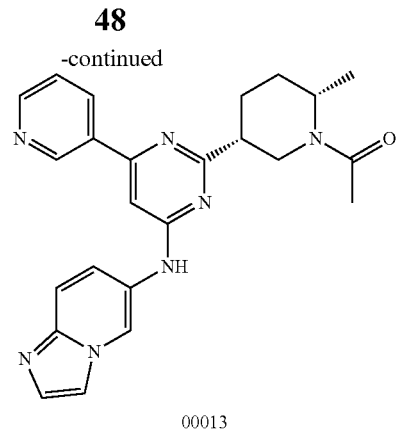

00013

Under argon, 3-(tributylstannyl)pyridine (607 mg, 1.65 mmol), 1-((2S,5R)-5-(4,6-dichloropyrimidin-2-yl)-2-methylpiperidin-1-yl)ethan-1-one (Intermediate 2, 500 mg, 1.74 mmol) and bis(triphenylphosphine)palladium(II) chloride (244 mg, 0.34 mmol) in 1,4-dioxane (20 mL) were heated to 100° C. and stirred for 32 hours. The mixture was diluted with dichloromethane containing 1% triethylamine and coated onto silica. This was purified with silica column chromatography (0% to 40% acetonitrile in dichloromethane containing 1% triethylamine) to afford 1-((2S,5R)-5-(4-chloro-6-(pyridin-3-yl)pyrimidin-2-yl)-2-methylpiperidin-1-yl)ethan-1-one (134 mg, 18%) as an orange gum. LCMS (Method C): tR 1.81 min, 100%, MS (ESI) 331.1 (M+H)+.

To a solution of 1-((2S,5R)-5-(4-chloro-6-(pyridin-3-yl)pyrimidin-2-yl)-2-methylpiperidin-1-yl)ethan-1-one (30 mg, 0.09 mmol) in 2-propanol (2 mL), was added imidazo[1,2-a]pyridin-6-amine (36.2 mg, 0.27 mmol) and hydrochloric acid (0.02 mL, 0.27 mmol). The mixture was stirred at 60° C. for 16 hours, poured into saturated aqueous sodium bicarbonate solution and extracted with ethyl acetate twice. The combined organic layers were dried over sodium sulfate and concentrated to afford a yellow oil.

The oil was purified with reversed phase chromatography (method B) and lyophilized to afford 1-((2S,5R)-5-(4-(imidazo[1,2-a]pyridin-6-ylamino)-6-(pyridin-3-yl)pyrimidin-2-yl)-2-methylpiperidin-1-yl)ethan1-one as a blue-ish solid. LCMS (Method B): tR 2.19 min, 100%, MS (ESI) 428.1 (M+H)+. Compound 00030 was prepared following procedures analogous to Example 2, using the appropriate starting materials.

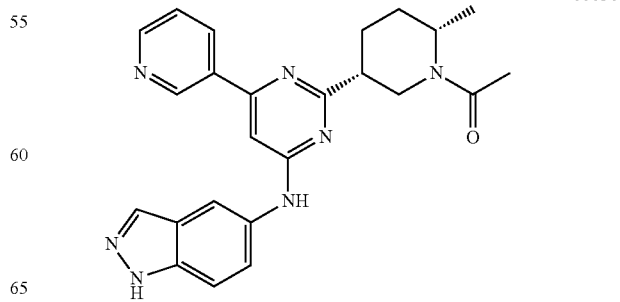

00030

Example 3A: Synthesis of 1-((2S,5R)-2-methyl-5-(4-((2-methylpyridin-4-yl)amino)-6-(pyridin-3-yl)pyrimidin-2-yl)piperidin-1-yl)ethan-1-one (00071)

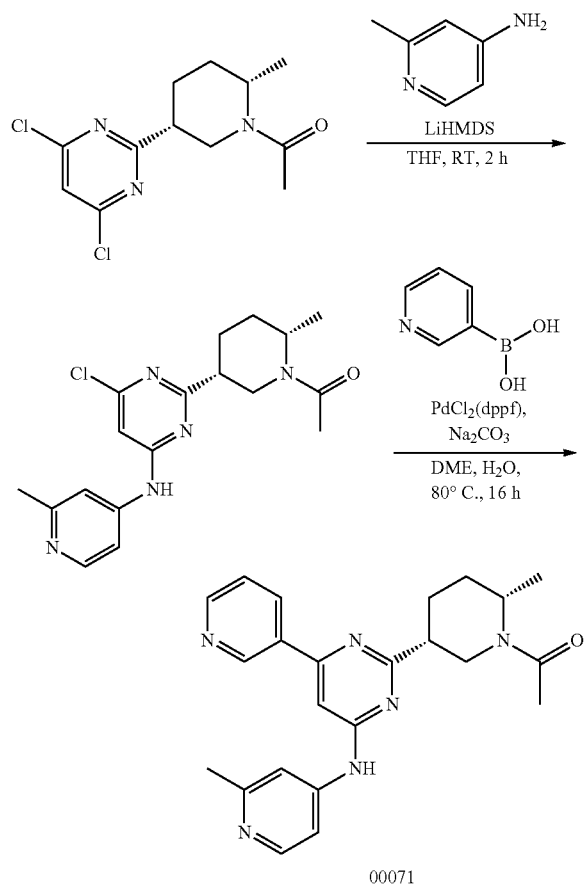

00071

To a solution of 2-methylpyridin-4-amine (3.19 g, 29.5 mmol) in dry tetrahydrofuran (100 mL) was added 1M lithium bis(trimethylsilyl)amide in tetrahydrofuran (29.5 mL, 29.5 mmol) and the mixture was stirred for 10 minutes. Next, 1-((2S,5R)-5-(4,6-dichloropyrimidin-2-yl)-2-methylpiperidin-1-yl)ethan-1-one (Intermediate 2, 850 mg, 2.95 mmol) in dry tetrahydrofuran (100 mL) was added over 10 minutes and the mixture was stirred at room temperature for 2 hours. The mixture was poured into saturated ammonium chloride solution and was extracted with ethyl acetate twice. The combined organic layers were washed with brine once, dried over sodium sulfate and concentrated to afford a brown oil. The oil was purified with silica column chromatography (80% to 100% ethyl acetate in n-heptane followed by 0% to 10% methanol in dichloromethane) to afford 1-((2S,5R)-5-(4-chloro-6-((2-methylpyridin-4-yl)amino)pyrimidin-2-yl)-2-methylpiperidin-1-yl)ethan-1-one (275 mg 25%) as a yellow oil. LCMS (Method A): tR 1.49 min, 100%, MS (ESI) 360.1 (M+H)+. Under nitrogen, 1-((2S, 5R)-5-(4-chloro-6-((2-methylpyridin-4-yl)amino)pyrimidin-2-yl)-2-methylpiperidin-1-yl)ethan-1-one (275 mg, 0.76 mmol), sodium carbonate (162 mg, 1.53 mmol), pyridine-3-boronic acid (188 mg, 1.53 mmol) and PdCl2(dppf)-CH2Cl2 adduct (62.4 mg, 0.08 mmol) were dissolved in a mixture of 1,2-dimethoxyethane (6 mL) and water (2 mL). The mixture was heated to 80° C. for 1 hour, filtered through a C18-plug and concentrated to afford a dark residue. The residue was purified with reversed phase chromatography (method B) and lyophilized to afford a light yellow solid. The product was further purified by chiral preparative SFC (Method B) and lyophilized to afford 1-((2S,5R)-2-methyl-5-(4-((2-methylpyridin-4-yl)amino)-6-(pyridin-3-yl)pyrimidin-2-yl)piperidin-1-yl)ethan-1-one (135 mg, 41%) as beige solid. LCMS (Method D): tR 3.06 min, 100%, MS (ESI) 403.2 (M+H)+; Chiral SFC (Method B): tR 3.60 min, >95% ee and de.

Example 3B: Synthesis of 1-((2S,5R)-2-methyl-5-(4-((3-(1-methyl-1H-1,2,3-triazol-4-yl)phenyl)amino)-6-(pyrazin-2-yl)pyrimidin-2-yl)piperidin-1-yl)ethan-1-one (Compound C)

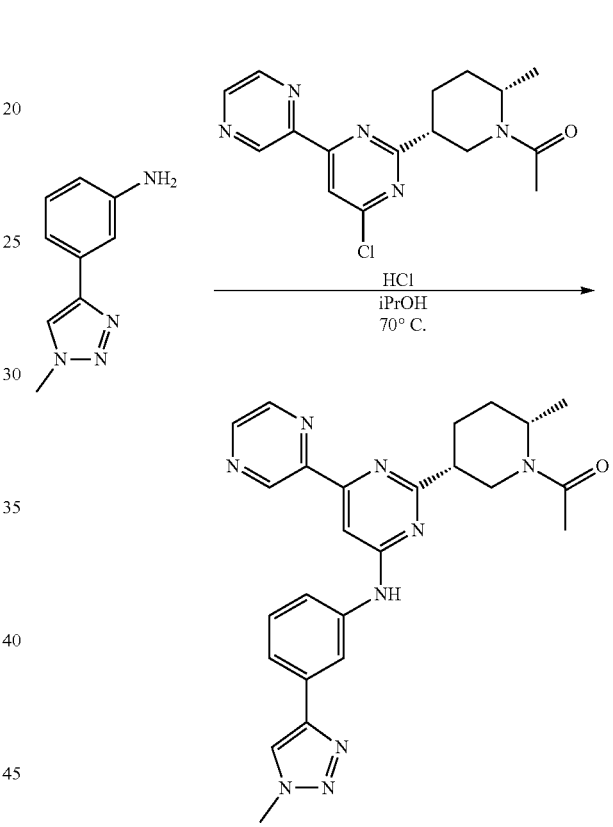

To a solution of 1-((2S,5R)-5-(4-chloro-6-(pyrazin-2-yl)pyrimidin-2-yl)-2-methylpiperidin-1-yl)ethan-1-one (Intermediate 3, 120 mg, 0.36 mmol) in 2-propanol (2 mL), was added 3-(1-methyl-1H-1,2,3-triazol-4-yl)aniline (188 mg, 1.08 mmol) and hydrochloric acid (0.08 mL, 1.08 mmol). The mixture was stirred at 70° C. for 16 hours, poured into saturated aqueous sodium bicarbonate solution and extracted with ethyl acetate twice. The combined organic layers were dried over sodium sulfate and concentrated to afford a yellow oil. The oil was purified with reversed phase chromatography (method B) and lyophilized to afford 1-((2S,5R)-2-methyl-5-(4-((3-(1-methyl-1H-1,2,3-triazol-4-yl)phenyl)amino)-6-(pyrazin-2-yl)pyrimidin-2-yl)piperidin-1-yl)ethan-1-one (Compound C, 102 mg, 60%) as a white solid. $^1$H-NMR (400 MHz, DMSO-d6 mixture of rotamers) δ 10.01 (d, J=5.6 Hz, 1H), 9.56 (dd, J=11.0, 1.1 Hz, 1H), 8.80 (d, J=1.5 Hz, 2H), 8.54-8.42 (m, 2H), 7.72-7.54 (m, 2H), 7.53-7.39 (m, 2H), 4.86-4.76 (m, 1H), 4.27-4.16 (m, 0.5H), 4.15-4.03 (m, 3.5H), 3.58-3.42 (m, 0.5H), 3.00-2.86

(m, 1H), 2.86-2.68 (m, 0.5H), 2.17-1.96 (m, 5H), 1.93-1.77 (m, 0.5H), 1.76-1.64 (m, 1.5H), 1.27 (d, J=6.8 Hz, 1.5H), 1.13 (d, J=7.0 Hz, 1.5H); LCMS (Method D): $t_R$ 3.31 min, MS (ESI) 470.2 (M+H)$^+$.

Example 4: Crystal Structure of the Bromodomain of Human CREBBP in Complex with Compound 00004 and BROMOscan™ Results for Compound A, Compound C, and CCS1477

Crystallization

Experimental setup: The construct used for crystallization comprised residues 1081 to 1197. Crystals of CREBBP in complex with compound 00004 were obtained using hanging-drop vapour-diffusion set-ups. CREBBP at a concentration of 20.3 mg/ml (10 mM Hepes, 500 mM NaCl, 5% Glycerol, 0.5 mM TCEP, pH 7.4) was pre-incubated with 4.3 mM (3.0-fold molar excess) of 00004 (150 mM in DMSO) for 1 h. 1 µl of the protein solution was then mixed with 1 µl of reservoir solution (0.1 M MgCl2, 0.1 M MES/NaOH pH 6.3, 18% (w/v) PEG 6000 and 10% (v/v) ethylene glycol) and equilibrated at 4° C. over 0.4 ml of reservoir solution. Well diffracting crystals appeared and grew to full size over 4 days.

Data Collection

Crystals were cryo-protected by addition of 10% glycerol (final concentration) to the crystallization drop before mounting. A complete 1.6 Å data set of a CREBBP/00004crystal was collected at Diamond Light Source (Didcot, UK, beamline i03) and the data were integrated, analyzed and scaled by XDS, Pointless and Aimless within the autoPROC pipeline (Table 1).

TABLE 1

Data collection statistics

| | |
|---|---|
| Space group | P2$_1$ |
| Unit cell parameters [Å] | a = 70.4, b = 58.6, c = 73.2 |
| | α = 90.0, β = 115.4, γ = 90.0 |
| Resolution [Å] | 66.14-1.60 (1.63-1.60) |
| # Unique reflections | 68872 (2664) |
| I/σ(I) | 14.9 (2.2) |
| Completeness [%] | 97.2 (75.5) |
| Multiplicity | 3.3 (2.1) |
| Rmeas | 0.050 (0.460) |

Structure Determination and Refinement

Molecular replacement was done using a previously determined structure of CREBBP as a starting model. Several rounds of alternating manual re-building and refinement with REFMAC5 resulted in the final model (Table 2). Atomic displacement factors were modelled with a single isotropic B-factor per atom.

TABLE 2

Refinement statistics

| | |
|---|---|
| Resolution | 35.00-1.60 (1.64-1.60) |
| R$_{work}$ | 0.151 (0.305) |
| R$_{free}$ | 0.190 (0.351) |
| Completeness [%] | 97.2 (77.6) |

Results: We have produced crystals of CREBBP/00004 that diffracted to 1.6 Å resolution and determined the 3-dimensional structure of the protein-ligand complex. Clear electron density in the Fo-Fc omit map of the initial model at the compound binding site in each chain of CREBBP revealed the binding of the entire compound (FIG. 1) and allowed its unambiguous placement. Additionally, the structure also confirms the absolute stereochemistry of compound 00004 (2S,5R on the piperidine moiety).

BromoKdMAX-Assay

A BromoKdMAX was performed at DiscoverX. This assay may be used for determining whether compounds bind to the bromodomain of p300 and/or the bromodomain of CBP with a particular Kd (e.g. 100 nM or less).

The assay principle is the following: BROMOscan™ is a novel industry leading platform for identifying small molecule bromodomain inhibitors. Based on proven KINOMEscan™ technology, BROMOscan™ employs a proprietary ligand binding site-directed competition assay to quantitatively measure interactions between test compounds and bromodomains. This robust and reliable assay panel is suitable for high throughput screening and delivers quantitative ligand binding data to facilitate the identification and optimization of potent and selective small molecule bromodomain inhibitors. BROMOscan™ assays include trace bromodomain concentrations (<0.1 nM) and thereby report true thermodynamic inhibitor Kd values over a broad range of affinities (<0.1 nM to >10 uM).

The assay was conducted as follows: For the Bromodomain assays, T7 phage strains displaying bromodomains were grown in parallel in 24-well blocks in an E. coli host derived from the BL21 strain. E. coli were grown to log-phase and infected with T7 phage from a frozen stock (multiplicity of infection=0.4) and incubated with shaking at 32° C. until lysis (90-150 minutes). The lysates were centrifuged (5,000×g) and filtered (0.2 µm) to remove cell debris. Streptavidin-coated magnetic beads were treated with biotinylated small molecule or acetylated peptide ligands for 30 minutes at room temperature to generate affinity resins for bromodomain assays. The liganded beads were blocked with excess biotin and washed with blocking buffer (SeaBlock (Pierce), 1% BSA, 0.05% Tween 20, 1 mM DTT) to remove unbound ligand and to reduce non-specific phage binding. Binding reactions were assembled by combining bromodomains, liganded affinity beads, and test compounds (i.e. either Compound A, Compound C or CCS1477) in 1× binding buffer (17% SeaBlock, 0.33×PBS, 0.04% Tween 20, 0.02% BSA, 0.004% Sodium azide, 7.4 mM DTT). Test compounds were prepared as 1000× stocks in 100% DMSO. Kds were determined using an 11-point 3-fold compound dilution series with one DMSO control point. All compounds for Kd measurements are distributed by acoustic transfer (non-contact dispensing) in 100% DMSO.

The compounds were then diluted directly into the assays such that the final concentration of DMSO was 0.09%. All reactions performed in polypropylene 384-well plates. Each was a final volume of 0.02 ml. The assay plates were incubated at room temperature with shaking for 1 hour and the affinity beads were washed with wash buffer (1×PBS, 0.05% Tween 20). The beads were then re-suspended in elution buffer (1×PBS, 0.05% Tween 20, 2 µM non-biotinylated affinity ligand) and incubated at room temperature with shaking for 30 minutes. The bromodomain concentration in the eluates was measured by qPCR.

The results were as follows:

| DiscoveRx Gene Symbol | compound A Kd [nM] | compound C Kd [nM] | CCS1477 Kd [nM] |
|---|---|---|---|
| ATAD2A | >10000 | >10000 | >10000 |
| ATAD2B | >10000 | >10000 | >10000 |

-continued

| DiscoveRx Gene Symbol | compound A Kd [nM] | compound C Kd [nM] | CCS1477 Kd [nM] |
|---|---|---|---|
| BAZ2A | >10000 | >10000 | >10000 |
| BAZ2B | >10000 | >10000 | >10000 |
| BRD1 | >10000 | >10000 | >10000 |
| BRD2(1) | >10000 | 3700 | 230 |
| BRD2(1, 2) | 7600 | 4500 | 610 |
| BRD2(2) | >10000 | >10000 | 2100 |
| BRD3(1) | >10000 | 3700 | 320 |
| BRD3(1, 2) | >10000 | 7300 | 1400 |
| BRD3(2) | >10000 | >10000 | 3900 |
| BRD4(1) | >10000 | 2500 | 250 |
| BRD4(1, 2) | >10000 | >10000 | 6900 |
| BRD4(2) | >10000 | >10000 | 5200 |
| BRD4(full-length, short-iso.) | 7100 | 1200 | 440 |
| BRD7 | >10000 | 8000 | 5100 |
| BRD8(1) | >10000 | 8400 | >10000 |
| BRD8(2) | >10000 | >10000 | >10000 |
| BRD9 | >10000 | 6300 | 790 |
| BRDT(1) | >10000 | 3600 | 390 |
| BRDT(1, 2) | >10000 | 8500 | 2400 |
| BRDT(2) | >10000 | >10000 | 8900 |
| BRPF1 | >10000 | 7800 | 1400 |
| BRPF3 | >10000 | >10000 | >10000 |
| CECR2 | >10000 | 9800 | >10000 |
| CREBBP | 29 | 3.2 | 0.47 |
| EP300 | 12 | 2.1 | 0.26 |
| FALZ | >10000 | >10000 | 5500 |
| GCN5L2 | >10000 | >10000 | >10000 |
| PBRM1(2) | >10000 | >10000 | >10000 |
| PBRM1(5) | >10000 | >10000 | 3100 |
| PCAF | >10000 | 9400 | >10000 |
| SMARCA2 | >10000 | >10000 | >10000 |
| SMARCA4 | >10000 | >10000 | >10000 |
| TAF1(2) | >10000 | 230 | 7900 |
| TAF1L(2) | >10000 | 1600 | >10000 |
| TRIM24(Bromo.) | >10000 | 7900 | 680 |
| TRIM24(PHD, Bromo.) | >10000 | >10000 | 1900 |
| TRIM33(PHD, Bromo.) | >10000 | >10000 | >10000 |
| WDR9(2) | >10000 | 4100 | >10000 |

Corresponding data is publicly available i) for SGC-CBP30 e.g. in the supplementary information of Wu et al., NATURE COMMUNICATIONS (2019)10:1915 https://doi.org/10.1038/s41467-09672-2: ii) for GNE-781 e.g. in Romero et al., *J. Med. Chem.* 2017, 60, 9162-9183; and iii) for FT-6876 e.g. in Poster #3079 of the AACR Annual Meeting 2020, Virtual Meeting II, Jun. 22-24, 2020 (entitled "FT-6876, a potent and selective inhibitor of CBP/p300 with antitumor activity in AR-positive breast cancer").

Example 5

Materials and Methods:
CBP Bromodomain Binding Assay (TR-FRET):

Compounds solutions of 10 mM in DMSO were prediluted in DSMO to 25× stock solutions in DMSO. These were then diluted down to 4× in Assay buffer. A dilution series in Assay buffer was performed keeping the DMSO concentration stable. 5 µl compound in assay buffer was transferred into the assay plate (provided by assay kit) and the TR-FRET assay Cayman chemicals; 600850) was performed using the manufactor's instructions. After 1 hour incubation at room temperature in the dark, assay plates were read in a Tecan M1000 plate reader using the TR-FRET mode (top read; excitation 340 nM bandwidth 20 nM; emission 620 nM bandwidth 7 nM; gain optimal determined for the first well, number of flashes: 5; flash frequency 100 Hz; integration time: 500 µs, lag time: 100 µs, room temperature). The TR-FRET ratio was calculated by dividing 670 nm emission by 620 nm emission. Calculation of EC50 was done on normalized values (DMSO=1) and positive control (0). Values were log transformed and non-linear regression with variable slope (4 parameters) was used to fit values to a dose-response curve to evaluate EC50 values (see table 3 below).

TABLE 3

| Compound # | EC50 |
|---|---|
| 00003 | C |
| 00004 | A* |
| 00030 | A |
| 00071 | A* |

Legend EC50: A* < 0.2 µM < A < 1 µM < B < 10 µM < C

It is evident from the TR-FRET data that Compound 00003 with an EC50 of >10 µM does not correspond to a CBP/p300 bromodomain inhibitor as defined herein.

Example 6

Materials and Methods

Label-Free Determination of Cell Proliferation:

2000 SNU-1411 cells [KCLB; 01411, a CRC (rectal adenocarcinoma) cell line carrying a KRAS G12C mutation], were seeded into 96 well plates (Greiner BioOne 655090) one day prior to drug treatment in RPMI medium containing 10% FCS and 2 mM L-Glutamine. The next day, the wells were imaged label-free using brightfield imaging on a CELIGO Image Cytometer to determine the initial cell confluency. Subsequently cells were treated with either DMSO, with an individual (single) drug, namely either AMG510 or any of the CBP/p300 bromodomain inhibitors listed below, or with a drug combination, namely (i) AMG510 and the CBP/p300 bromodomain inhibitor "Compound A", (ii) AMG510 and the CBP/p300 bromodomain inhibitor "Compound C", (iii) AMG510 and the CBP/p300 bromodomain inhibitor "CCS1477", (iv) AMG510 and the CBP/p300 bromodomain inhibitor "FT-6876", and (v) AMG510 and the CBP/p300 bromodomain inhibitor "GNE-781" with drug concentrations as given below. Plates were regularly imaged over weeks using brightfield mode (CELIGO Imaging Cytometer) to track cell confluency in each well over time. Growth medium and treatments were replenished twice weekly. The drugs and concentrations were as follows: 300 nM AMG510 (covalent KRAS G12C specific inhibitor, ChemieTek #CT-AMG510) and for CBP/p300 bromodomain inhibitors: 1 µM Compound A, 0.2 µM Compound C, 0.2 µM CCS1477 (ChemiTek; CT-CCS1477), 1 µM FT-6876 ("CBP/P300-IN-8", MedChemExpress; HY-136920) and 0.2 µM GNE-781 (MedChemExpress; HY-108696). Confluency was determined using CELIGO software's built-in "confluence" analysis tool in the brightfield mode.

FIGS. 2A to E show the assessment of SNU-1411 confluency over 32 days. CBP/p300 bromodomain inhibitors [(A) Compound A, (B) Compound C, (C) CCS1477, (D) FT-6876 and (E) GNE-781)] do not affect cell proliferation of KRAS G12C mutated CRC cells in the absence of a KRAS G12C inhibitor but prevent the development of drug resistance towards 300 nM AMG510 when combined with AMG510. Note that DMSO curves and time courses for 300 nM AMG510 treatment are identical in panels FIGS. 2A and D as well as in FIGS. 2B, C and E as the respective conditions (A, D as well as B, C and E) were run on the same plate (per plate: DMSO: 9 wells, CBP/p300 bromodomain inhibitor: 3 wells each, AMG510: 6 wells and all combinations of AMG510+CBP/p300 bromodomain inhibitor: 6 wells, mean±SD). One example plate is shown.

Results: As can be derived from FIGS. 2A-E, CBP/p300 bromodomain inhibitors when used alone had no/at best a weak effect on confluency of SNU-1411 cells, whereas 300 nM AMG510 delayed cell proliferation initially for few days. In the long-term cultures, SNU-1411 cells re-grew if treated with AMG510 alone, whereas co-treatment of AMG510 in combination with the different CBP/p300 bromodomain inhibitors completely prevented or strongly reduced re-growth for the investigated time of 32 days.

Example 7

Materials and Methods

Label-Free Determination of Cell Proliferation:
2000 SNU-1411 cells [KCLB; 01411, a CRC (rectal adenocarcinoma) cell line carrying a KRAS G12C mutation], were seeded into 96 well plates (Greiner BioOne 655090) one day prior to drug treatment in RPMI medium containing 10% FCS and 2 mM L-Glutamine. The next day, the wells were imaged label-free using brightfield imaging on a CELIGO Image Cytometer to determine the initial cell confluency. Subsequently cells were treated with either DMSO, with an individual (single) drug, namely either MRTX849 or any of the CBP/p300 bromodomain inhibitors listed below, or with a drug combination, namely (i) MRTX849 and the CBP/p300 bromodomain inhibitor "Compound A", (ii) MRTX849 and the CBP/p300 bromodomain inhibitor "Compound C", (iii) MRTX849 and the CBP/p300 bromodomain inhibitor "CCS1477", (iv) MRTX849 and the CBP/p300 bromodomain inhibitor "FT-6876", and (v) MRTX849 and the CBP/p300 bromodomain inhibitor "GNE-781" with drug concentrations as given below. Plates were regularly imaged over weeks using brightfield mode (CELIGO Imaging Cytometer) to track cell confluency in each well over time. Growth medium and treatments were replenished twice weekly. The drugs and concentrations were as follows: 300 nM MRTX849 (covalent KRAS G12C specific inhibitor, Selleckchem #S8884) and for CBP/p300 bromodomain inhibitors: 1 µM Compound A, 0.2 µM Compound C, 0.2 µM CCS1477 (ChemiTek; CT-CCS1477), 1 µM FT-6876 ("CBP/P300-IN-8", MedChemExpress; HY-136920) and 0.2 µM GNE-781 (MedChemExpress; HY-108696). Confluency was determined using CELIGO software's built-in "confluence" analysis tool in the brightfield mode.

FIGS. 3A to E show the assessment of SNU-1411 confluency over 32 days. CBP/p300 bromodomain inhibitors [(A) Compound A, (B) Compound C, (C) CCS1477, (D) FT-6876 and (E) GNE-781)] do not affect cell proliferation of KRAS G12C mutated CRC cells in the absence of a KRAS G12C inhibitor but prevent the development of drug resistance towards 300 nM MRTX849 when combined with MRTX849. Note that DMSO curves and time courses for 300 nM MRTX849 treatment are identical in panels FIGS. 3A and D as well as in FIGS. 3B, C and E as the respective conditions (A, D as well as B, C and E) were run on the same plate (per plate: DMSO: 9 wells, CBP/p300 bromodomain inhibitor: 3 wells each, MRTX849: 6 wells and all combinations of MRTX849+CBP/p300 bromodomain inhibitor: 6 wells, mean±SD). One example graph is shown.

Results: As can be derived from FIGS. 3A-E, CBP/p300 bromodomain inhibitors when used alone had no/at best a weak effect on confluency of SNU-1411 cells, whereas 300 nM MTRX894 delayed cell proliferation initially for few days. In the long-term cultures, SNU-1411 cells re-grew if treated with MRTX849 alone, whereas co-treatment of MRTX849 in combination with the different CBP/p300 bromodomain inhibitors prevented re-growth for the investigated time of 32 days.

Example 8

Materials and Methods

Label-Free Determination of Cell Proliferation:
2000 SW837 cells [ATCC; CCL-235, a CRC (rectal adenocarcinoma) cell line carrying a KRAS G12C mutation], were seeded into 96 well plates (Greiner BioOne 655090) one day prior to drug treatment in RPMI medium containing 10% FCS and 2 mM L-Glutamine. The next day, the wells were imaged label-free using brightfield imaging on a CELIGO Image Cytometer to determine the initial cell confluency. Subsequently cells were treated with either DMSO, with an individual (single) drug, namely either AMG510 or any of the CBP/p300 bromodomain inhibitors listed below, or with a drug combination, namely (i) AMG510 and the CBP/p300 bromodomain inhibitor "Compound A", (ii) AMG510 and the CBP/p300 bromodomain inhibitor "Compound C", (iii) AMG510 and the CBP/p300 bromodomain inhibitor "CCS1477", (iv) AMG510 and the CBP/p300 bromodomain inhibitor "FT-6876", and (v) AMG510 and the CBP/p300 bromodomain inhibitor "GNE-781" with drug concentrations as given below. Plates were regularly imaged over weeks using brightfield mode (CELIGO Imaging Cytometer) to track cell confluency in each well over time. Growth medium and treatments were replenished twice weekly. The drugs and concentrations were as follows: 100 nM AMG510 (covalent KRAS G12C specific inhibitor, ChemieTek #CT-AMG510) and for CBP/p300 bromodomain inhibitors: 1 µM Compound A, 0.2 µM Compound C, 0.2 µM CCS1477 (ChemiTek; CT-CCS1477), 1 µM FT-6876 ("CBP/P300-IN-8", MedChemExpress; HY-136920) and 0.2 µM GNE-781 (MedChemExpress; HY-108696). Confluency was determined using CELIGO software's built-in "confluence" analysis tool in the brightfield mode.

FIGS. 4A to E show the assessment of SW837confluency over 49 days. CBP/p300 bromodomain inhibitors [(A) Compound A, (B) Compound C, (C) CCS1477, (D) FT-6876 and (E) GNE-781)] do not affect cell proliferation of KRAS G12C mutated CRC cells in the absence of a KRAS G12C inhibitor but prevent the development of drug resistance towards 100 nM AMG510 when combined with AMG510. Note that DMSO curves and time courses for 100 nM AMG510 treatment are identical in panels FIG. 4A to E as all conditions were run in parallel (per plate: DMSO: 18 wells, CBP/p300 bromodomain inhibitor: 6 wells each, AMG510: 12 wells and all combinations of AMG510+CBP/p300 bromodomain inhibitor: 12 wells, mean±SD).

Results: As can be derived from FIGS. 4A-E, CBP/p300 bromodomain inhibitors when used alone had no/at best a weak effect on confluency of SW837 cells, whereas 100 nM AMG510 initially prevented cell proliferation. In the long-term cultures, SW837 cells re-grew if treated with AMG510 alone, whereas co-treatment of AMG510 in combination with the different CBP/p300 bromodomain inhibitors completely prevented or strongly reduced re-growth for the investigated time of 49 days.

Example 9

Materials and Methods

Label-Free Determination of Cell Proliferation:

2000 NCI-H358 cells [KCLB; 25807; a non-small cell lung cancer (NSCLC) cell line with KRAS G12C mutation] were seeded into 96 well plates (Greiner BioOne 655090) one day prior to drug treatment in RPMI medium containing 10% FCS and 2 mM L-Glutamine. The next day, the wells were imaged label-free using brightfield imaging on a CELIGO ImageCytometer to determine the initial cell number. Subsequently cells were treated with either DMSO, with an individual (single) drug, namely either AMG510 or any of the two CBP/p300 bromodomain inhibitors listed below, or with a drug combination, namely (i) AMG510 and the CBP/p300 bromodomain inhibitor "Compound A", and (ii) AMG510 and the CBP/p300 bromodomain inhibitor "Compound C" with drug concentrations as given below. The cells were regularly imaged over weeks using brightfield mode (CELIGO Imaging Cytometer) to track cell proliferation in each well over time. Growth medium and treatments were replenished twice weekly. The drugs and concentrations were as follows: 100 nM AMG510 (ChemieTek #CT-AMG510), 1 µM Compound A, 200 nM Compound C and the combinations of 100 nM AMG510+1 µM Compound A or of 100 nM AMG510+200 nM Compound C. Cell numbers were determined using CELIGO software's built-in "direct cell counting" analysis tool in the brightfield mode.

Figure 5:
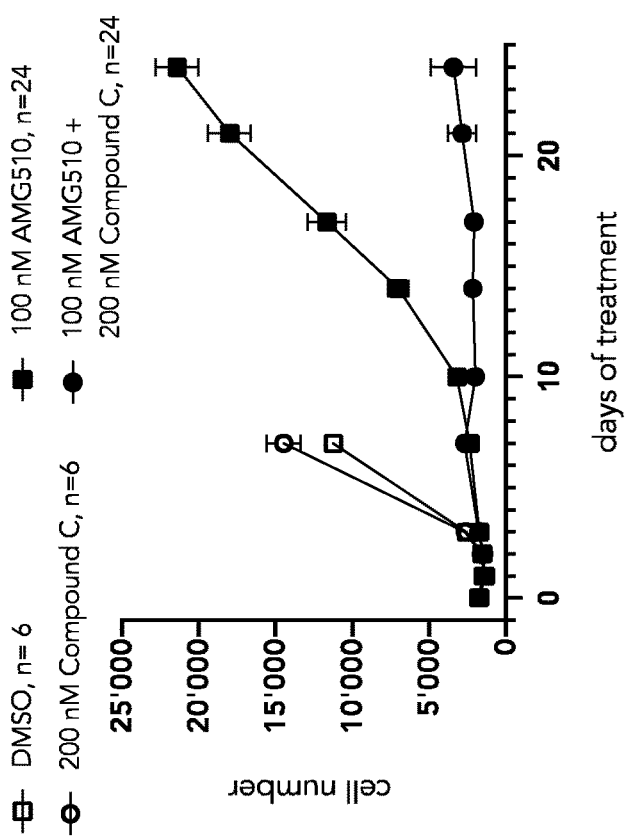
FIG. 5A-B: NCI-H358 cell proliferation over >20 days, wherein the cells were treated as indicated, namely either with DMSO (control), or AMG510 alone or one of the two different CBP/p300 bromodomain inhibitors alone, or with a combination of (i) AMG510 and (ii) one of the two different CBP/p300 bromodomain inhibitors. Details can be found in example 9.
Figure 5:
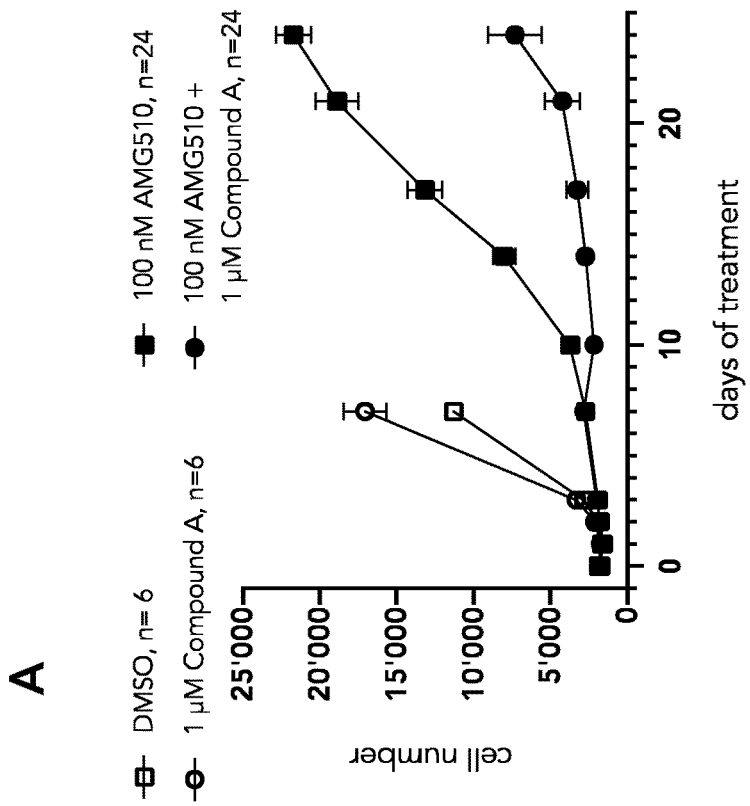

FIGS. 5A and B show the assessment of NCI-H385 cell number over time [in days]. Neither Compound A (in panel A) nor Compound C (in panel B) reduce the cell proliferation of KRAS G12C-mutated NSCLC cell line NCI-H358 in the absence of a KRAS G12C inhibitor. However, compound A and C prevent the development of drug resistance when combined with a covalent KRAS G12C specific inhibitor (for FIG. 5A: DMSO: n=6, Compound A: n=6, AMG510: n=24, AMG510+Compound A: n=24, mean±SD; for FIG. 5B: DMSO: n=6, Compound C: n=6, AMG510: n=24, AMG510+Compound C: n=24, mean±SD.)

Results: Compound A and Compound C did not reduce NCI-H358 cell numbers when used alone, whereas 100 nM AMG510 initially completely blocked cell proliferation. In the long-term cultures, NCI-H358 cells re-grew if treated with AMG510 alone, whereas co-treatment of AMG510 with the CBP/P300 bromodomain inhibitors Compound A (in A) or compound C (in B), respectively, completely prevented re-growth for the investigated time period (>20 days).

The invention claimed is:

1. A method of treating a patient suffering from cancer, wherein the cancer exhibits an oncogenic alteration in the KRAS, wherein the oncogenic alteration is caused by at least one base mutation in the KRAS gene resulting in the amino acid substitution G12C in the KRAS, the method comprising administering a combination of (i) a CBP/p300 bromodomain inhibitor and (ii) a KRAS inhibitor to said patient.

2. The method according to claim 1, wherein the oncogenic alteration in the KRAS results in overactivation of KRAS signalling.

3. The method according to claim 1, wherein the CBP/p300 bromodomain inhibitor is selected from the group consisting of Compound A, Compound C, Compound 00030, Compound 00071, CCS1477, GNE-781, GNE-049, SGC-CBP30, CPI-637, FT-6876, Compound 462, Compound 424 and Compound 515.

4. The method according to claim 1, wherein the KRAS inhibitor is selected from the group consisting of AMG510, MRTX849, JNJ-74699157/ARS-3248, BI 1823911, GDC-6036, a $RAS^{G12C}(ON)$ inhibitor, and combinations thereof.

5. The method according to claim 1, wherein the oncogenic alteration is caused by at least one base mutation in the KRAS gene resulting in the amino acid substitution G12C in the KRAS and the KRAS inhibitor is a KRAS G12C inhibitor.

6. The method according to claim 1, wherein the cancer is selected from the group consisting of lung cancer, colorectal cancer and pancreatic cancer.

7. The method according to claim 1, wherein the combination is administered to the patient during each treatment cycle.

8. The method according to claim 1, wherein (i) and (ii) are administered as separate dosage forms or comprised in a single dosage form.

9. The method according to claim 8, wherein the administration during each treatment cycle is concomitantly or sequentially if (i) and (ii) are administered as separate dosage forms.

10. The method according to claim 1, wherein the treatment results in an extended duration of the therapeutic effect compared to the duration of the therapeutic effect of the KRAS inhibitor when administered as the sole active agent.

11. The method according to claim 1, wherein the treatment results in an increased therapeutic efficacy compared to the therapeutic efficacy of the KRAS inhibitor when administered as the sole active agent.

12. The method according to claim 1, wherein the treatment results in the prevention of resistance to the KRAS inhibitor.

13. A kit comprising (i) a pharmaceutical dosage form comprising a CBP/p300 bromodomain inhibitor and (ii) a pharmaceutical dosage form comprising a KRAS G12C inhibitor.

14. A pharmaceutical dosage form comprising (i) a CBP/p300 bromodomain inhibitor and (ii) a KRAS G12C inhibitor.

15. The kit according to claim 13, wherein the CBP/p300 bromodomain inhibitor is selected from the group consisting of Compound A, Compound C, Compound 00030, Compound 00071, CCS1477, GNE-781, GNE-049, SGC-CBP30, CPI-637, FT-6876, Compound 462, Compound 424 and Compound 515.

16. The kit according to claim 13, wherein the KRAS inhibitor is selected from the group consisting of AMG510, MRTX849, JNJ-74699157/ARS-3248, BI 1823911, GDC-6036, a $RAS^{G12C}(ON)$ inhibitor, and combinations thereof.

17. The pharmaceutical dosage form according to claim 14, wherein the CBP/p300 bromodomain inhibitor is selected from the group consisting of Compound A, Compound C, Compound 00030, Compound 00071, CCS1477 GNE-781, GNE-049, SGC-CBP30, CPI-637, FT-6876, Compound 462, Compound 424 and Compound 515.

18. The pharmaceutical dosage form according to claim 14, wherein the KRAS inhibitor is selected from the group consisting of AMG510, MRTX849, JNJ-74699157/ARS-3248, BI 1823911, GDC-6036, a $RAS^{G12C}(ON)$ inhibitor, and combinations thereof.

* * * * *